United States Patent
Gipson et al.

(10) Patent No.: US 9,772,687 B2
(45) Date of Patent: Sep. 26, 2017

(54) BUSSED HAPTIC ACTUATOR SYSTEM AND METHOD

(71) Applicant: MIDE TECHNOLOGY CORPORATION, Medford, MA (US)

(72) Inventors: Timothy R. Gipson, Medford, MA (US); Stephen Hanly, Charlestown, MA (US); Noel Jared Keegan, Medford, MA (US)

(73) Assignee: Mide Technology Corporation, Medford, MA (US)

( * ) Notice: Subject to any disclaimer, the term of this patent is extended or adjusted under 35 U.S.C. 154(b) by 292 days.

(21) Appl. No.: 14/616,924

(22) Filed: Feb. 9, 2015

(65) Prior Publication Data

US 2015/0227204 A1    Aug. 13, 2015

Related U.S. Application Data

(60) Provisional application No. 61/939,328, filed on Feb. 13, 2014, provisional application No. 61/939,331, filed on Feb. 13, 2014.

(51) Int. Cl.
*H04B 3/36* (2006.01)
*G06F 3/01* (2006.01)
*G06F 1/32* (2006.01)

(52) U.S. Cl.
CPC ............ *G06F 3/016* (2013.01); *G06F 1/3206* (2013.01); *G06F 1/3287* (2013.01); *Y02B 60/1282* (2013.01)

(58) Field of Classification Search
CPC ....... G06F 3/016; G06F 1/3287; G06F 1/3206
See application file for complete search history.

(56) References Cited

U.S. PATENT DOCUMENTS

| | | | |
|---|---|---|---|
| 5,656,882 | A | 8/1997 | Lazarus et al. |
| 5,687,462 | A | 11/1997 | Lazarus et al. |
| 5,866,971 | A | 2/1999 | Lazarus et al. |
| 5,973,441 | A | 10/1999 | Lo et al. |
| 6,024,340 | A | 2/2000 | Lazarus et al. |
| 6,069,433 | A | 5/2000 | Lazarus et al. |
| 6,069,443 | A | 5/2000 | Jones et al. |
| 6,198,206 | B1 | 3/2001 | Saarmaa et al. |
| 6,359,371 | B1 | 3/2002 | Perkins et al. |

(Continued)

OTHER PUBLICATIONS

Texas Instruments Incorporated, "Piezo Haptic Driver With Boost, Digital Front End, and Internal Waveform Memory", DRV2667, SLOS751A—Mar. 2013—Revised Jan. 2014, 39 pages.

*Primary Examiner* — Erin File

(74) *Attorney, Agent, or Firm* — Iandiorio Teska & Coleman, LLP

(57) ABSTRACT

A bussed haptic actuator system includes a plurality of haptic actuators and a master control subsystem. Each haptic actuator includes a memory with an address storable therein and a slave controller subsystem configured to control the actuator in response to a received command signal. The master control subsystem is connected via a bus to the plurality of haptic actuators. The master control subsystem includes sequencer configured to determine which of the plurality of haptic actuators are to be activated and logic configured to provide, on the bus, a command signal including one or more addresses corresponding to haptic actuators to be activated as determined by the sequencer.

58 Claims, 37 Drawing Sheets

(56) References Cited

U.S. PATENT DOCUMENTS

| | | | |
|---|---|---|---|
| 6,376,867 B1 | 4/2002 | Gutierrez-Aitken et al. | |
| 6,376,967 B2 | 4/2002 | Saarmaa et al. | |
| 6,404,107 B1 | 6/2002 | Lazarus et al. | |
| 6,420,819 B1 | 7/2002 | Lazarus et al. | |
| 6,563,254 B2 | 5/2003 | Perkins et al. | |
| 6,781,285 B1 | 8/2004 | Lazarus et al. | |
| 7,015,825 B2 | 3/2006 | Callahan | |
| 7,327,337 B2 | 2/2008 | Callahan | |
| 7,369,115 B2 | 5/2008 | Cruz-Hernandez et al. | |
| 8,067,875 B1* | 11/2011 | Blackburn | H01L 41/0825 310/311 |
| 8,890,666 B2 | 11/2014 | Parker et al. | |
| 2001/0002098 A1* | 5/2001 | Haanpaa | B25J 9/1689 318/568.11 |
| 2001/0044860 A1* | 11/2001 | Hinrichs | B60N 2/0244 710/9 |
| 2002/0047499 A1 | 4/2002 | Lazarus et al. | |
| 2007/0103437 A1* | 5/2007 | Rosenberg | G09B 23/285 345/161 |
| 2009/0015426 A1* | 1/2009 | Long | H01R 13/6633 340/4.32 |
| 2010/0201384 A1* | 8/2010 | Scott-Carnell | G01M 5/0083 324/693 |
| 2010/0231367 A1* | 9/2010 | Cruz-Hernandez | G06F 3/0488 340/407.2 |
| 2010/0245966 A1* | 9/2010 | Yasuda | G02B 26/0858 359/224.1 |
| 2011/0260990 A1* | 10/2011 | Ali | G06F 3/016 345/173 |
| 2012/0206248 A1* | 8/2012 | Biggs | G06F 3/016 340/407.2 |
| 2013/0044049 A1* | 2/2013 | Biggs | G06F 3/016 345/156 |
| 2013/0098254 A1* | 4/2013 | Ashmore | B41F 15/12 101/123 |
| 2013/0127607 A1 | 5/2013 | Parker et al. | |
| 2013/0335165 A1* | 12/2013 | Arnold | H01P 1/20 333/135 |
| 2014/0191615 A1* | 7/2014 | Denes | H01L 41/053 310/309 |

* cited by examiner

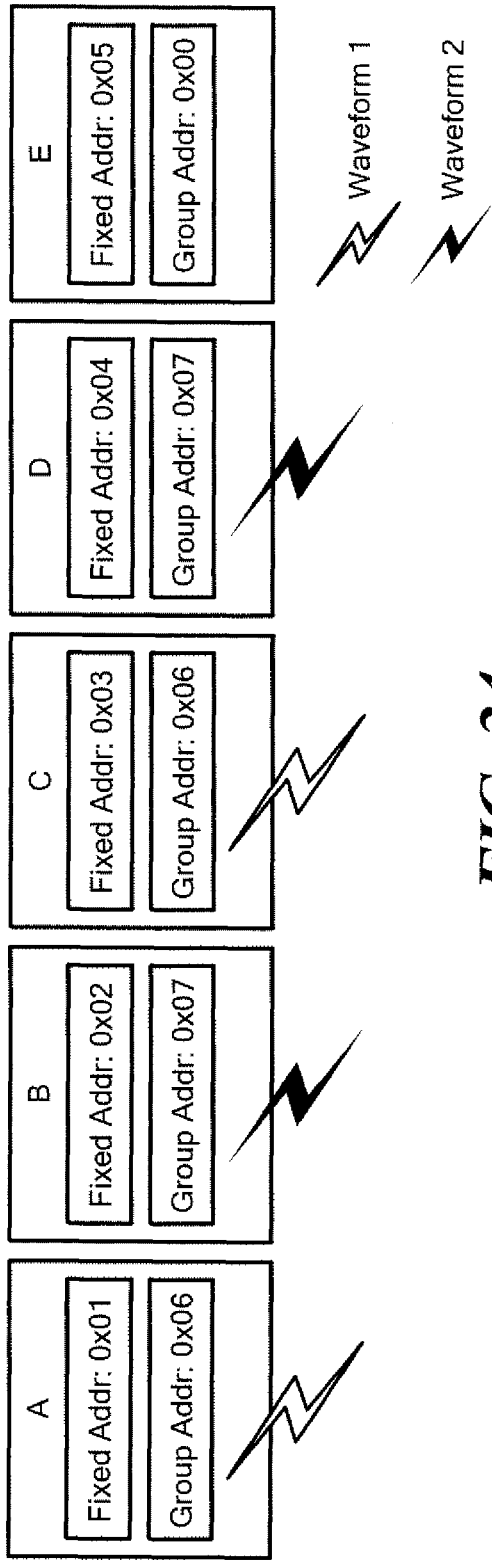
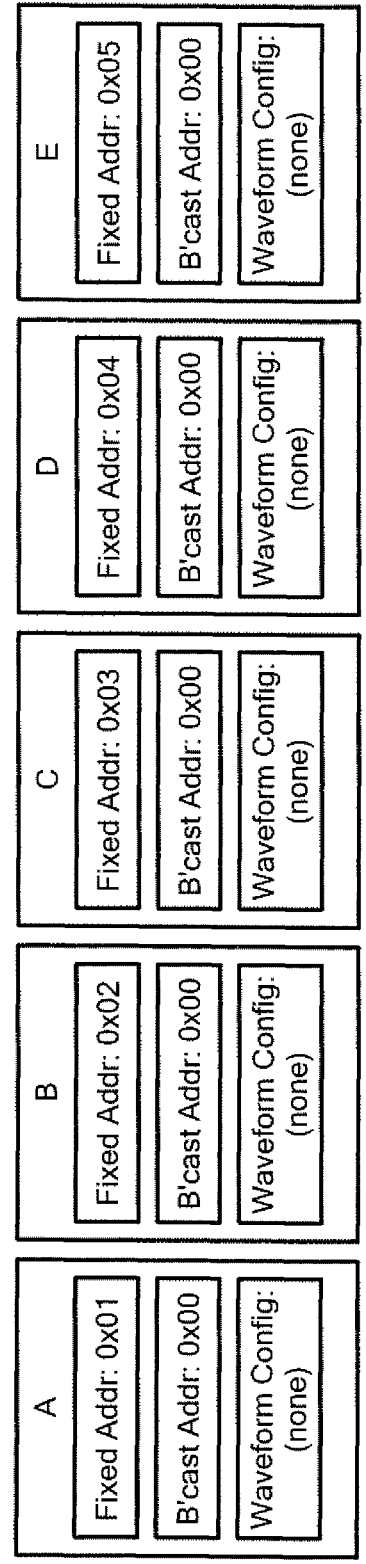
FIG. 24
FIG. 25

BUSSED HAPTIC ACTUATOR SYSTEM AND METHOD

RELATED APPLICATIONS

This application claims benefit of and priority to U.S. Provisional Application Ser. Nos. 61/939,328 filed Feb. 13, 2014 and 61/939,331 filed Feb. 13, 2014 under 35 U.S.C. §§119, 120, 363, 365, and 37 C.F.R. §1.55 and §1.78 both of which are incorporated herein by reference.

FIELD OF THE INVENTION

This invention relates to haptic actuators.

BACKGROUND OF THE INVENTION

Haptic actuators provide tactile feedback to the user/wearer. In one example, a tactile actuator or "tactor" vibrates a piezoelectric beam to touch the wearer's body. It is hoped that haptic actuators may soon be used to remotely signal and/or command personnel such as military personnel in the field.

Haptic display systems incorporating multiple actuators in an array (vest, garment, seatback, or distributed throughout a handheld device, etc.) driven in a controlled sequence via one or more serially-connected (shift-register-like) elements, referred to as MUXes, for demultiplexing a serial data stream into individual tactor control signals, are known in the art. This approach presents several drawbacks, however. The serially-connected elements create a point of failure in which any actuator positioned downstream of the failure (for example, a broken wire) would cease functioning. This approach also calls for a higher number of wires, since both sequencing data and actuation voltage/waveform must be separately conveyed. This is exacerbated if multiple drive waveforms are required concurrently by different tactors or tactor groups.

Importantly, typical electroactive actuator materials require voltages substantially higher than those typically present in a battery-powered, wearable or handheld system. For example, a typical handheld device may operate from a 3.7 volt rechargeable lithium battery and various subsystems may operate at still lower voltages (1.8, 3.3V). The typical electroactive material requires voltages of 50V or greater (for example, piezoelectric actuators) or even exceeding 1,000V (for example, electroactive polymers).

The presence of such high voltages in the system may present a safety hazard or regulatory hurdles in some market segments. For example, 50 Vp-p is a threshold at which voltages used in a medical device are subject to extra scrutiny and the step-up in regulatory difficulty and IRB approval effort may render a device cost-prohibitive to market or a human trial too expensive to perform. This may be especially true if such voltages must cross the human body and especially the heart, for example, in a wearable haptic vest or other garment. By constraining the presence of electroactive drive voltages to a minimal area and containing said voltages within a self-contained or sealed unit, the safety and regulatory concerns may be reduced or eliminated.

SUMMARY OF THE INVENTION

Herein, an electroactive actuator is described. In some cases a specific electroactive technology is described or shown. But, the electroactive element can comprise any actuator capable of generating displacement such as a voice coil and diaphragm (e.g. a speaker), piezoelectric element, electroactive polymer, shape memory alloy, electrostrictive, electrowetting, graphemic, magnetostrictive material and the like.

Certain methods include a voltage boosting means which makes them ideally suited for electroactive actuator types requiring a drive voltage greater than the 3.3-3.7 volts typically available from the battery in a common rechargeable device such as a cell phone, PDA, and the like.

In one proposed approach, one or more individually controlled electroactive haptic actuator elements ("bussed tactors") are disposed in a protective enclosure together with a control/sequencing logic circuit, a waveform generation circuit, a voltage conversion circuit, and a drive voltage modulation circuit (e.g., amplifier) responsive to the waveform generation and logic circuits. This set of circuits may be collectively referred to as the "slave control subsystem", or slave. The logic circuit (typically a microprocessor with embedded software and peripherals such as PWM generators, timers, and bus interface logic for bus protocols such as I2C or CAN) is connected to a low conductor count interface (the "bus") for conveying power and data from a second logic device (typically referred to as the "host" or "master control subsystem", and typically including a microprocessor) and is configured to receive and respond to command data from the bus. Said command data would generally include data transmissions bearing an ID field and a data payload. The payload typically comprises a configuration parameter or command directed at a specific device ID on the bus. Each bussed tactor unit would likewise be configured to respond to at least one locally-unique ID (address) on the bus. In one preferred embodiment, the bussed tactor would further include a memory for storing waveform data ("wave table") comprising at least one preprogrammed waveform and would ideally further include a rewritable memory for storing at least one user-defined waveform whose data is transferred via a bus command. Ideally, the logic circuit would include a feature for responding to a plurality of bus addresses or for dynamically modifying at least one bus address to which it responds (see "group addressing"/"soft addressing", below). Finally, one preferred embodiment includes an electroactive actuator material which has itself been packaged in a protective skin. See for example, U.S. Pat. Nos. 5,656,882; 5,687,462; 6,069,433; 6,198,206; 6,359,371; 6,376,867; 6,420,819; and pending application Ser. Nos. 09/300,137; 09/837,773; 10/047,199 all incorporated herein by this reference. The aforementioned electronics may be embedded right on or in the actuator packaging.

Typical bus devices such as off-the-shelf bus slave ICs are manufactured with a single preprogrammed address or (at best) can select from a very small number of predefined addresses by driving one or more address select pins on the device high or low. This is suboptimal due to the low number of selectable addresses relative to the total address space (limiting the number of such devices that can be used on a single bus), the need for extra pins and their associated electrical connections, and the overhead of setting a unique address for each device via pin configuration. A better approach is to allow the address of each device to be configured in such a way as to utilize the entire address space to avoid or resolve address conflicts, and to reduce pin-count by eliminating address select pins.

User safety is improved by constraining any high-voltage generation to within the protective packaging. Other benefits include a minimized wire count (reliability, flexibility and cost improvement), reduced single failure-points such as serially-connected multiplexers, reduced EMI signature by avoiding the transmission of signals across the body over the full duration of the message, and reduced snoopability by minimizing and time-distributing the data comprising the total tactile message (i.e., commands can be uploaded to bussed elements in arbitrary order and well before the time the message is actually presented and certain details such as waveshape and other signal parameters may be carried over from previous messages rather than retransmitted).

Optional address grouping features, described below, reduce the amount of bus traffic needed to fully specify a multiactuator haptic pattern thus allowing more actuators to be controlled, or controlled more quickly, on the same bus. Optional address conflict resolution features reduce assembly costs by allowing serialized devices (or devices otherwise containing locally unique data) to be connected to the same bus arbitrarily without regard for possible address duplication on the bus.

Recently, an integrated circuit (Texas Instruments DRV2667) intended for driving haptic actuators has been released which implements the I2C bus protocol and which incorporates a 7-bit address field. The driver includes control logic, waveform generation, voltage conversion and amplification features on a single chip. However, the design of this device responds only to a single, predefined address. There is no facility for incorporating multiple such devices on a bus and controlling them individually (even via a simple address-select pin), let alone defining and controlling groups of such devices, or synchronously activating a desired subset of devices on a common bus. The device also consumes power during the entirety of its output waveforms. There is no facility to passively control the actuator position during a "downward" portion of the output waveform (i.e., returning to the actuator's desired resting position) such as by transferring packets of charge on the actuator to ground, nor for recovering energy during such return strokes.

Featured is a bussed haptic actuator system comprising a plurality of haptic actuators each including a memory with an address storable therein and a slave controller subsystem configured to control the actuator in response to a received command signal including the correct address. A master control subsystem is connected via a bus to the plurality of haptic actuators. The master includes a sequencer configured to determine which of the plurality of haptic actuators are to be activated and logic configured to provide, on the bus, a command signal including one or more addresses corresponding to the haptic actuators to be activated as determined by the sequencer.

Each haptic actuator preferably includes a step up converter for increasing a bus voltage to a higher voltage to activate the haptic actuator. The bus may have a low voltage applied thereto and each step up converter is configured to increase the low voltage to a high voltage sufficient to activate the haptic actuator in response to a command signal from the master control subsystem logic.

In one example, a command signal is an activate command and the slave controller subsystem is configured to activate an addressed haptic actuator in response to the activate command using the step up converter high voltage. The master control subsystem may be further configured to synchronously activate a plurality of actuators according to a predetermined sequence. In another example a command signal includes a setup command and the slave controller subsystem functions to store, in an addressed haptic actuator, a configuration parameter provided by the master control subsystem. One command signal includes a time dependent activation command and the slave controller subsystem is then configured to automatically activate an addressed haptic actuator according to a stored configuration after a preset time period. In another example, a later command signal is configured as an activation signal provided on the bus by the master control subsystem and the slave controller subsystem is further configured to automatically activate an addressed haptic actuator according to its stored configuration upon receipt of the later command signal.

The master control subsystem logic may be configured to provide a group address to a plurality of haptic actuators and the slave controller subsystem of each haptic actuator is then configured to store the group address. In this way, the master control subsystem is configured to provide, on the bus, a command signal for the group addressed haptic actuators. The master control subsystem logic may also be configured to reassign one or more haptic actuators stored addresses. Typically, an address is preprogrammed into each haptic actuator memory. The master control subsystem logic may be configured to poll each haptic actuator for its address and to reassign any conflicting preprogrammed addresses.

In one version, each haptic actuator includes an electroactive actuator having a resonant frequency, a bumper on the electroactive actuator, a housing for the electroactive actuator, and a window in the housing for the bumper to protrude therethrough. In one version, the electroactive actuator is a piezoelectric member.

The window may be configured to limit the displacement of the actuator. A window displacement limiter associated with the housing may be configured to reduce strain on the piezoelectric actuator and to limit full displacement of the piezoelectric actuator when driven at or near its resonant frequency. The displacement limiter may be the bottom edge of the window positioned to limit displacement of the piezoelectric actuator to a value less than its full displacement and to vibrate the housing. The displacement limiter preferably provides a uniform peak displacement output for a broader range of frequencies near resonance.

In one design, the haptic actuator includes a first actuating element having a first bumper and a second actuator having a second bumper. The first actuating element has a first resonant frequency and the second actuating element preferably has a second resonant frequency different from the first resonant frequency.

The haptic actuators may further include an energy recovery circuit. The system may further include an actuator health monitoring subsystem. In one example, an actuator is driven with a known drive signal and actuator deflection is compared to a predetermined value for the drive signal. The system may be configured to modify an actuation parameter relating to the actuator responsive to the comparison.

Also featured is a bussed haptic actuator system comprising a low voltage bus and a plurality of haptic actuators on the bus. Each slave actuator includes a memory with a unique address storable therein a voltage boost circuit configured to boost the low voltage on the bus to a high voltage, and a slave controller subsystem configured to activate the actuator using the high voltage in response to a received command signal including said unique address. A master control subsystem is connected via the bus to the plurality of haptic actuators and is configured to provide, on the bus, a command signal including one or more addresses corresponding to haptic actuators to be activated.

Also featured is a bussed haptic actuator method comprising storing, in an on-board memory, a unique address for each of a plurality of haptic actuators interconnected via a bus and determining which of the plurality of haptic actuators are to be activated. A command signal is provided on the bus and includes one or more addresses corresponding to haptic actuators to be activated as so determined. An actuator is activated in response to a received command signal if the command signal includes the unique address for that actuator. The method may further include increasing the bus voltage to a higher voltage to activate a haptic actuator. Preferably, the bus has a low voltage applied thereto and each haptic actuator is configured to increase the bus low voltage to a high voltage sufficient to activate the haptic actuator in response to a command signal.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 24 is a schematic view showing how different haptic actuators sharing different group addresses receive different command signals;

FIG. 25 is a schematic view showing a plurality of haptic actuators each having a unique address, a common broadcast address, and a configuration memory with configuration data storable therein.

DETAILED DESCRIPTION OF THE INVENTION

Figure 1:
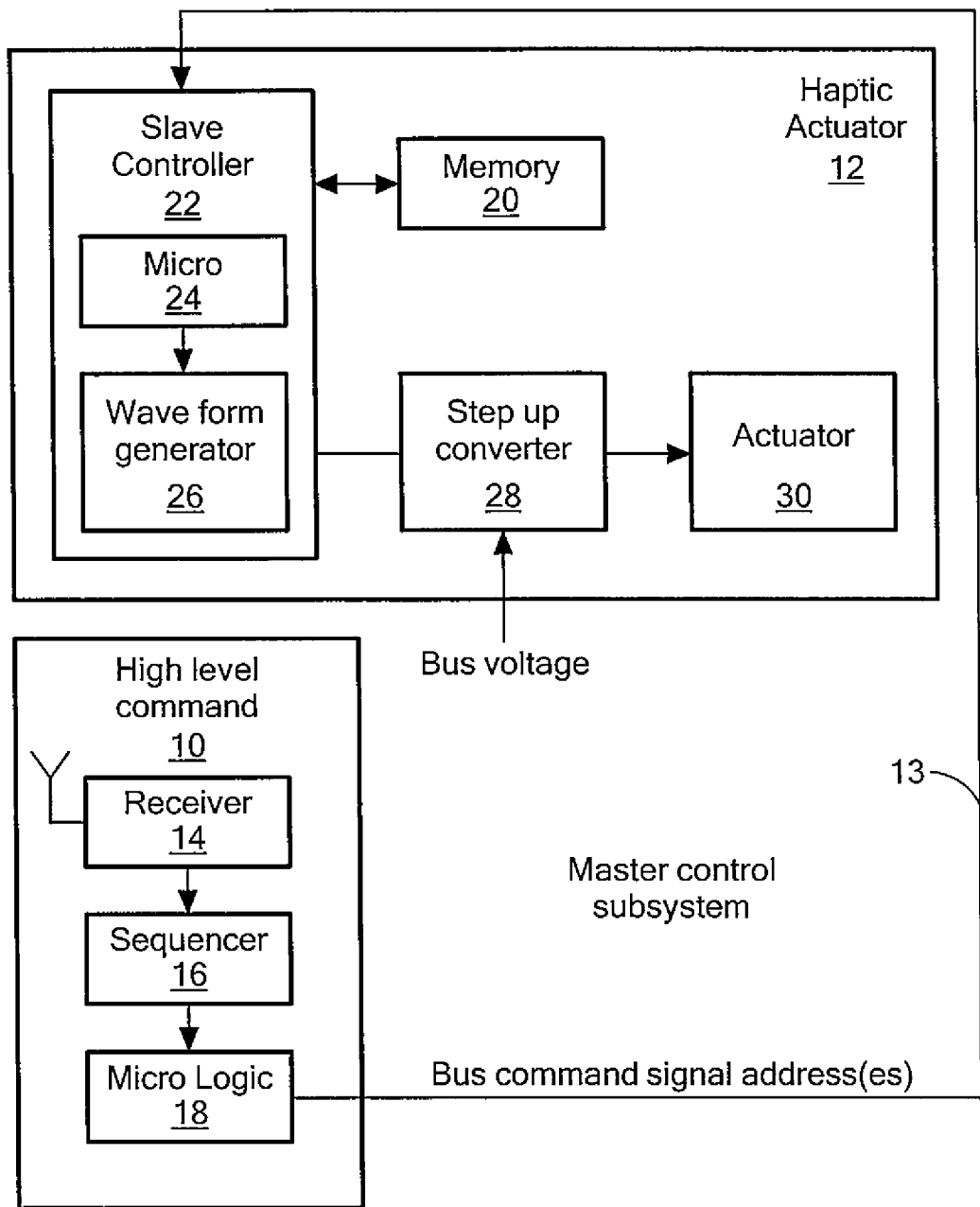
FIG. 1 is a block diagram showing the primary components associated with an example of a bussed haptic actuator system in accordance with the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

In one example, master control subsystem 10, FIG. 1 is connected to a plurality of haptic actuators such as haptic actuator 12 via a bus 13 architecture (e.g., IC2, SPI) as shown in FIG. 1. The bussed haptic actuator system 11, FIG. 2 may be incorporated, for example, in a product (e.g., a portable electronic device such as a smart phone) or in a garment where tactors $12a$-$12d$, for example, run along the right arm, tactors $12e$-$12h$ run along the left arm, tactors $12i$-$12l$ run along the right leg, and tactors $12m$-$12p$ run along the left leg. The tactors can also be organized in a discrete tightly packed array located, for instance, on the hand (much like an active braille display) or on the abdomen/back to create a tactile "display".

A high level command from a host may be received by receiver 14 of master control subsystem 10, FIG. 1 using, for example, wireless communications. In one example, a high level command used in a military operation might be for a soldier being monitored in the field to turn left.

Figure 2:
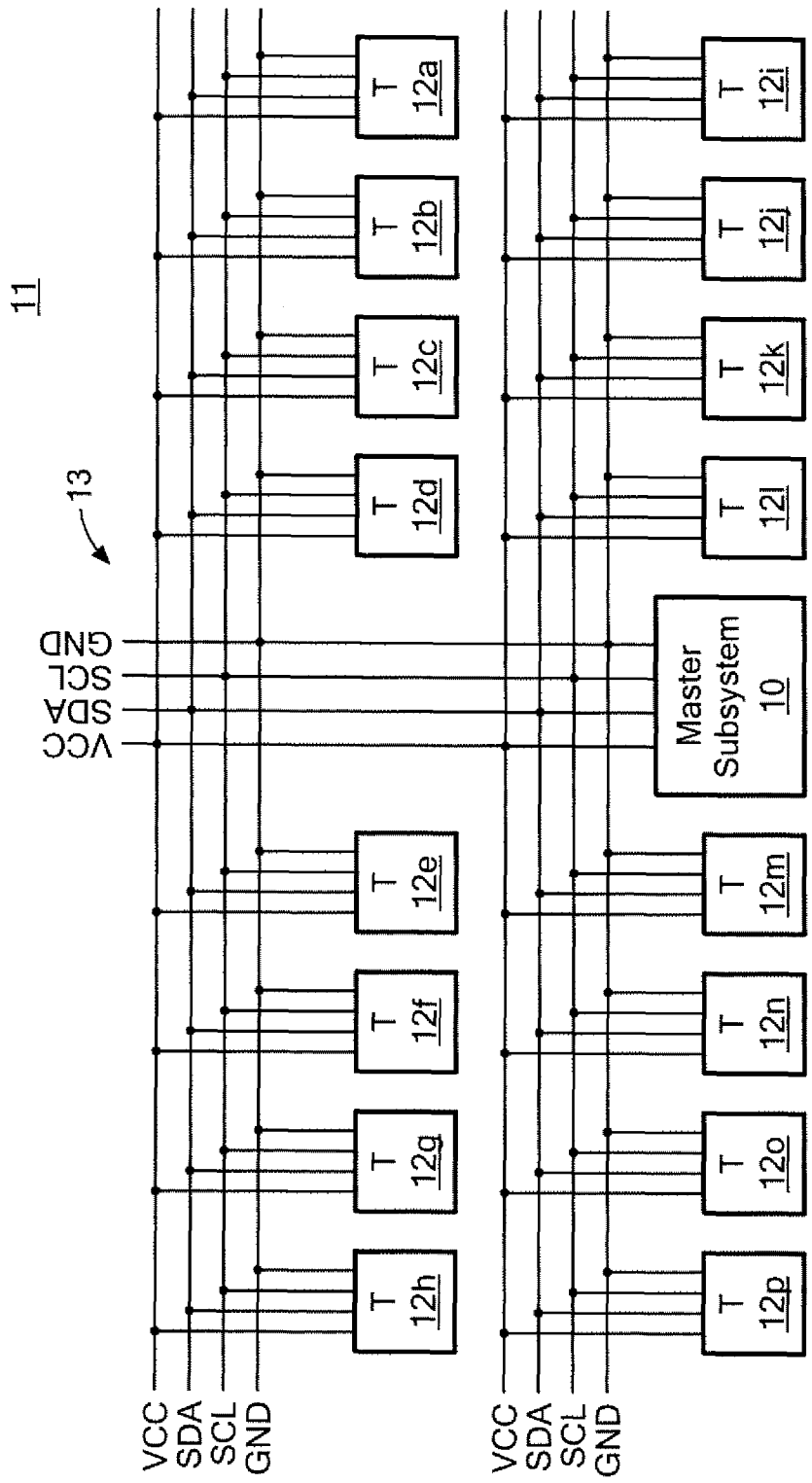
FIG. 2 is a schematic block diagram showing the master control subsystem of FIG. 1 connected via a bus to a plurality of haptic actuators.
Figures 3, 4:
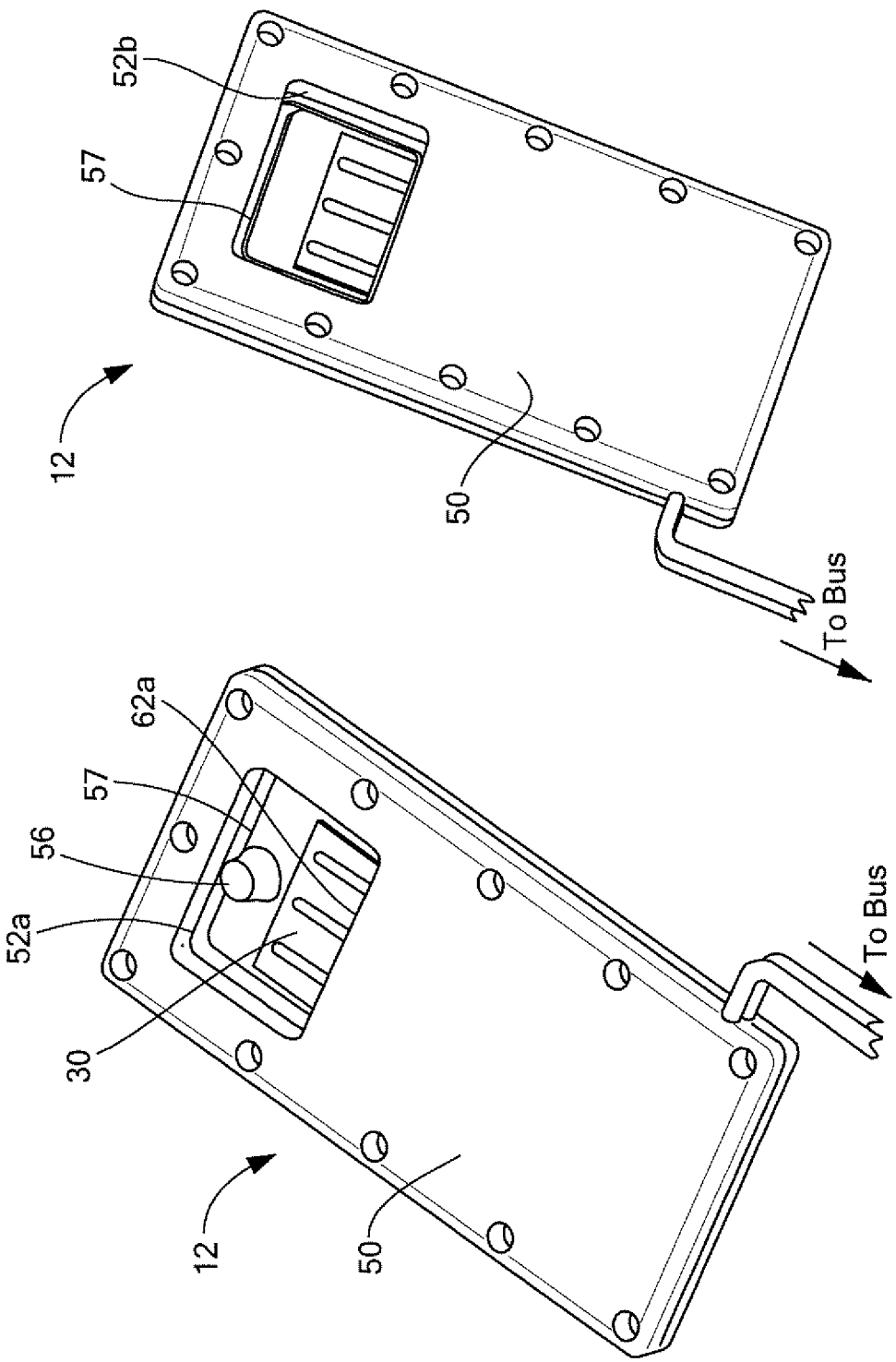
FIG. 3 is schematic top view of one example of a haptic actuator package.
FIG. 4 is a schematic rear view of the haptic actuator package of FIG. 3.

Sequencer 16 (e.g., a software program operating on a microprocessor) is configured to determine which of the plurality of haptic actuators $12a$-$12p$, FIG. 2, are to be activated based on a received high level command. For example, the high level command "turn left", may result in haptic actuators $12e$-$12h$ and $12m$-$12p$ activated in a timed sequence while haptic actuators $12a$-$12d$ and $12i$-$12l$ are not activated. A "look left" command might be the simultaneous activation of actuators $12e$-$12h$. These are examples only and typically sequencer 16 refers to a stored library including activation sequences corresponding to different high level commands.

The high level commands may originate from a squad leader using a laptop computer, tablet, or smart phone. It may be transmitted wirelessly to the soldier carrying a smart phone and then retransmitted via wireless communications (e.g. Bluetooth) to receiver 14 of master control subsystem 10. But, the components of master control subsystem 10 could be distributed amongst a plurality of devices.

Sequencer program or module 16 (operating on a microprocessor, application specific integrated circuit, field programmable gate array, or similar logic device) determines which of the plurality of haptic actuators are to be activated, how, and when based on the high level command. Logic module 18, which may be a part of the same logic device as sequencer 16 (or which may operate on its own microprocessor, application specific integrated circuit, field programmable gate array, or similar logic device), operates to configure the output of the sequencer for transmission over the bus and transmits over the bus a command signal including one or more addresses of haptic actuators to be controlled. The logic of this module is thus configured to provide command signals on the bus to those haptic actuators to be activated as determined by the sequencer.

Each haptic actuator 12 preferably includes a memory 20 for storing therein a unique address. Also stored in memory 20 may be various predetermined waveforms. For example, master control subsystem 10 may issue a bus command signal including an address "123" corresponding to haptic actuator $12i$, FIG. 2 and the waveform identifier "X124". The slave controller subsystem 22 of the haptic actuator receives such a command signal and notes that the address 123 is stored in memory 20. If memory 20 was configured to a different address, microprocessor 24 would ignore the bus command signal. The logic of microprocessor 24 is configured to control actuator 30 (e.g., a piezoelectric beam) in response to a received command signal including the address of that haptic actuator. In this example, the waveform identifier "X124" corresponds, in memory 20, to a 100 msec, 100 Hz sine wave and microprocessor 24 signals waveform generator circuitry 26 to generate such a waveform. In other examples, the bus command signal provided by logic 18 includes the waveform information itself (e.g., 100 Hz sine wave and lasting 100 msec).

For safety and/or wearability, it is preferred that the bus voltage be low (e.g., less than 15 volts) and that each haptic actuator includes a voltage step-up converter 28 to appropriately drive actuator 30 at a higher voltage based on the output of waveform generator 26. Each actuator may be driven using voltages ranging from 25 to 1000 volts. The power for the system may be provided by a lithium ion battery or similar power source.

The bus command signals provided by master control subsystem 10 are not limited to actuator drive signals. As noted herein, set up commands, group addressing, soft addressing, address polling, and the like are possible commands generated by the microprocessor logic 18 of the master control subsystem 10.

One exemplary haptic actuator 12, FIG. 3-6 includes plastic housing 50 with top surface 52*a* and bottom surface 52*b* windows. An electroactive (e.g., piezoelectric) actuator 30 includes distal end 57 and one or more side thereof which preferably protrude through the window 52*a* at least when the actuator is activated to contact the wearers' skin.

Figure 6:
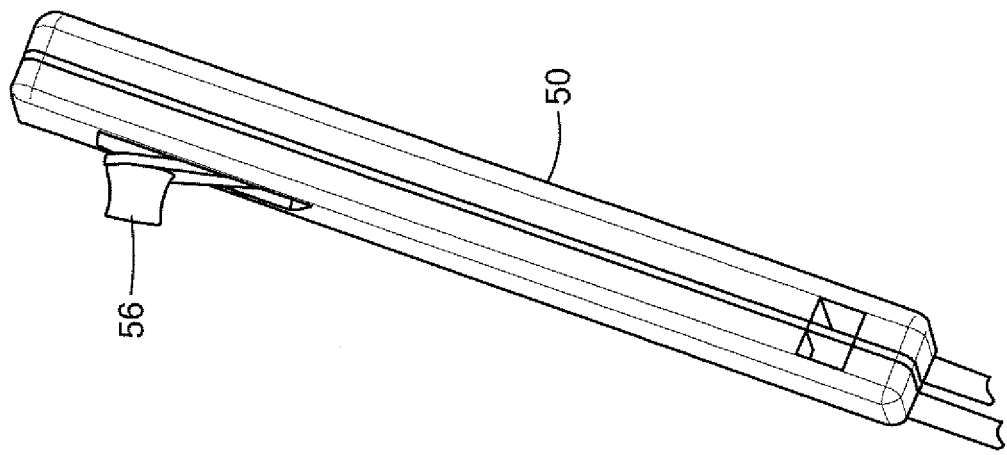
FIG. 6 is a schematic side view of the haptic actuator shown in FIG. 5.
Figure 5:
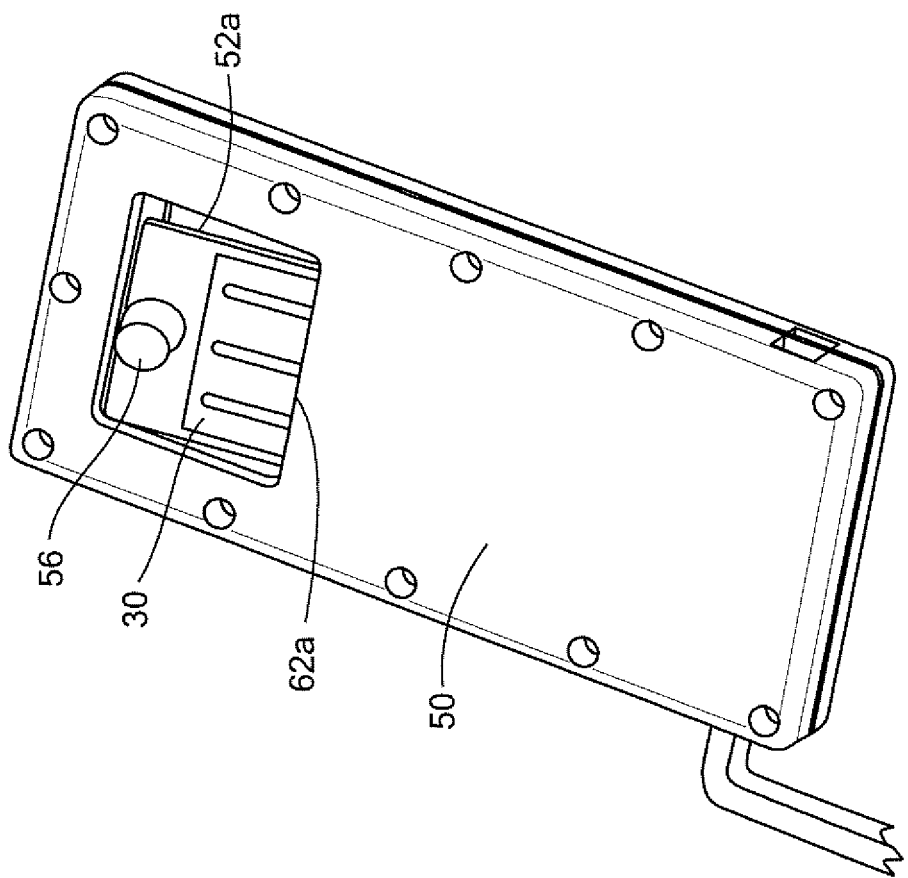
FIG. 5 is a schematic top view showing the haptic actuator of FIGS. 3-4 with the bumper thereof protruding through the package window.
Figure 7:
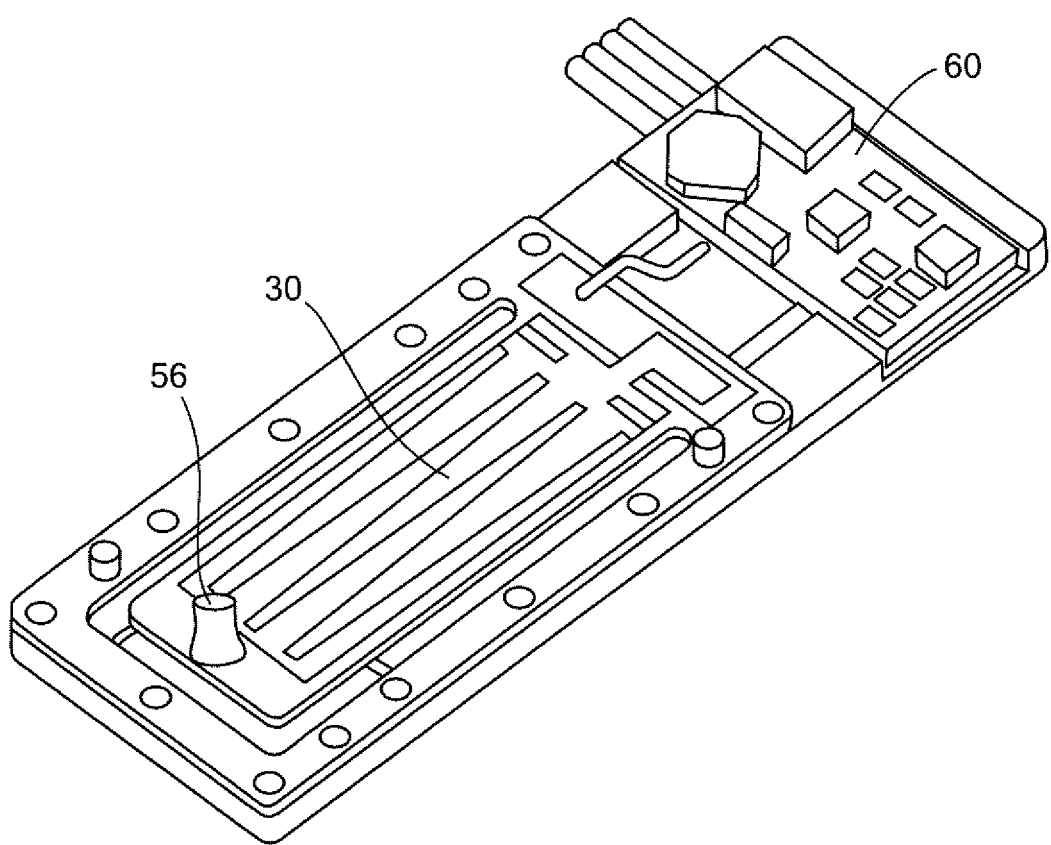
FIG. 7 is a schematic top view showing the internal components of a packaged haptic actuator with a printed circuit board for the slave controller electronics.

Piezoelectric actuator 30 is preferably tuned to a particular resonant frequency such as 250 Hz for a response of the skin pacinian corpuscles. Drive electronic section 60, FIG. 7 is configured to drive piezoelectric actuator 30 at its resonant frequency, for example, via a voltage signal at or near 250 Hz in short bursts. The tactile actuators are not limited to be driven at their resonant frequency, and can operate at off peak frequencies with lower but often still salient amplitude. Drive electronics section 60 preferably includes slave controller 22, FIG. 1, memory 20, and converter 28. Piezoelectric actuator 30 deflects as shown in FIGS. 5-6 with bumper 56 (made e.g., of rubber) at or proximate to the distal end of the cantilevered piezoelectric actuator. Bumper 56 protrudes through window 52*a* and out of housing 50 when the actuator bends and acts as a skin indentation portion or stimulator.

Housing 50 protects the piezoelectric actuator and its electronics section and provides a low profile package which may be combined with like tactors in a haptic display (e.g., a belt or wrist band). Housing 50 also protects the wearer against voltages provided by the electronic section.

Housing 50 may also function to limit the full deflection of the piezoelectric actuator when driven at its resonant frequency and thus limits strain on the piezoelectric actuator and prevents damage thereto and/or failure thereof. Housing 50 includes or is configured with a displacement limiter which, in this example, includes the lower edge 62*a*, FIG. 3 of window 52*a* which is stricken by the piezoelectric actuator when piezoelectric actuator is driven which, in turn, causes plastic housing 50 to vibrate for an additional mode of stimulation supplementing the skin indentation stimulation provided by bumper. In one example, the case limits the actuator to 600 µ-strain.

Figure 8:
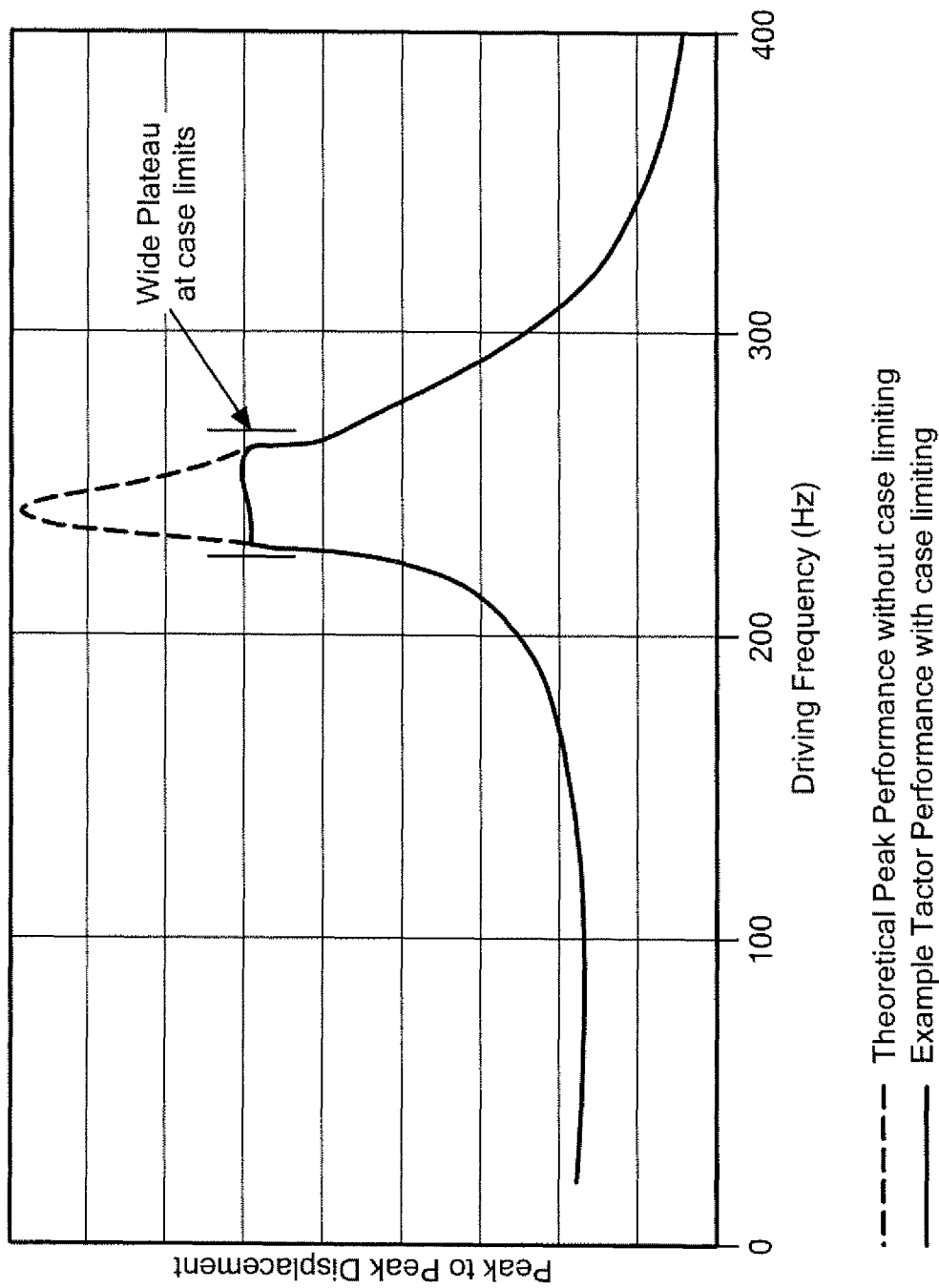
FIG. 8 is a graph showing displacement versus driving frequency for an example of a haptic actuator with a mechanical limiter in accordance with the invention.

The case is designed to mechanically limit the motion of the piezo so that it is not over driven. Case limiting also causes a wide plateau in performance and consistent output at frequencies near resonance a shown in FIG. 8. The plateau reduces the theoretical peak displacement capable by the piezo actuator; however, the plateau is beneficial in that it represents a wider frequency range near resonance with consistent output.

In some designs, rear window 52*b*, is also provided to allow rearward deflection of the piezoelectric actuator with respect to the housing. In some instances there is no bumper and a tip mass is added to create a purely inertial actuator which vibrates the enclosure only as the mass doesn't touch the skin. A tip mass can also be used to adjust the natural frequency of the device (with or without bumper). If a bumper is used, the tip mass will be on the backside of the cantilever. Tip masses can be on either side of the bumper. Dropping the natural frequency can be used to stimulate a different cutaneous touch receptor, for instance the Meissner corpuscle which is sensitive to vibrations in 30-50 Hz range.

Housing halves 50*a* and 50*b* with posts and sockets secure the housings halves together over piezoelectric actuator which may include edge section registration holes for properly registering piezoelectric actuator between housing halves. In this way, the housing portions can be injection molded using one mold to lower manufacturing costs. Assembly is also simplified in this manner. The other edge holes shown can be used to stitch the assembled housing to fabric as in a belt or in a band for example. Further, the various layers of the actuator may be engineered using the technology of U.S. Pat. Nos. 6,024,340; 6,069,443; 6,420,819; 6,781,285; and/or 6,404,107 all incorporated herein by this reference. The result is a rectangular, thin, low profile housing and a piezoelectric actuator with a fairly large displacement considering its small size and the small size of the housing.

Figure 9:
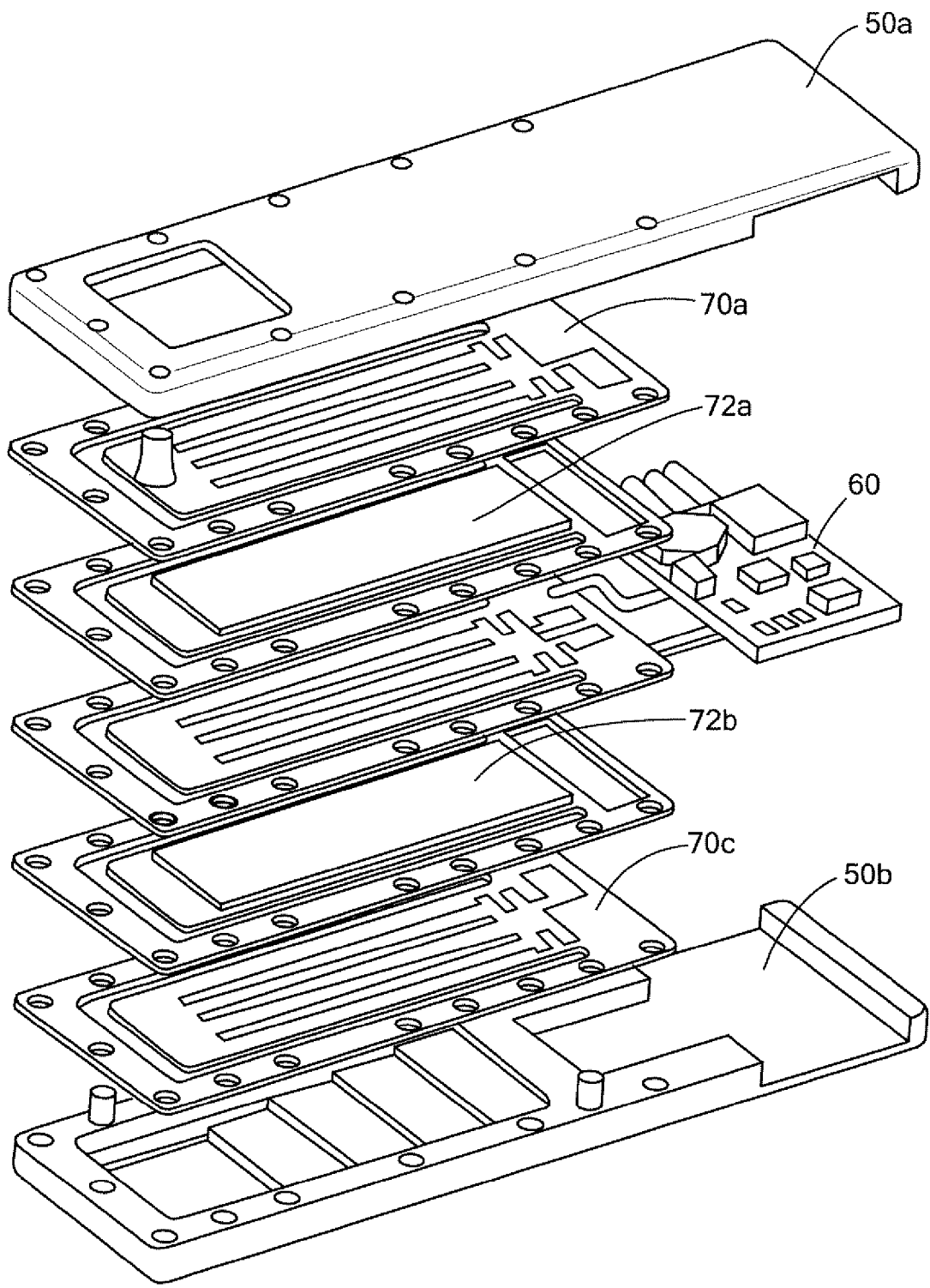
FIG. 9 is a schematic exploded view showing a haptic actuator package and the internal components thereof.

FIG. 9 shows the piezoelectric actuator before assembly where flex circuit layers 70*a* and 70*b* overlay piezoceramic material 72*a* and flex circuit layer 70*b* and 70*c* overlay piezoceramic material 72*b*. The flex circuit layers may be made of Kapton and include etched copper electrodes forming triangular points as shown. More piezoelectric elements and layers of flex circuit material may be used. The flex circuit layers protect and make electrical contact with the piezoelectric elements. The copper electrode layers incorporated into the piezoelectric flex circuit form three or more triangular points at shown to provide better stress distribution in the piezoelectric wafer material and also to aid in tuning the package's resonance to a predetermined frequency (such as 250 Hz). Choosing the size, location, and weight of the rubber bumper or an additional weight can also be used in tuning.

Figure 10:
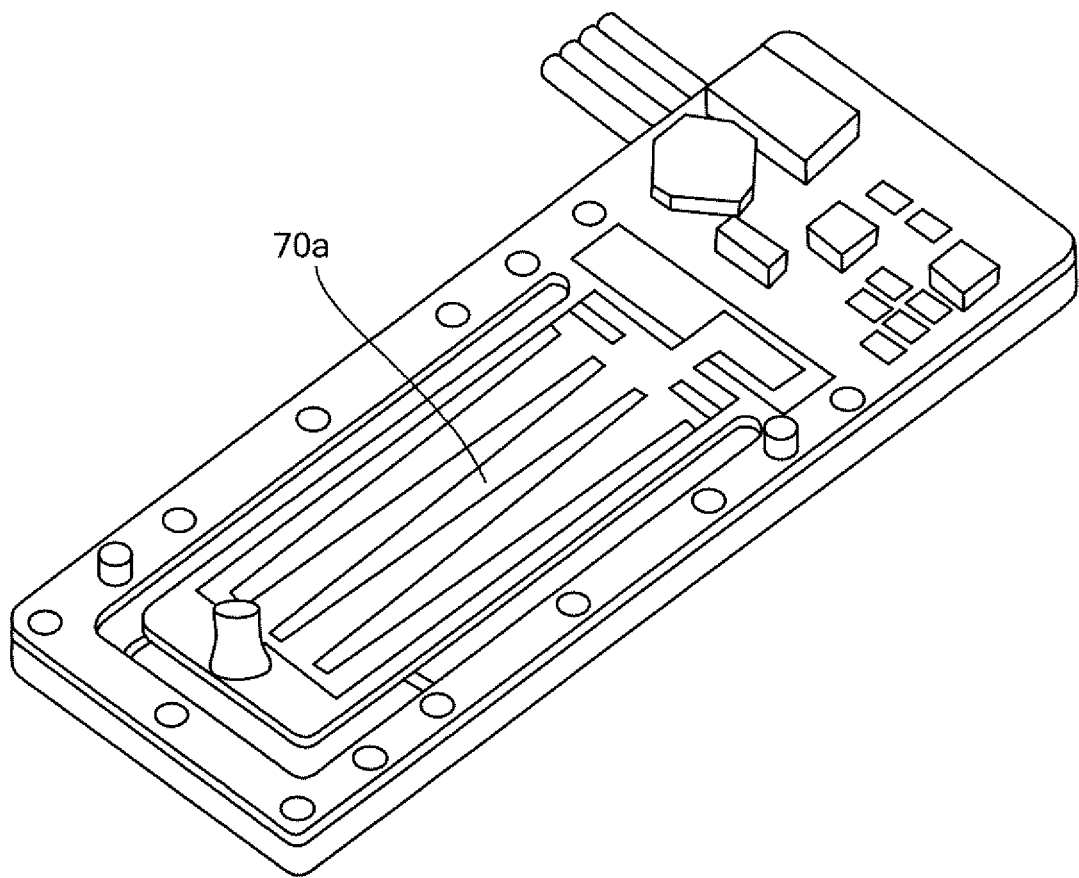
FIG. 10 is a schematic view showing another example of a haptic actuator with the slave controller electronics packaged with the flex circuit of the actuator.

In some designs, the drive electronics may include circuitry added to one or more flex circuit layers 70*a*, FIG. 10. In this way, driving an array of such tactors is simplified. Also, high voltages are not present at external interconnects. In other designs, a circuit driver is added within the housing in other ways such as by adding a small circuit board adhered to one housing portion wall.

Figure 11:
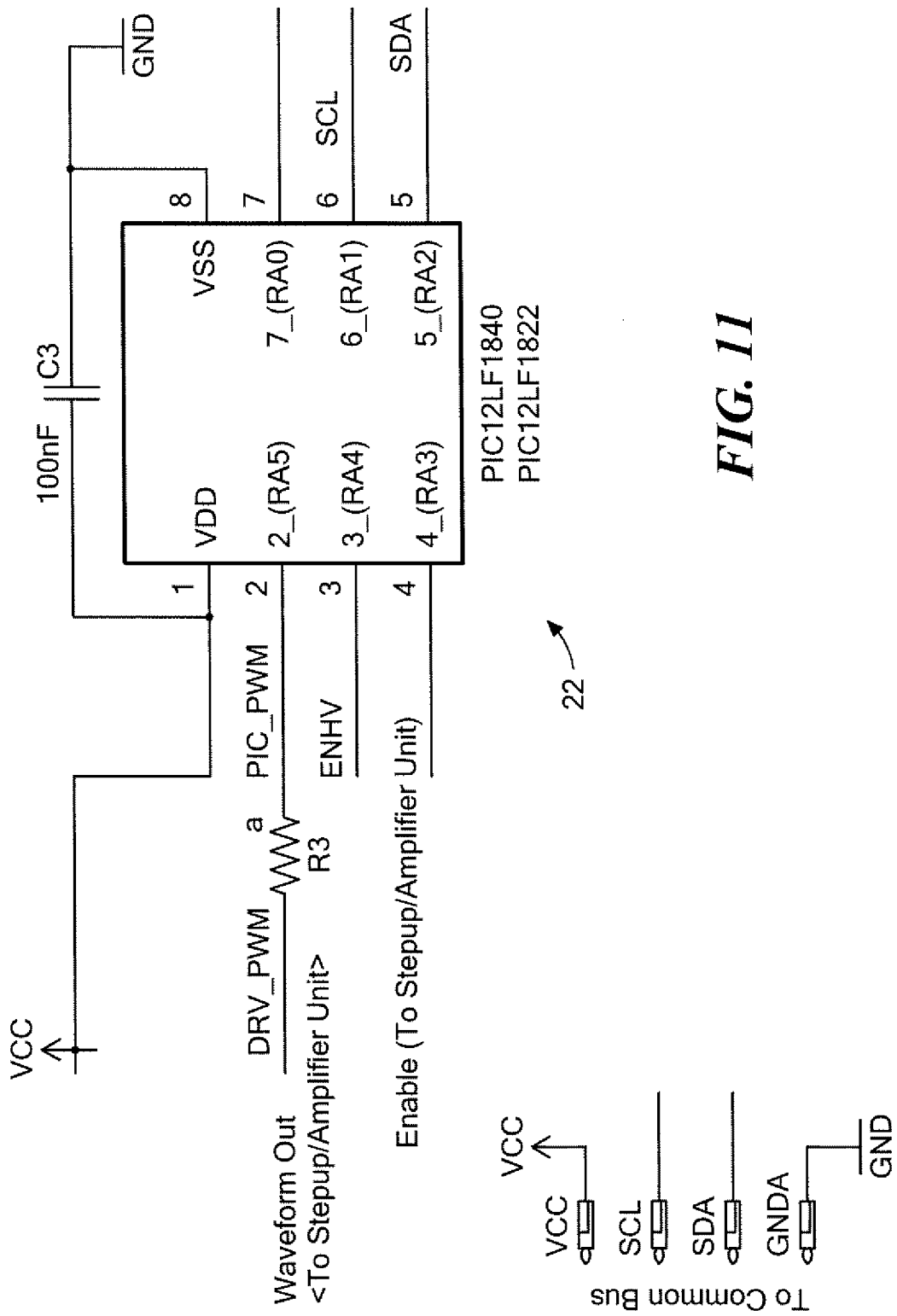
FIG. 11 is a schematic block diagram showing the onboard microprocessor for the haptic actuator shown in FIG. 1.
Figure 12:
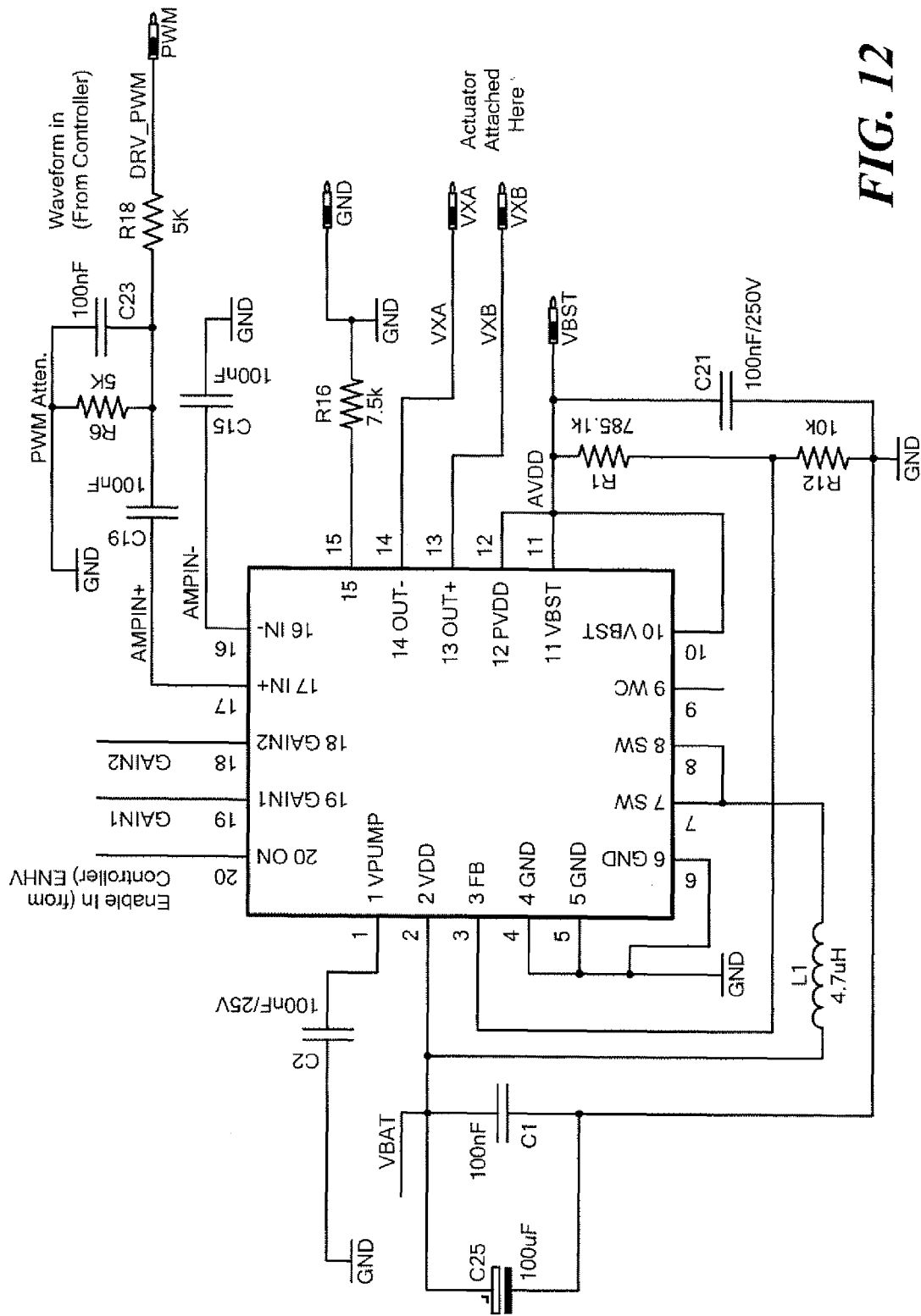
FIG. 12 is a schematic block diagram showing the primary components associated with the step up converter onboard the haptic actuator of FIG. 1.

FIG. 11 shows an example of slave controller 22 and FIG. 12 shows an example of step-up converter 28. In these diagrams slave controller 22 is comprised of a single microcontroller incorporating a connection to the bus, a memory 20, microprocessor 24, and waveform generator 26 of FIG. 1. Waveform generator 26 is implemented as a software component on microprocessor 24, optionally acting in concert with on-chip hardware peripherals such as a pulse-width modulator or digital-to-analog converter or timer, and optionally utilizing waveform data stored in memory 20. The output of waveform generator 26 is coupled to the input of step-up converter/amplifier 28 via the signal named DRV_PWM in this diagram, and controls the enablement state of step-up converter/amplifier 28 via the signal named ENHV, allowing the converter/amplifier to be shut down during periods of inactivity. The output of step-up converter/amplifier 28 is coupled to an actuator via the signals named VXA and VXB in the diagram.

Piezoelectric materials are brittle and susceptible to failure under handling loads. Packaging the piezoelectric materials as described provides numerous benefits for haptic actuator applications including easy electrical connection, protection of the user from high voltage levels, protection of the brittle material, protection against environmental factors including sweat and humidity, the ability to build easily manufactured arrays of haptic actuators. It is possible to create a single unitized array within the same flex packaging, and the ability to incorporate electronics right into the packaged actuator substrate.

Packaged electroactive electric haptic actuators enable direct-touch capability (actuator can make and break contact with the skin, or be non-contacting at rest). Testing has shown that this make/break action was reported to provide a distinctive and more localized feeling than a competing vibrotactile bump tactor in which the vibrating bump remained in permanent skin contact. This capability is enabled due to the large displacement made possible by a cantilevered packaged electroactive electric haptic actuator and the piezo actuator's ability to maintain static deflection while dissipating almost no power. Most tactors are only capable of small displacements and require constant power to maintain a set position, even statically.

Utilizing a skin-parallel actuating element makes the subject invention very low profile and capable of being integrated directly into clothing or accessories. The subject invention also features a thin and lightweight protective shell which both protects the piezoelectric actuator and creates more robust and consistent boundary conditions for consistent performance.

A force-concentrating feature (e.g., the small rubber bumper) both isolates the user from the electrical energy and also increases the tactile sensation the user feels, by concentrating and localizing the force. Electrical terminations (solder tabs) located beneath/inside the protective shell help make the piezoelectric actuator easier to connect to and more robust during operation. The tactile actuator includes a circuit with an integration of voltage drive and waveform generation electronics with packaged strain actuator; actuators addressable by unique ID or group ID.

The piezoelectric actuator may be optimized to have a natural frequency between 150 and 350 Hz (target value of 250 Hz with average skin loading applied) to match the human Pacinian corpuscle response. Pacinian corpuscles are nerve endings in the skin that are responsible for sensitivity to pressure and vibration. The corpuscles are particularly sensitive to vibrations around 250 Hz. The Pacinian corpuscle has a large receptive field on the skin allowing for the approximately 1 mm nerve ending to "pick up" vibrations that are centimeters away. The Pacinian corpuscles respond when the skin is rapidly indented but not during steady pressure. As noted above, the natural frequency of the actuator can be adjusted via adding tip mass to stimulate other cutaneous receptors (i.e., Meissner corpuscle (30-50 Hz). The design of the actuator itself can also be changed to match different natural frequencies, without adding tip mass Not adding tip mass (and/or relying on an inertial mode), but changing the overall piezo actuator design will keep the design lightweight.

It is highly desired that the stimulus felt by the user is concentrated at a single point rather than spread over the entire tactor package. For this reason, the proposed invention includes features which minimize the counter-motion of the tactor shell in response to actuation of the piezoelectric element inside. One of these is to design the tactor so that the actuating portion (piezo beam) of each complete tactor has a significantly lower mass than the non-actuating portion (shell) proximal to the skin. The mass of the inert counterpoise should be at least double that of the actuating portion. Since the piezo actuator does not depend entirely on its inertia to produce a sensation, it can be made very light without hurting performance. The other feature to minimize counter-motion of the tactor shell is to physically constrain its motion by having it bonded to a substrate. In this case, suitable substrate materials include the Kapton packaging between tactors (for multi-tactor arrays built as a single package) and the material of a wearable garment the tactors are attached to. These features ensure the user feels the tactile bump (point-source) rather than a broad-area vibrotactile effect from the casing. This also reduces audible noise.

Featured is a pack containing one or more electroactive haptic actuators, which may optionally be packaged using the packaged process (encapsulation with epoxy, polyimide, and spacer materials) in which a drive electronics circuit is embedded within the haptic actuator housing allowing the actuator to be driven by low-voltage digital electronics (e.g. TTL serial interface). The electronics may be disposed within the housing in a number of ways such as on a discrete circuit board, on the pack's own flex circuit, or fully encapsulated by the actuator assembly encapsulant. The drive electronics include of a step-up DC-DC converter receiving electrical power from a low voltage source (for example, less than 15 volts) and converting it to a high drive voltage (for example, greater than 245 volts, possibly exceeding 1,000 volts for some materials such as electroactive polymers), a microcontroller exposing a low voltage digital interface, the appropriate semiconductor switching topology for controlled unipolar or bipolar delivery of the actuator drive voltage to the actuator (e.g., a high-voltage H-bridge and appropriate filtering network).

The microcontroller ideally contains an appropriate hardware peripheral for driving the attached electroactive drive topology with an arbitrary waveform. This is most likely a hardware PWM peripheral, although the drive sequence may also include switching of software-controlled GPIO lines controlling the actuator drive circuitry. The microcontroller ideally contains a table of waveforms appropriate to the generation of various application-specific actuation effects. For a clamped actuator, these might include, for example, a sinusoidal waveform and a ramp waveform, the latter being either linear or smoothed near the start and end of actuation in order to avoid audible noise from an abrupt change in velocity. The internal waveform generation logic should have the ability to independently modulate the amplitude, frequency, and direction of waveform output (i.e. traverse the wave table in either forward or reverse direction, or select a pre-reversed copy of a waveform in the table) via software control. The most obvious implementations are a DDS (direct digital synthesis) approach using a fixed step frequency and a phase accumulator producing a variable step length across the wavetable, or a more memory-efficient approach using a variable step frequency and fixed step length (1) across the wavetable samples. The waveform generation logic may separately control both the step frequency and step length in order to broaden the range of actuation frequencies achievable from a given wavetable length and processor speed.

In addition to the aforementioned "canned" waveforms, the microcontroller may also have RAM sufficient to permit the user to upload and to control the playback of one or more arbitrary waveforms via the digital interface. Ideally, the interface facilitates the user uploading multiple custom waveforms prior to when they are needed and triggers them when needed via a unique identifier such as an index number. In an example embodiment, an index number, which may be sent to specify the waveform to be played during the next haptic actuation, embodies an index in an index space including of a list of one or more pre-programmed waveforms (stored in nonvolatile memory) and a list of one or more reserved indices referring to a waveform table storage area in volatile memory. For example, for a 1-byte index, the indexes 0 through 127 may refer to preprogrammed waveforms (or indices reserved for future waveform additions), while indexes 128 through 255 each point to a block of RAM in which a user-specified waveform may be stored.

The physical low-voltage interface exposed by the microcontroller may be hardware- or software-implemented allowing multiple interfaces to be provided by the same device. Ideal interfaces include SPI, I2C (incl. SMBus), or a "single-wire" protocol such as Dallas 1-Wire® and capable of operating at the native voltage of the product in which the actuator is used (common modern standards are 1.8V, 3.3V, and 5V).

In a preferred embodiment, the command set would include commands for choosing the next waveform to be played, setting waveform parameters (frequency, amplitude, direction, and for multiple-actuator packages, mapping of actuator by number to waveform source by number and controlling phase delay between the actuators), uploading custom waveforms, and triggering the actual playback of the waveform. Using separate commands for configuring parameters and triggering playback allows multiple devices to be independently configured but started simultaneously using a single command addressed to multiple actuators (e.g. general call or group address). It is recommended to also include commands for directly setting a static actuator voltage (corresponding to linear position for linear actuators), entering a power-save mode (shut down power-hungry components such as DC-DC converter), and setting address groups that can be used to trigger a specific set of actuators using a command containing a single destination address.

The packaged electroactive manufacturing process may require a high-temperature, high-pressure hydraulic pressing step which would easily damage unprotected electronics present during pressing. The physical packaging of the electronics into or onto the packaged electroactive would comprise either surface mount electronics applied to the flex tail ("chip-on-flex") after pressing the actuator or electronics enclosed within the stiffened actuator area by means of a specially-cut spacer with cutouts for each electronics package embedded into the pack which is taller than the tallest component to be embedded in the spacer and the electronics are placed prior to pressing. The exact nature of this cutout is not critical. For example, instead of cutouts for individual circuit components it may comprise a simple single cutout (such as a rectangular area) for the entire component area which may optionally contain one or more protrusions into the "hollow" area between component to minimize sagging of the top surface and/or a filler material or encapsulant other than air within the component area (e.g. silicone, conformal coatings, epoxy, etc.).

Figure 13:
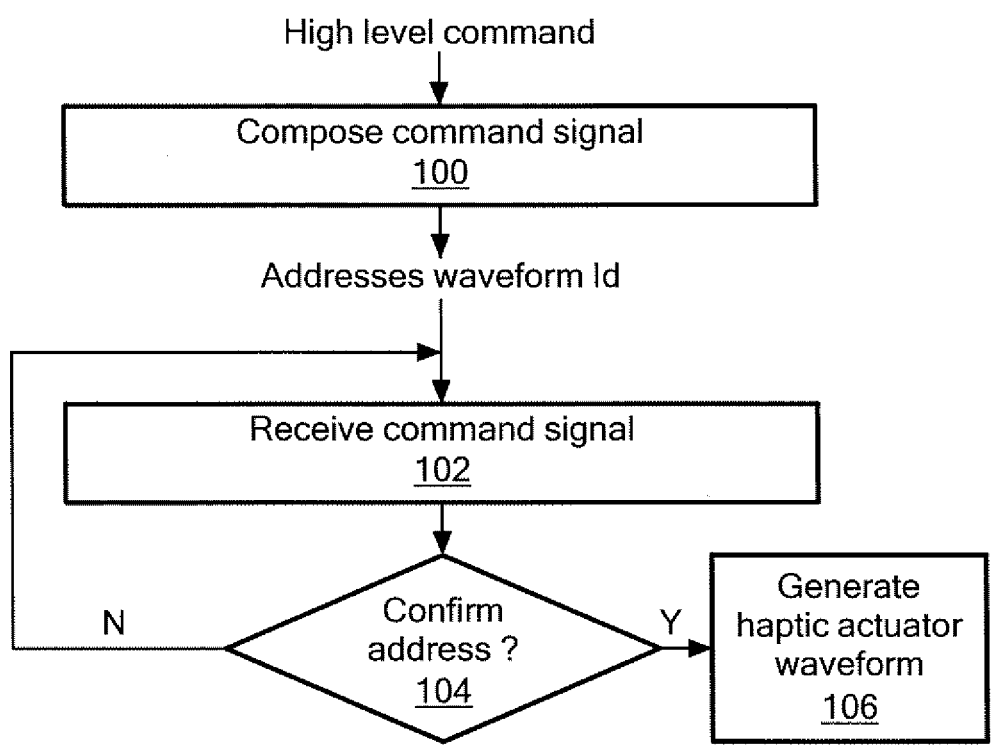
FIG. 13 is a flow chart depicting the basic operation of a bussed haptic actuator system in accordance with an example of the invention.

The result enables the host or master controller subsystem 10, FIG. 1 to receive a high level command and to compose a command signal, step 100, FIG. 13 for transmission on the bus to the haptic actuators connected thereto. Each such slave device receives the command signal, step 102, (e.g., an address or addresses and a waveform identifier) and confirms that an address so transmitted matches its current address, step 104. Where there is a match, the haptic actuator waveform generator generates a haptic actuator waveform to cause it to vibrate, step 106.

In a typical embodiment, a haptic actuator slave device includes a memory for storing a slave address, and is configured to compare the address in the bus command to the slave address stored in the memory, discarding the command if the address does not match (i.e. the command was intended for another device).

In one preferred embodiment, the bus master controller subsystem may issue a command to one or more slaves causing a temporary or permanent reassignment of that slave's address. The slave subsequently responds to the new address rather than the old one. In a typical embodiment of this feature, the new "soft" address would be stored in volatile memory (e.g. RAM) on the device and persist only until changed again or discarded in response to a subsequent command, device reset or loss of power. However the address could be stored in nonvolatile memory for future use. This reassignment feature would be used, for example, to resolve address conflicts, reduce the address space spanned by the slave devices (permitting a shorter address field to be used), or provide other beneficial features.

Additionally, group address assignments may be used to control multiple haptic actuator devices concurrently with reduced bus traffic. In this scenario, the bus master may issue a command to one or more slaves assigning it a temporary address, dubbed the "group address", which it responds to in addition to its own (hard or soft) address. The bus master may then control multiple slaves either in unison, by assigning the same group address to those slaves and sending commands to the group address, or individually, by sending commands to the standard address of the desired device. In more advanced scenarios, devices may be able to take on multiple group addresses concurrently, and/or respond to group addresses only for specific commands (for example, a command addressed to a broadcast or general call address bearing a group address as part of its payload). Again, such group address would nominally reside in the slave's RAM, but may be stored in nonvolatile memory for long-term use.

A synchronization mechanism is beneficial because on a typical bus, only one unit of unique configuration data can be sent at a time, and the transfer of this data takes a small, but non-zero amount of time. Perceivable delays or (for multi-actuator effects depending on phasing between actuators) phasing errors may occur if the setup of individual devices (or groups, etc.) for a single haptic effect takes a significant time (for example, there are a large number of bus devices requiring unique setup commands). To provide synchronous action among many such devices on a shared bus, the commanded actions should include the capability to defer the action until a separate command, addressing all such commanded devices at once, is issued. In a very simple embodiment, typical commands are effectively "setup" commands or otherwise predicated on priming the slave for a future action rather than performing that action immediately. After all desired synchronous-acting slaves are thusly primed, a separate activation ("go") command is sent to the desired group address or broadcast (general call) address, triggering the previously configured action. In a more advanced embodiment, commands may individually specify whether they are to be performed immediately or deferred until a later time or activation command. In each case, the configured actions may optionally include a time duration or a sequence of multiple steps including time durations, allowing the slave to operate somewhat autonomously while commands for future actions by itself or other devices are transmitted on the bus.

In an alternate embodiment, inclusion of such time duration data may be used in place of the above synchronization mechanisms. In this embodiment, a command to setup and activate a given actuator also includes a delay value, deferring the start of the activation by the specified amount. This amount would typically be equal to, or slightly longer than, the time needed to transfer the remaining commands to the remaining actuators. The delay value in the commands sent for each successive actuator would be decremented by the amount of time taken to transfer the previous command. Thus, when the command transfer time is taken into account, the remaining delay period for both actuators is approximately equal. This process would continue until commands for all synchronously-actuating actuators for the current haptic signal have been transferred. The delay values on each slave device expire at the same time and playback occurs synchronously. Again, if the setup commands comprise a sequence of multiple actuation events, the entire sequence will be synchronous across the actuators.

To individually control actuators or other devices in a bus architecture, each device typically must have a unique address. In many consumer device bus architectures such as I2C, where the bus is intended for a small number of devices, the address size (and thus address space) defined by the standard is correspondingly small, such as 1 byte or less. In I2C for example, the address is specified in a single byte and valid addresses are limited to the range 0x01~0x7F (one bit is reserved for a direction flag and address 0x00 is reserved as the "general call" address). This presents a difficulty for assembling many such mass-produced devices onto the same bus while ensuring unique addresses. A common method of address assignment is to serialize or otherwise uniquely identify the devices (e.g. via serial number or unique random value) when they are initially manufactured or programmed. The address is then derived from the unique value. When devices with such addresses are added to a shared bus, the chances of an address collision with another device rise rapidly (analogous to the well-known "birthday problem"). Even when the devices are strictly serialized, it is difficult to ensure that the devices would remain in address order through the programming, packaging, shipping and assembly processes.

Conversely, sequentially programming each device at the time of final assembly would add manufacturing complexity (labor/cost), a requirement for user-programmable memory on the device (such as Flash/EEPROM) and suitable programming pads or headers on the device, all of which may add size and/or cost.

A possible way to provide for unique addressing is as follows. This example uses the I2C bus for the purposes of discussion; the exact set of usable methods depends on the specifications of the bus standard in use, and such methods known in the art are incorporated here by reference.

As very brief background, an I2C bus includes two data lines (SDA and SCL) for signaling; these lines are weakly pulled up by pull-up resistors and thus idle high. Each of these signals can be selectively shorted to ground by a bus device to provide signaling on the bus. No device pulls the signals HIGH. Thus, multiple devices may simultaneously drive a LOW on the bus without the risk of damage or indeterminate bus voltages.

Upon startup, each slave haptic actuator device responds to a preprogrammed address (either fixed or derived from the lowest byte of a random/serial number, etc.). The master control subsystem initiates an address discovery phase, consisting of scanning the bus for active devices (e.g. sending a message to every possible ID, or to one or more fixed IDs if known, and checking for an acknowledgement, designated ACK), building a list of active addresses. At this point, each active address discovered may comprise one or more devices on the bus due to address conflicts. Next, an arbitration phase is initiated for each active address. Each active address is issued a command causing the addressed device(s) to respond conditionally to additional data in the command, this additional data nominally consisting of a second address byte or "sub-address"; the device responding affirmatively (ACK) only if the additional data (sub address), or an indicated portion thereof, matches the corresponding next byte (or indicated portion) of serialization data used to build its address. The process may be repeated for arbitrarily many bytes of sub-address data, effectively building and resolving a very large address space via subdivision search. The resulting device addresses may be referred to as their "full" or "extended" addresses. The large address space reduces the chance of an unresolvable address duplication to an acceptably low level.

To allow for faster access to all bus devices in the future, the master may use the extended addresses to assign unique short addresses to the bus devices. This reassignment may be performed for all devices, or only for devices whose standard address (e.g., in the case of the I2C protocol, the initial 7-bit bus address) conflicts with another device, such that the standard addresses are now unique. The reassigned addresses are then used for subsequent communications during a session. The reassigned addresses may optionally be committed to non-volatile memory on the slave devices for future use, if supported.

Features commonly present in other bus protocols include carrier-sense multiple access with collision avoidance (CSMA/CA), or similar randomized backoff-and-retry mechanisms, delaying tactics (such as I2C clock stretching), or other arbitration methods based on limits on how a given bus signal may be driven by a particular device (for example, may be driven low but not high). For example, the CAN Bus protocol uses a bitwise arbitration over the address field; the "dominant" (driven; logical 0) state overrides the "recessive" (undriven; logical 1) state; the device with the lower address wins arbitration. Bitwise arbitration can simplify the search for potentially conflicting addresses vs. a multi-step subdivision search.

Devices which win an arbitration process may be instructed by the master to temporarily exclude themselves from participation on the bus, allowing devices with an address conflict with that device to be separately identified and dealt with. Likewise, the random backoff-and-retry mechanism provided by some busses allows working around a bus conflict by allowing the master to retry until it is able to command a single of the conflicting devices (and e.g. order it temporarily offline).

Figure 14:
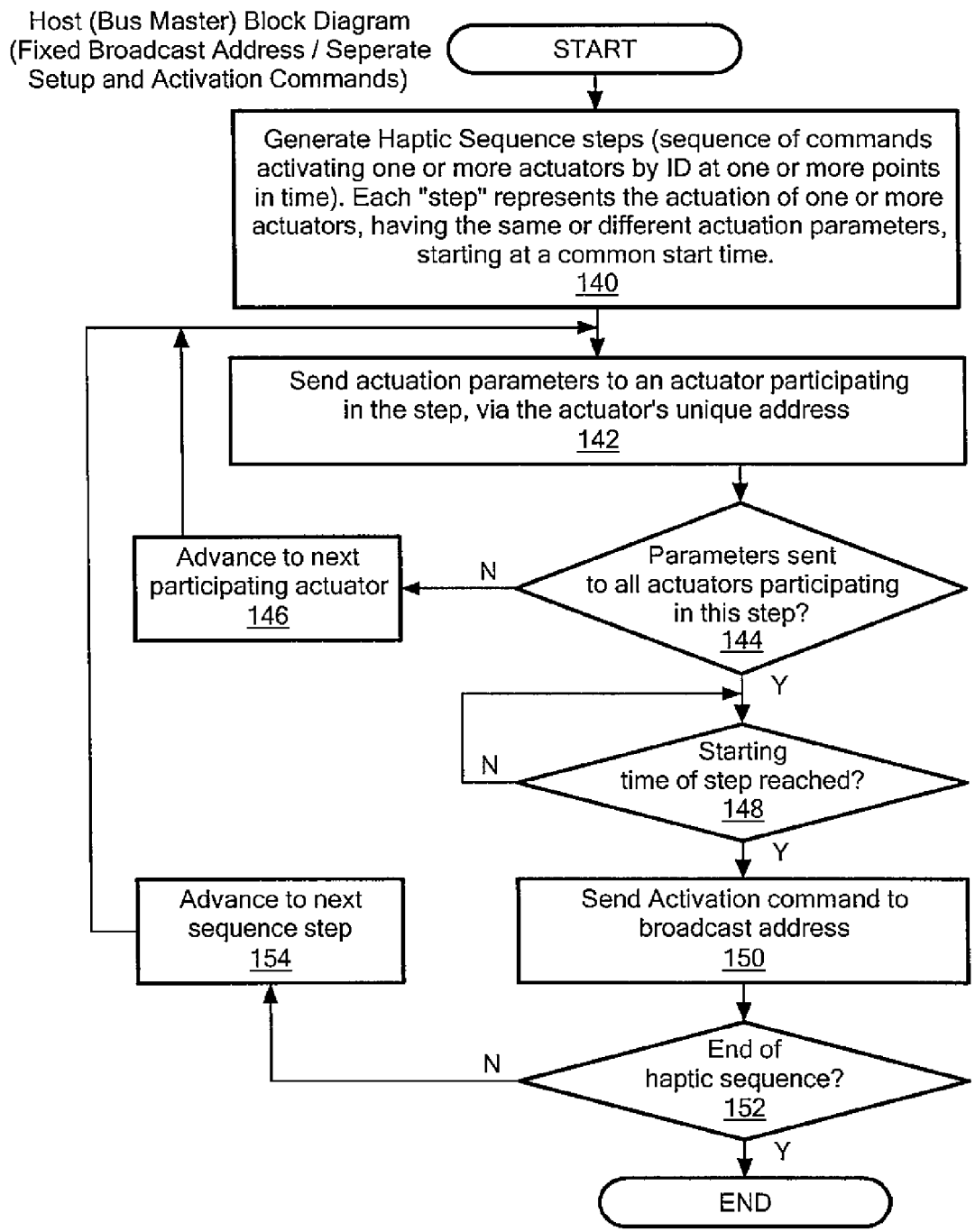
FIG. 14 is a flow chart depicting the primary steps associated with the programming of the master control subsystem of FIG. 1 in which multistep sequences and separate setup and activation commands are used.

FIG. 14 depicts the process of the master control subsystem 10, FIG. 1, ("master") commanding a plurality of slave control subsystems 12, FIG. 2, ("slaves") to produce a time-sequenced actuation pattern across the actuators controlled therefrom. The master generates, step 140, a haptic sequence comprising a plurality of actuation steps, i.e. activations of one or more specific actuators at one or more points in time, with each step comprising the activation of one or more actuators, having the same or different actuation parameters, at a common start time. The actuation parameters determined for a slave participating in the time-sequenced actuation pattern, typically specifying a single actuation and typically including a timing parameter (such as a duration), is sent to said slave, step 142. The master then determines whether all slaves participating in this sequence step have been sent their respective parameters, step 144. If not, a slave that has not yet received parameters is selected, step 146, and the process is repeated until all parameters for participating slaves have been transferred. The master then waits until the desired start time of the sequence step transferred to the slaves is reached, step 148. An activation command is then sent to an address to which every participating slave is responsive ("broadcast address"), step 150. The master then determines whether there are remaining haptic sequence steps that have not been transferred and activated, step 152. If so, the next portion of the sequence is selected and steps 142-152 are repeated.

Figure 15:
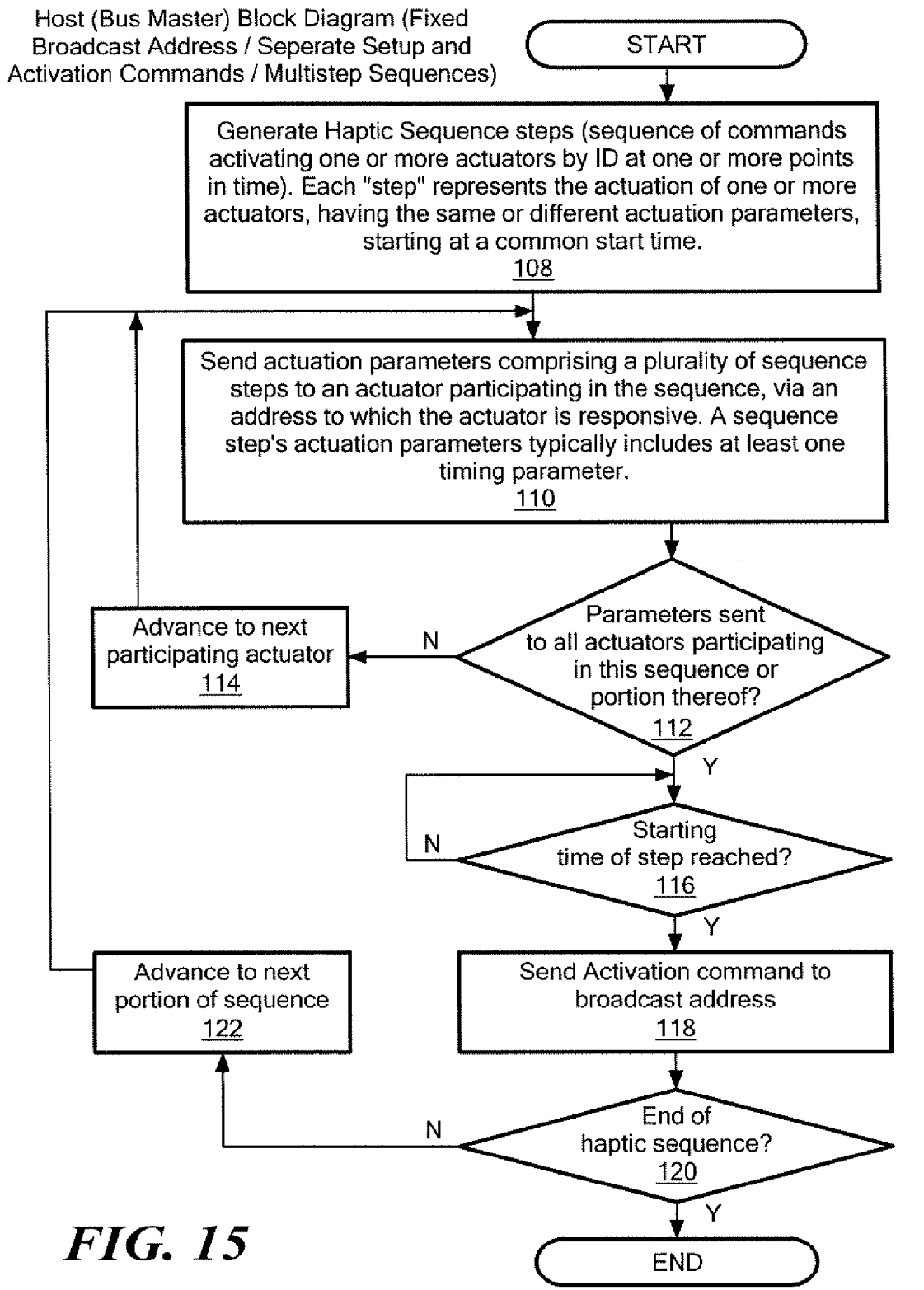
FIG. 15 is a block diagram showing the primary steps associated with the programming of the master control subsystem of FIG. 1 in which a delay parameter is used for synchronization of slaves.

FIG. 15 depicts another embodiment of the process of the master control subsystem 10, FIG. 1, ("master") commanding a plurality of slave control subsystems 12, FIG. 2, ("slaves") to produce a time-sequenced actuation pattern across the actuators controlled therefrom. It is similar to FIG. 14 except that the slave command may include information pertinent to multiple sequence steps. The master generates, step 108, a haptic sequence comprising a plurality of actuation steps, i.e. activations of one or more specific actuators at one or more points in time, with each step comprising the activation of one or more actuators, having the same or different actuation parameters, at a common start time. The actuation parameters determined for an actuator participating in the time-sequenced actuation pattern, comprising at least one actuation and typically including a timing parameter (such as a duration), is sent to said actuator, step 110. The information transferred in the command packet may comprise a single actuation step or multiple timed actuation steps, subject to the available memory on the slave. The master then determines whether all slaves participating in the sequence step, or steps, relevant to the current command cycle, have been sent their respective parameters, step 112. If not, a slave that has not yet received parameters is selected, step 114, and the process is repeated until all parameters for participating slaves have been transferred. The master then waits until the desired start time of the sequence, or portion thereof, transferred to the slaves, is reached, step 116. An activation command is then sent to an address to which every participating slave is responsive ("broadcast address"), step 118. The master then determines whether there are remaining haptic sequence steps that have not been transferred and activated, step 120. If so, the next portion of the sequence is selected and steps 110-120 are repeated.

Figure 16:
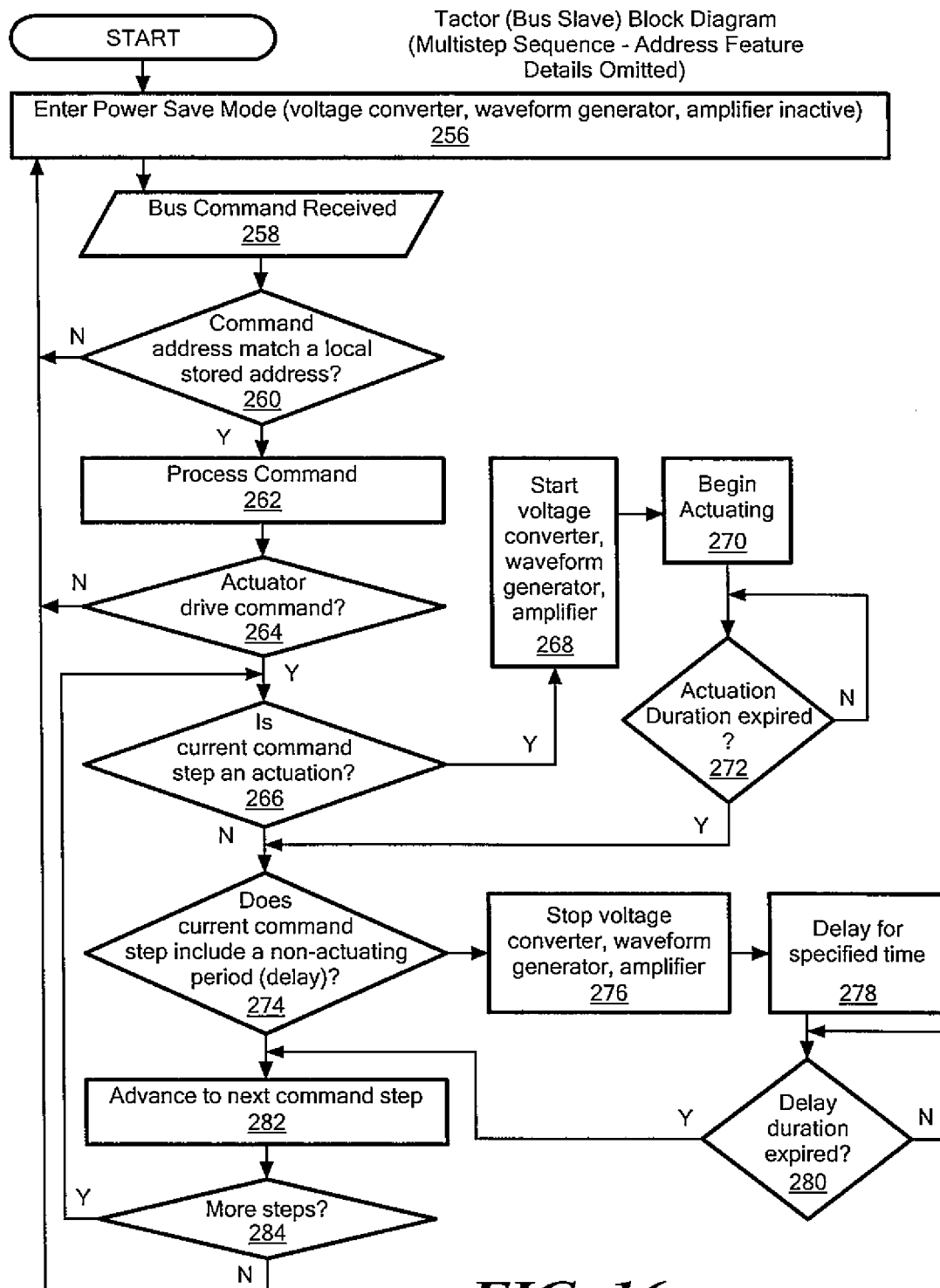
FIG. 16 is a block diagram showing the primary steps associated with the programming of the master control subsystem of FIG. 1 in which a fixed broadcast address and separate setup and activation commands are used for synchronization of slaves.

FIG. 16 depicts the corresponding action of the slave control subsystem ("slave") in response to the events of FIG. 14 or 15. The slave begins in power-save mode, in which most power-consuming components are inactive, step 256, and remains so until a bus command is received, step 258. The slave then determines whether it is responsive to the address contained in the bus command, step 260. If not, the command is ignored and the slave returns to power-save mode. But if so, the command is processed, step 262. Processing may include further decoding of data fields within the command and/or the transfer of parameters to the slave's memory for subsequent use. The slave determines whether the command would cause actuation, step 264. If not, the slave returns to power-save mode. But if so, the slave further processes the command, which may comprise multiple actuating and non-actuating periods including time parameters such as a duration, and determines whether the portion of the command currently being processed specifies an actuation period, step 266. If so, the actuation-related components such as voltage converter, waveform generator and amplifier are enabled, step 268, actuation is started, step 270, and the slave delays for the duration specified by the master (either directly in this command or in a parameter stored from a previous command), step 272. The slave then checks whether the portion of the command currently being processed includes a non-actuating period, including an implicit non-actuating period implied by the prior actuating period having a finite duration parameter, step 274. If so, the actuation-related components are disabled, halting actuation, step 276, resulting in a non-actuating delay period, step 278, and the slave delays in this state until the specified duration has elapsed, step 280. The slave then advances to the next portion of the command to be processed, if any, step 282. If there are such additional portions, e.g. steps, specified by the command, steps 266-282 are repeated, step 284, otherwise the slave returns to power-save mode until the next command is received. In a realistic embodiment, the slave may receive and queue such a subsequent bus command in the background while performing steps 260-284.

Figure 17:
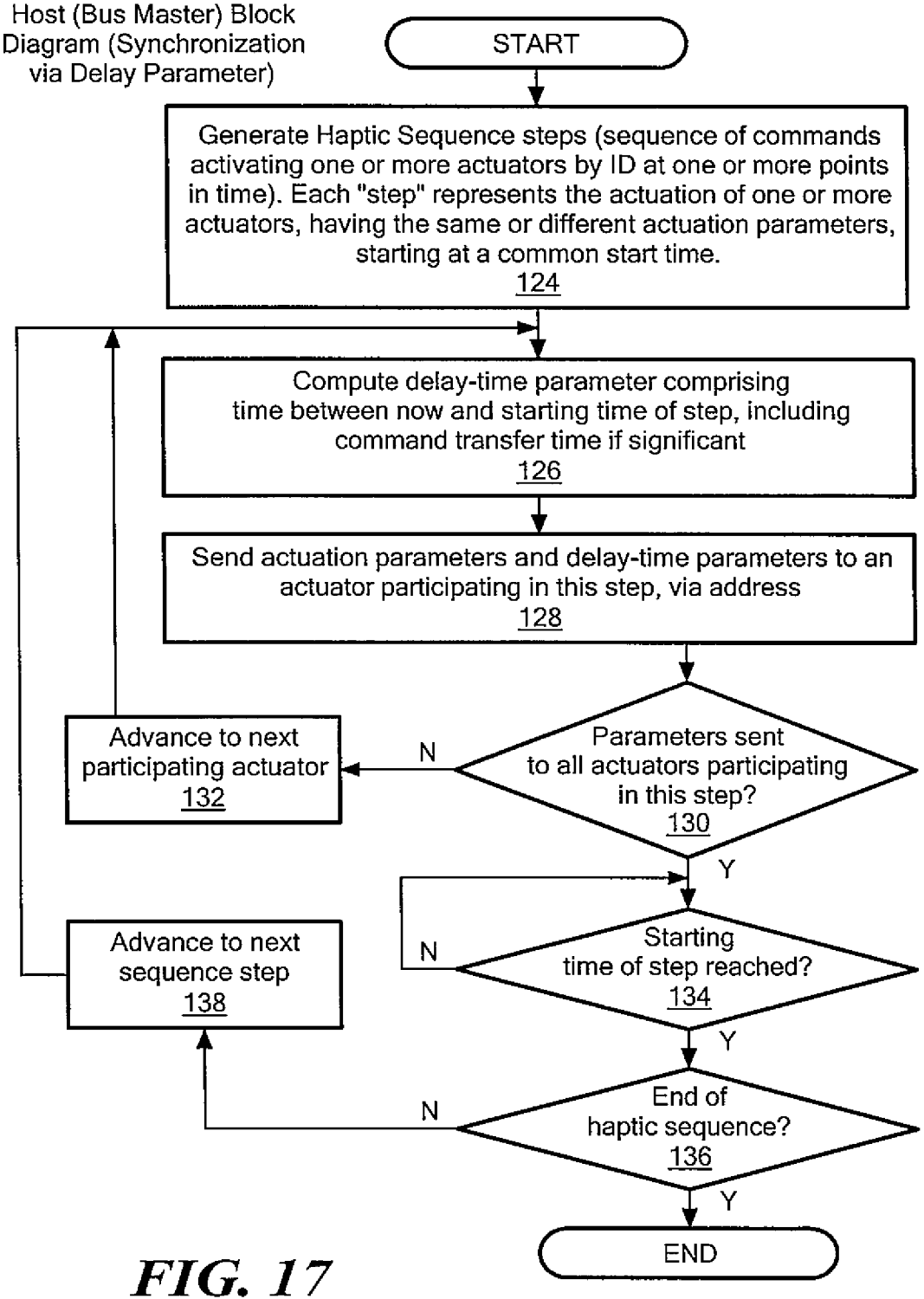
FIG. 17 is a block diagram showing the primary steps associated with the programming of the master control subsystem of FIG. 1 in which dynamic address groups are used for synchronization of slaves and reduction of bus traffic.

FIG. 17 shows another master control subsystem ("master") embodiment in which, rather than achieving correct sequencing by sending individual setup command followed by a common actuation command, individual commands are sent that include a pre-delay parameter. As before, the master generates, step 124, a haptic sequence comprising a plurality of actuation steps, i.e. activations of one or more specific actuators at one or more points in time, with each step comprising the activation of one or more actuators, having the same or different actuation parameters, at a common start time. Starting with the first generated step, the master then computes a time delay parameter comprising the time difference between the expected command reception time of a slave (the time when the command currently being generated will be received by the slave, typically approximated as the current time if the generation and transfer time of a single command is not significant) and the desired start time of the step, step 126. The desired start time of the first step is typically computed as the earliest time at which all slaves participating in this step will have received their commands, that is, the sum of all expected command transfer time to said slaves. For subsequent steps, the desired start time is typically the start time specified by the next step, and so the delay time would represent this time minus any time elapsed since the start of the previous step, for example, while transferring commands to other slaves. The computed command, including the actuation parameters and delay parameter, are sent to a slave participating in this step, step 128. The master checks whether actuation parameters have been sent to all slaves participating in this step, step 130. If not, the master advances to the next participating actuator, step 132, and repeats steps 126-130. The master then waits until the start time of the currently pending step, at which time the participating slaves should begin executing the step, step 134. This step, while not strictly necessary, reduces the complexity of the slaves by avoiding the need for them to queue multiple pending commands. Finally, the master checks whether the end of the generated sequence has been reached, step 136, and if not, advances to the next step in the sequence, step 138, and repeats steps 126-136.

Figure 18:
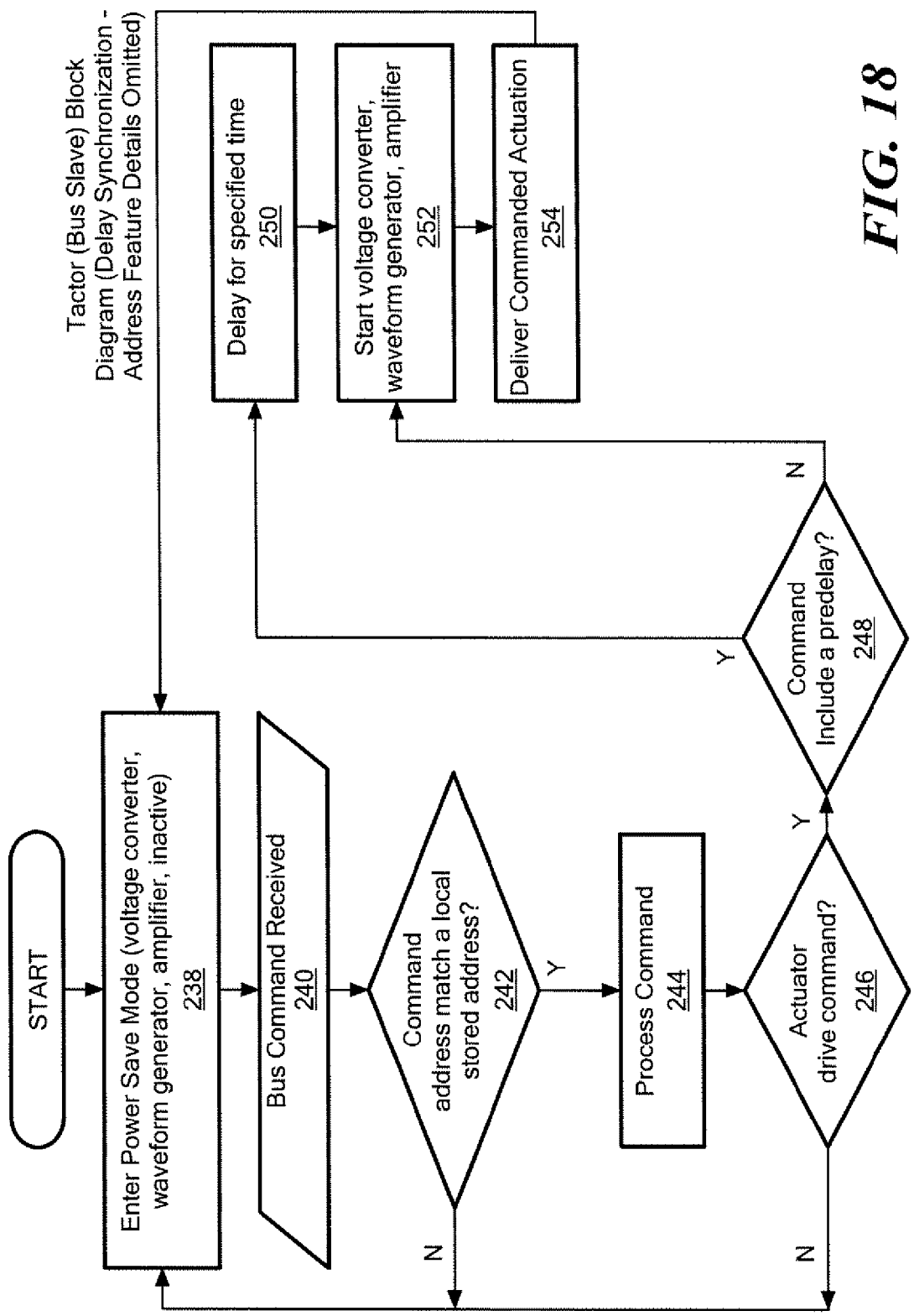
FIG. 18 is a block diagram showing the primary steps associated with the programming of the master control subsystem of FIG. 1 in which dynamic address groups are used for synchronization of slaves.

FIG. 18 depicts the corresponding action of a slave control subsystem ("slave") in response to the events of FIG. 17. As before, the slave begins in power-save mode, step 238, with its actuation-related components inactive. Upon receipt of a bus command, step 240, the slave determines if it is responsive to the command, that is, if the address contained in the command matches a locally stored address, step 242. If not, it returns to power-save mode and the command is ignored. But if so, the command is processed, step 244. As before, the processing may include the storage of actuation parameters for subsequent use. The slave determines if the command would cause actuation, step 246. If not, it returns to power-save mode. But if so, the slave then checks if the command includes a pre-delay before actuation, step 248. If so, the slave delays for the specified time, step 250. In either case, the slave then enables the actuation-related components such as voltage converter, waveform generator and amplifier, step 252, and delivers the commanded actuation subject to the currently-stored actuation parameters, step 254. The slave then returns to power-save mode until/unless a new bus command is received. In a realistic embodiment, the slave may receive and queue such a subsequent bus command in the background while performing steps 242-254.

Figure 19:
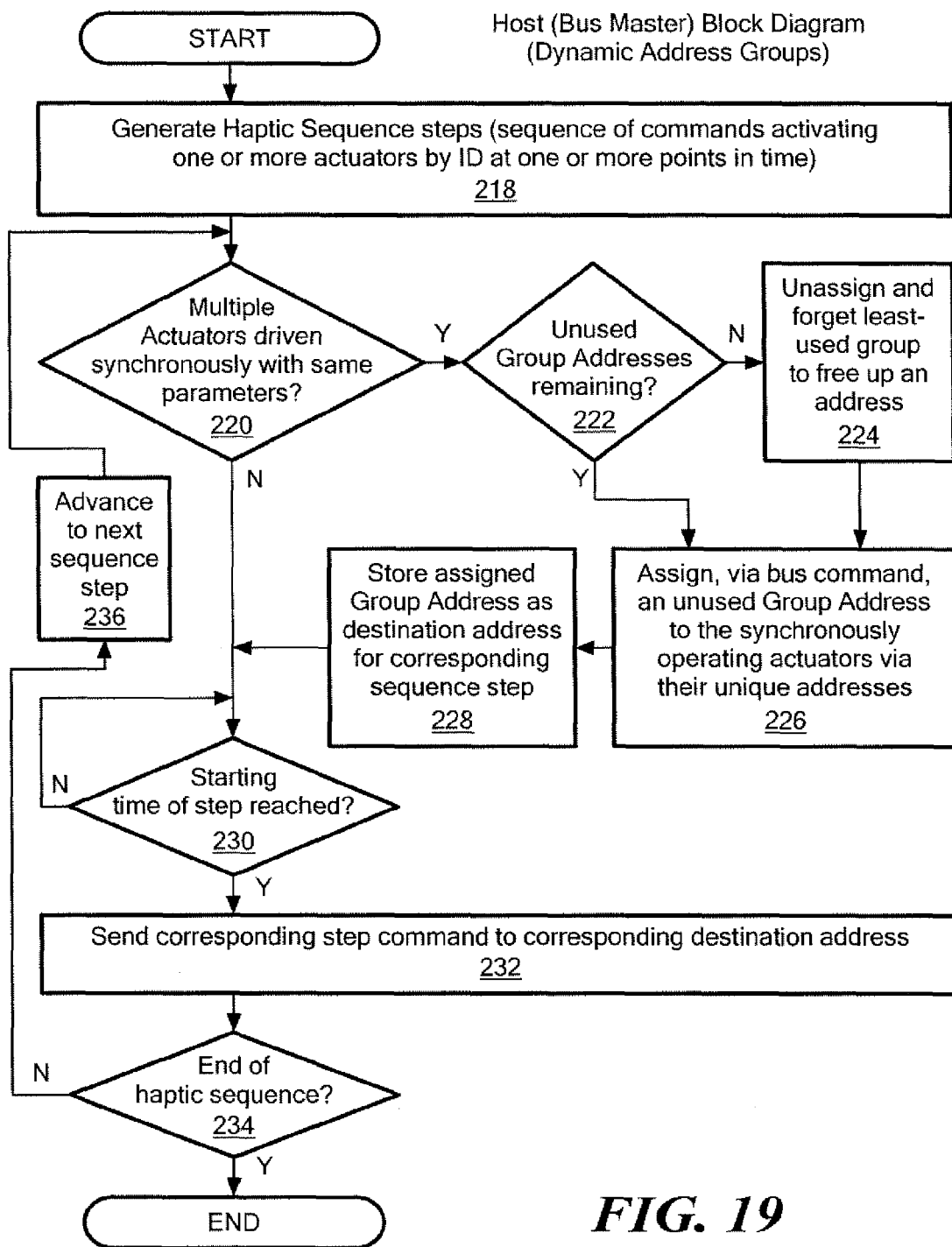
FIG. 19 is a block diagram showing the primary steps associated with the programming of the slave control subsystem of FIG. 1 in which a delay parameter is used.

FIG. 19 depicts an embodiment where the master control subsystem ("master") uses an address grouping feature to reduce command bus traffic and provide synchronous operation of slave control subsystems ("slaves"). As usual, the master generates the steps comprising a haptic sequence comprising a time-sequenced actuation pattern across a plurality of slave-controlled actuators, step 218. Beginning with the first step, the master evaluates the generated step and determines whether more than one slave participates in the step, step 220. If so, it next checks if there are currently unused addresses within the slave address space, step 222. If not, e.g. due to previous group address assignments, a previously-assigned group address is chosen and unassigned or "forgotten", step 224, to free up an address. Nominally this would be the least frequently used or least recently used of the previously assigned group addresses. The master then assigns an unused address to the slaves participating in this sequence step by sending a command to each said slave via its individual address, commanding it to become responsive to the chosen Group Address, step 226. The master stores the association between the individual slave addresses and Group Address for future use, step 228. The master then waits until the desired starting time of the current sequence step is reached, step 230, upon which it sends the actuation command for this step to the participating slave address (if only one participating slave) or Group Address (for multiple participating slaves), step 232. Finally, the master checks whether all steps of the generated sequence have been performed, step 234. If not, the master advances to the next sequence step, step 236, and repeats steps 220-234.

Figure 20:
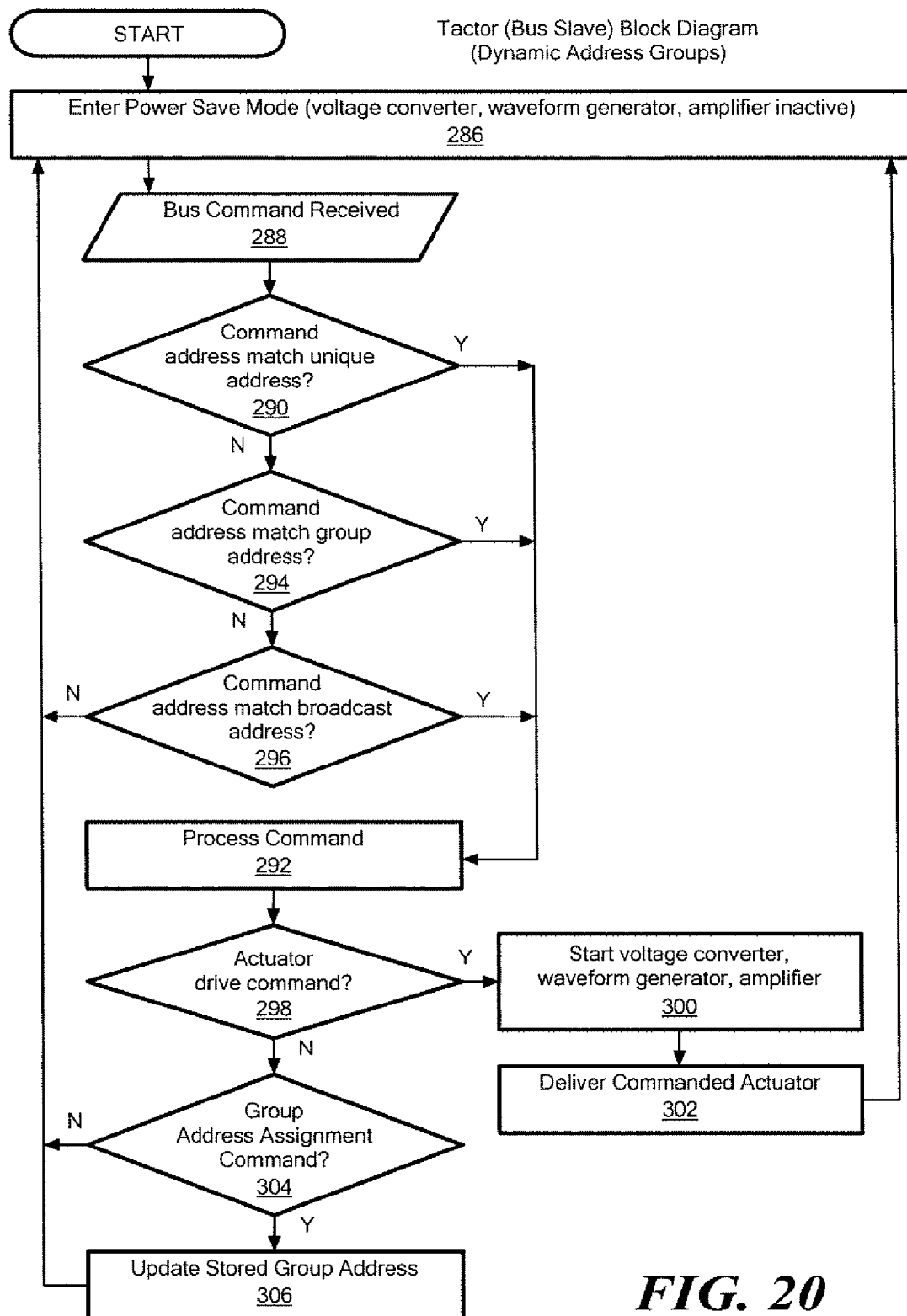
FIG. 20 is a block diagram showing the primary steps associated with the programming of the slave control subsystem of FIG. 1 in which a slave command may comprise multiple timed actuation steps.

FIG. 20 depicts the corresponding action of a slave control subsystem ("slave") in response to the actions of FIG. 19. As before, the slave begins in power-save mode, step 286, with its actuation-related components inactive. Upon receipt of a bus command, step 288, the slave checks whether it is responsive to the address contained in the command by comparing it to its unique address, step 290, its currently assigned Group Address if any, step 294, and the broadcast address if any, step 296. If there is no match against any of these addresses, the slave ignores the command and returns to power-save mode. If there is a match, the command is processed, step 292. As usual, processing may include actions such as the storage of actuation parameters to the slave's memory for later use. The slave determines if the command is an actuation command, step 298. If so, the slave enables its actuation-related components such as voltage converter, waveform generator and amplifier, step 300, and delivers the commanded actuation, step 302. It then returns to power-save mode until the next bus command is received. If the command was not an actuation command, the slave checks whether it was a Group Address assignment command, step 304. If so, the slave stores the assigned Group Address from the command into its memory for later use, thus becoming responsive to the Group Address in addition to any other addresses, such as its unique address, it is ordinarily responsive to, step 306. Finally, the slave returns to power-save mode until the next bus command is received. In a realistic embodiment, the slave may receive and queue such a subsequent bus command in the background while performing steps 290-306.

Figure 21:
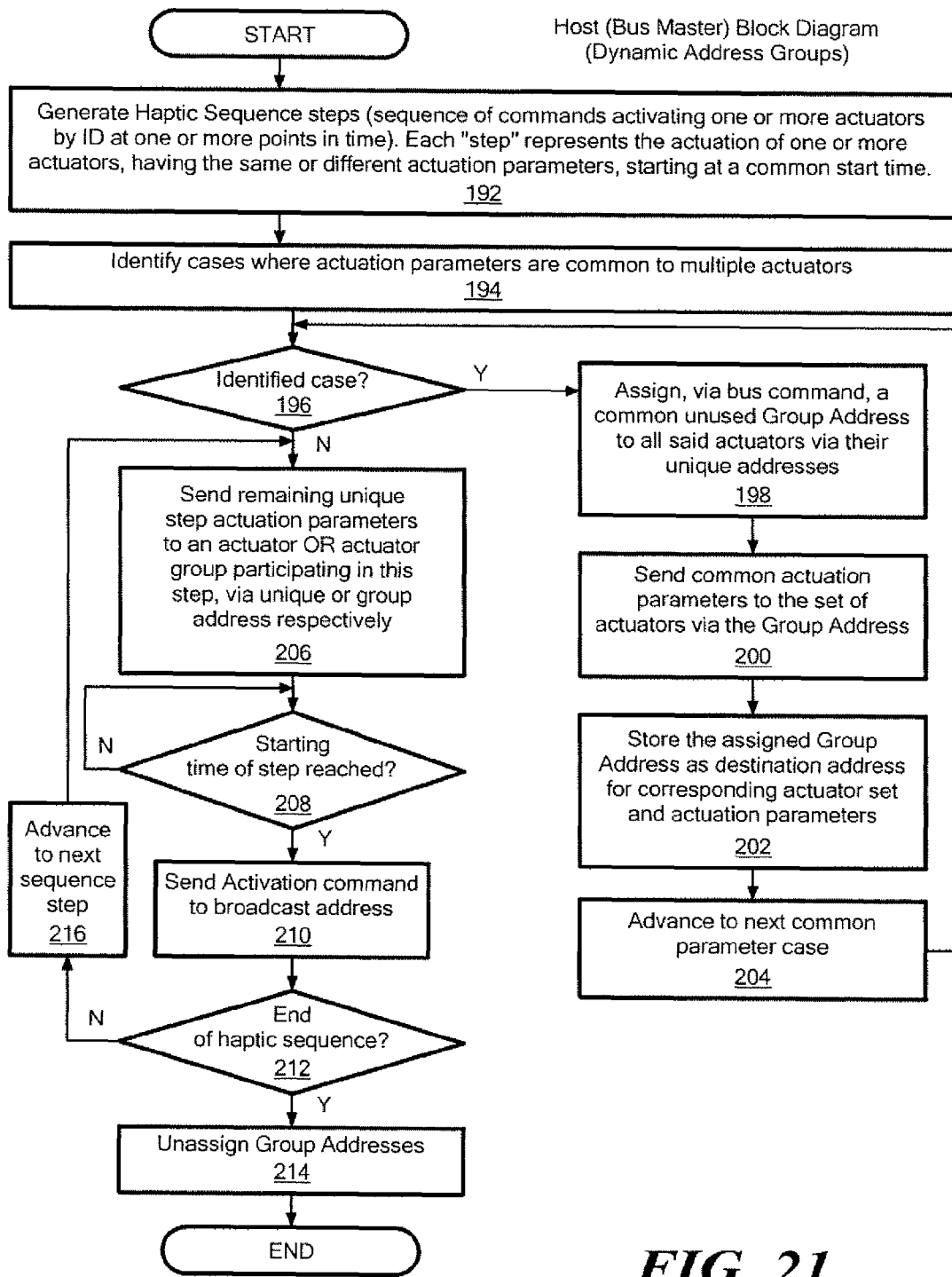
FIG. 21 is a block diagram showing the primary steps associated with the programming of the slave control subsystem of FIG. 1 in which dynamic address groups are used.

FIG. 21 depicts an alternate group addressing embodiment where the master control subsystem ("master") identifies and configures address groupings prior to the start of the actuation sequence. As usual, the master generates the steps comprising a haptic sequence comprising a time-sequenced actuation pattern across a plurality of slave-controlled actuators, step 192. The master then identifies, in the generated steps, cases where the same actuation parameter or parameters are common to a plurality of slaves, step 194. If any such case was identified, step 196, the master allocates an unused address, as a "Group Address", to the plurality of slaves subject to the identified case and transmits a command causing said slaves to become responsive to said address, step 198. The common parameters are then transmitted, via bus command, using the newly assigned Group Address rather than duplicate commands to the individual slaves, step 200. The assignment is locally stored so as to associate said Group Address with said actuation parameters, step 202. The master then advances to the next identified case, if any, step 204, and steps 198-204 are repeated for all remaining cases. For the current actuation step, the remaining parameters necessary to describe the current sequence step are transferred to the respective slaves via their individual addresses or a Group Address, step 206. The master then waits until the desired starting time of the current step, step 208, then sends an activation command to an address to which all participating slaves are responsive, e.g. a Group Address or broadcast address, step 210. The master then determines whether all steps of the sequence have been performed, step 212, and if not, advances to the next step, step 216, and steps 206-216 are repeated. Finally, the master may unassign the previously assigned Group Addresses by removing its local association of said addresses and parameters, and optionally sending commands causing the affected slaves to cease being responsive to said addresses, step 214.

Figure 22:
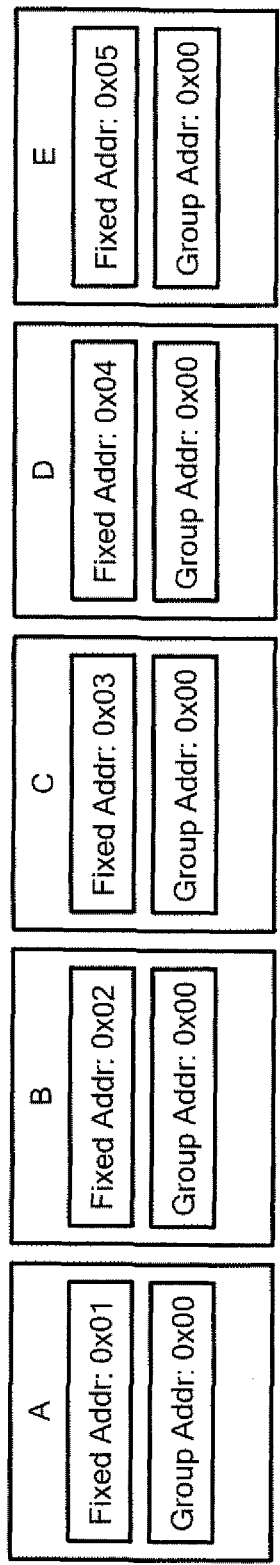
FIG. 22 is a schematic view showing individual haptic actuators each with an address stored therein.
Figure 23:
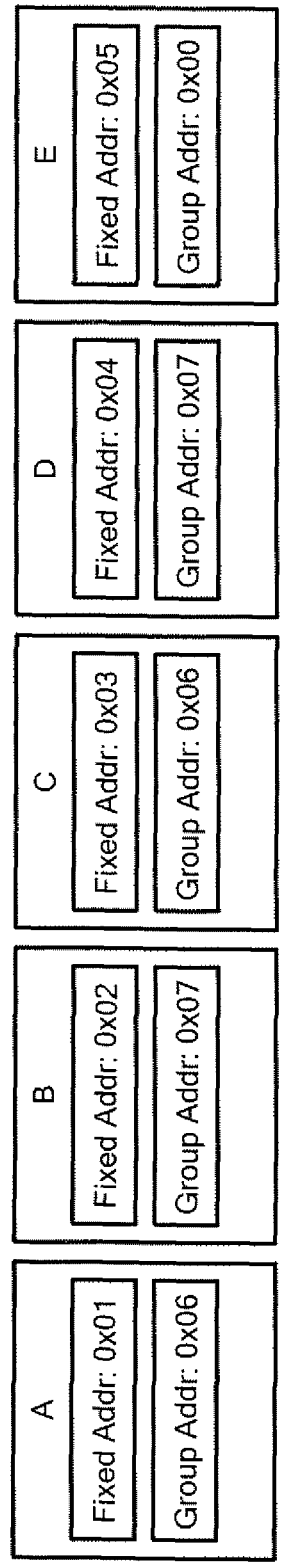
FIG. 23 is a view of a plurality of haptic actuators each with an address stored therein as well as an example showing stored group addresses.

FIGS. 22-24 depict an example of using group addressing to drive slave control subsystems on the bus synchronously. FIG. 22 depicts a haptic display containing five "bussed actuators" or slave control subsystems, each having at least one address memory for storing an address, and responsive to at least one said address. It is desired to drive two actuators (designated A and C) with a first haptic signal, and two actuators (designated B and D) with a second haptic signal, such that the delivery of both signals starts at approximately the same time. The final actuator (designated E) is not commanded to generate any signal in this example. A bus command consists of a destination address byte followed by one or more payload bytes comprising a command to the addressed device and any associated data (for example, new waveform data or address setting). In this example the commands are expressed as text, for example "SET WAVEFORM x".

The first haptic signal in this example is a 100 Hz sine wave lasting 100 msec, and the second is a 150 Hz square wave lasting 300 msec.

In this example each bussed actuator includes a memory containing a first, unique predefined address, and a second, configurable address, and is responsive to either address. FIG. 22 depicts the initial address values for each slave.

The controller identifies that units (A, C) and (B, D) will be commanded to produce identical haptic signals, for a total of two unique signals. The controller selects two unused addresses, 0x06 and 0x07, from the address space for use as group addresses, and sends the following bus commands to assign (A,C) to the first address group (0x06) and (B, D) to the second address group (0x07):

0x01: SET GROUP ADDRESS 0x06
0x03: SET GROUP ADDRESS 0x06
0x02: SET GROUP ADDRESS 0x07
0x04: SET GROUP ADDRESS 0x07

The address assignments now look like the example shown in FIG. 23.

The controller then sends the following bus commands:

0x06: START WAVEFORM 0x00 (sine), FREQUENCY 100 Hz, DURATION 100 ms
0x07: START WAVEFORM 0x01 (square), FREQUENCY 150 Hz, DURATION 300 msec This scenario minimizes the time between the two start commands, allowing them to begin at approximately the same time. This is depicted in FIG. 24.

Figure 26:
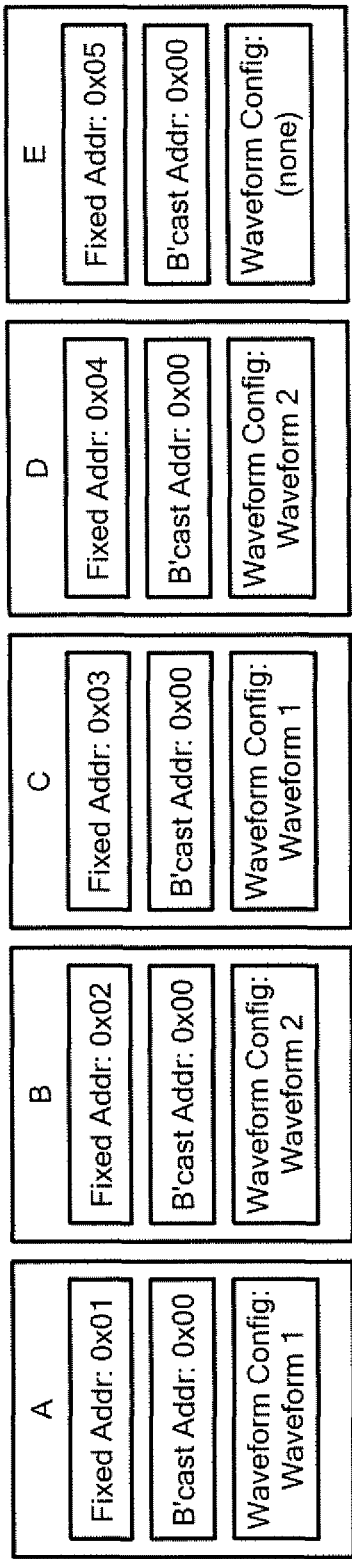
FIG. 26 is a schematic view showing two waveform configurations, each stored to two haptic actuators having unique addresses, and a fifth haptic actuator with no waveform configuration stored.
Figure 27:
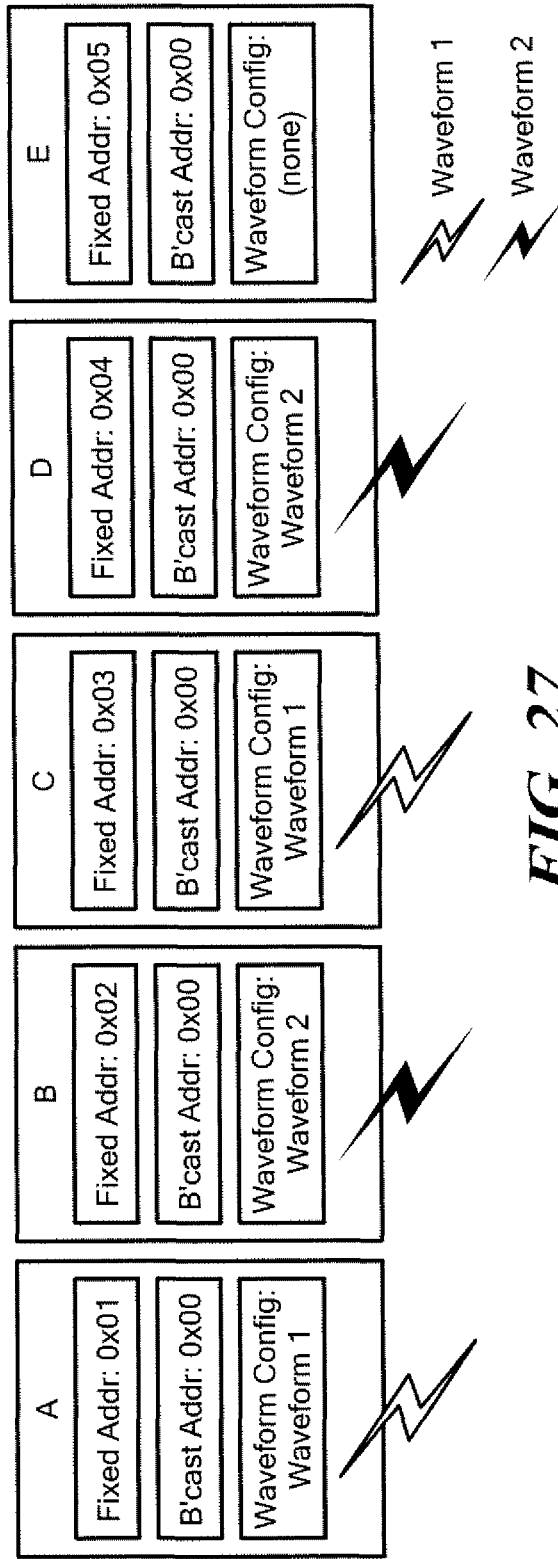
FIG. 27 is an example showing the haptic actuators of FIG. 25 synchronously producing two actuation waveforms responsive to their stored configurations in response to an actuation command sent to the broadcast address.
Figure 28:
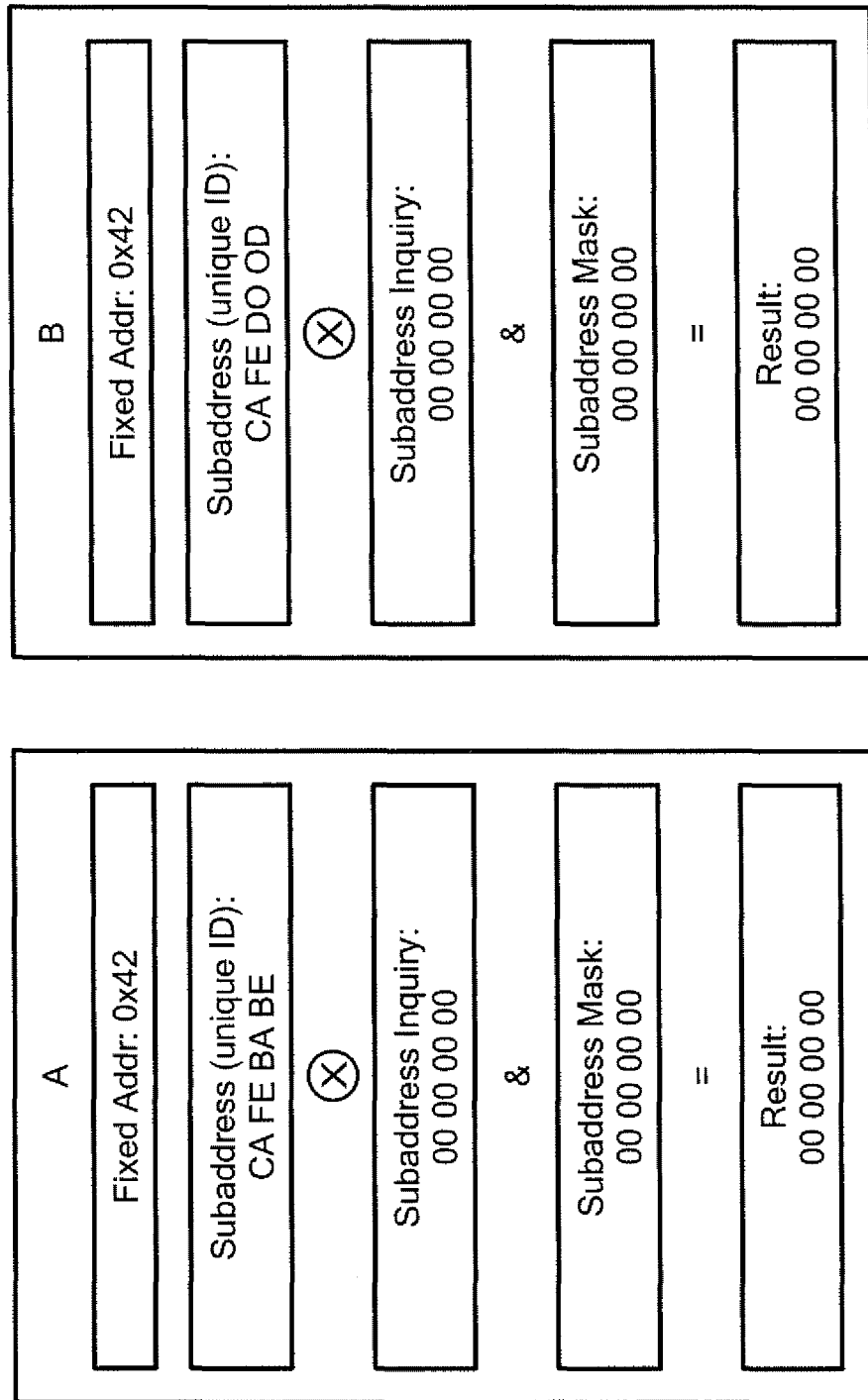
FIG. 28 is an example showing two bussed haptic actuators with an address discovery and reassignment mechanism comprising a long unique ID (subaddress) in addition to a short ID (address), which is in conflict in this example, and a memory for storing an inquiry value and a mask value upon which the slave control subsystem's response to the inquiry value is conditional.

FIGS. 25-27 depict an example of driving multiple slave controller subsystems synchronously, in which each slave controller subsystem includes a memory containing a first, unique predefined address, and a second, predefined global (broadcast) address which is shared by all such devices, and is responsive to either address. The initial address values for each slave are as shown in FIG. 25. In this example the broadcast address is 0x00.

In this example, the bus commands comprise separate configuration and activation commands. To set up all participating devices, the bus master sends:

0x01: SET WAVEFORM 0x00 (sine)
0x01: SET FREQUENCY 100 Hz
0x01: SET DURATION 100 ms
0x03: SET WAVEFORM 0x00 (sine)
0x03: SET FREQUENCY 100 Hz
0x03: SET DURATION 100 ms
0x02: SET WAVEFORM 0x01 (square)
0x02: SET FREQUENCY 150 Hz
0x02: SET DURATION 300 ms
0x04: SET WAVEFORM 0x01 (square)
0x04: SET FREQUENCY 150 Hz
0x04: SET DURATION 300 ms The result is shown in FIG. 26. The participating devices are configured but do not activate.

At the desired starting time of the haptic signals, the bus master then sends an activation command to the broadcast address:

0x00: ACTIVATE

All configured devices begin playback simultaneously. Since device E (0x05) did not receive any configuration messages, it does not play any haptic message. The resulting actuations are depicted in FIG. 27.

Of course, these methods are examples only, and a covered embodiment may combine both types of addressing. For example, a bus slave may respond to a preprogrammed address, group address AND broadcast address, and the command set may include discrete setup and activation commands. The command set may also include one or more immediately-activating commands, or a flag within the payload whether the commanded motion should be executed immediately or deferred until a future activation command. In this case the bus master may optionally assign groups, send individual setup commands to the preprogrammed or group addresses, then trigger the start of playback with an ACTIVATE command to the broadcast address.

For simplicity, other commands and other management tasks (such as clearing group addresses) are not shown in the Figs. Group addresses may be cleared by an explicit command, or by setting them equal to an address the device already responds to, such as its preprogrammed address or a broadcast address. For example, if the broadcast address is 0x00, the command (0x00: SET GROUP 0x00) would effectively clear all groups.

FIGS. 28-32 depict an example embodiment of address conflict resolution between a plurality of slave control subsystems. Consider the haptic display shown in FIG. 28, having two slave control subsystems. In this example, the bus uses the I2C protocol, which specifies a 7-bit address (valid addresses 0x00~0x7F) and an acknowledge bit (ACK) for acknowledging a bus command, followed by zero or more payload bytes. The controller circuit for each unit comes factory-programmed with a unique 32-bit ID as shown. In this example, the I2C address is specified as 0x42 and is identical for both devices, representing an address conflict. A subdivision search is used to discover devices using the unique ID field as the subaddress.

In this example the command set includes an IDENTIFY command which comprises the I2C address, a subaddress field corresponding to the maximum number of bytes in the subaddress, and a mask field for constraining operation to a subset of the address space. A device receiving this command will XOR the subaddress field of the command with its own subaddress, bitwise AND the result with the mask, and if the result is zero (meaning the unmasked portion matched), respond by driving an ACK on the bus.

Figure 29:
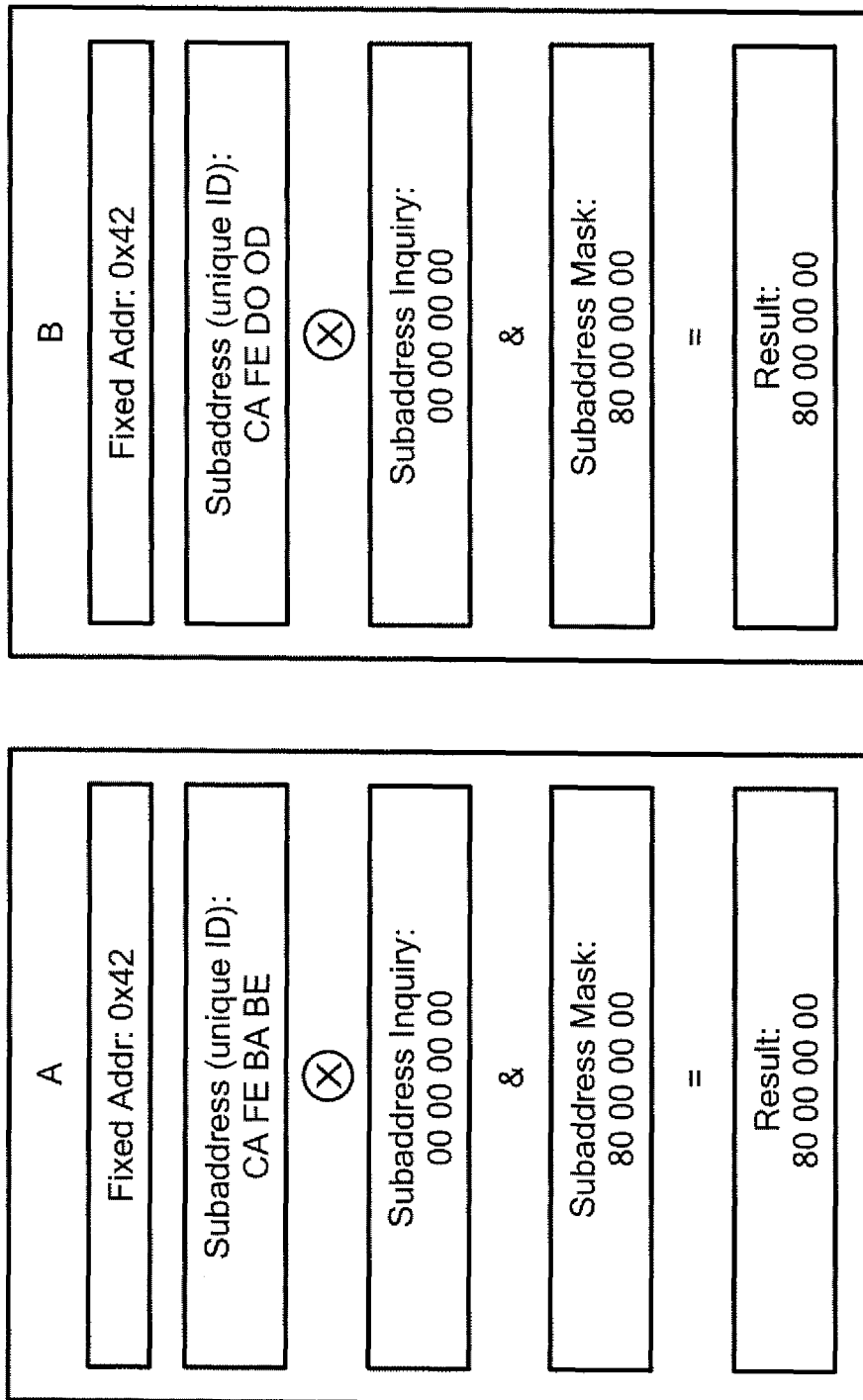
FIG. 29 is a schematic view showing two haptic actuators responding negatively to a common inquiry value because the unmasked portion of the inquiry value (responsive to the stored mask value) does not match the respective portion of their subaddress values.
Figure 30:
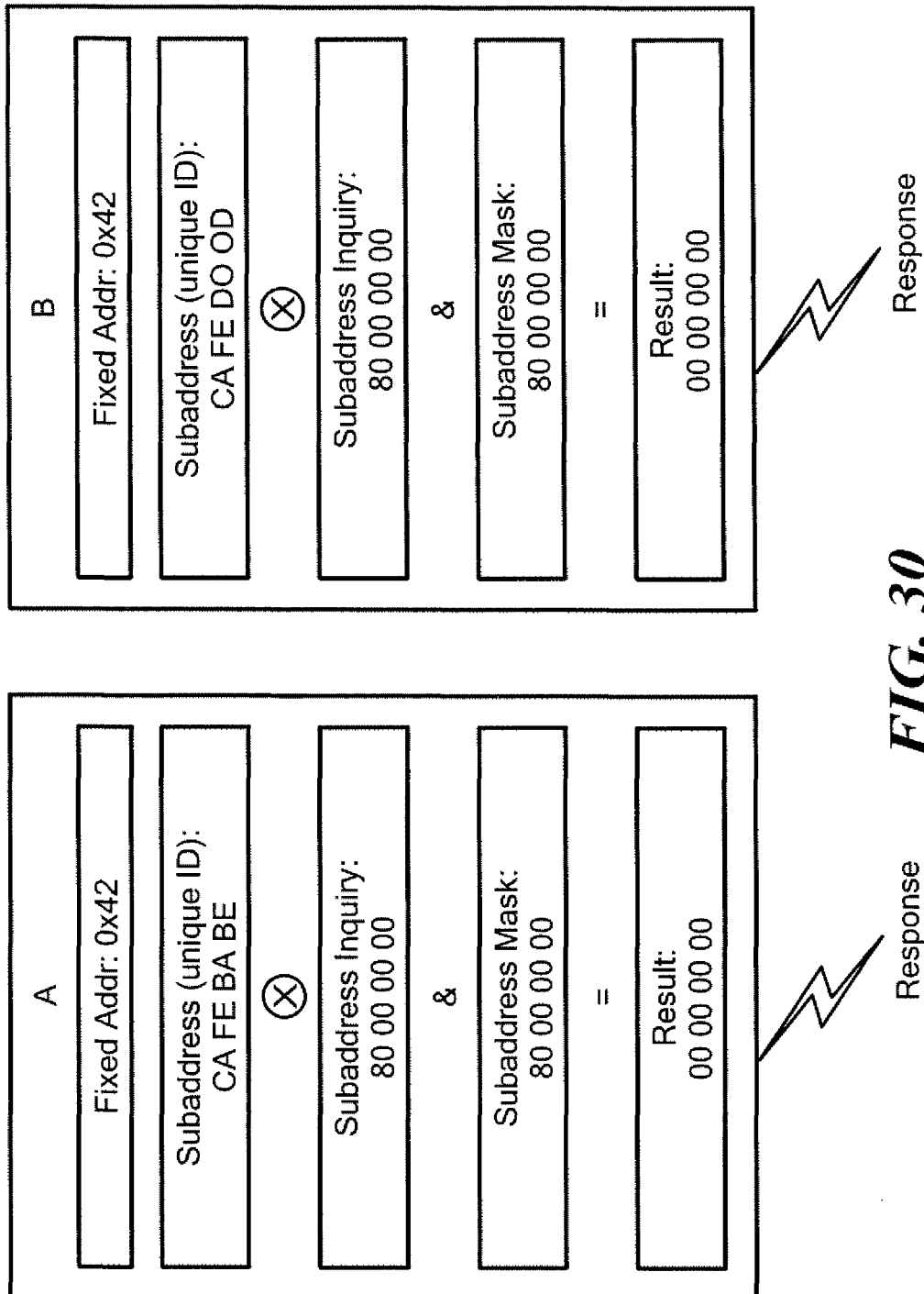
FIG. 30 is a schematic view showing two haptic actuators responding positively to an inquiry command because the unmasked portion of the inquiry value (responsive to the stored mask value) matches the respective portion of their subaddress values.
Figure 31:
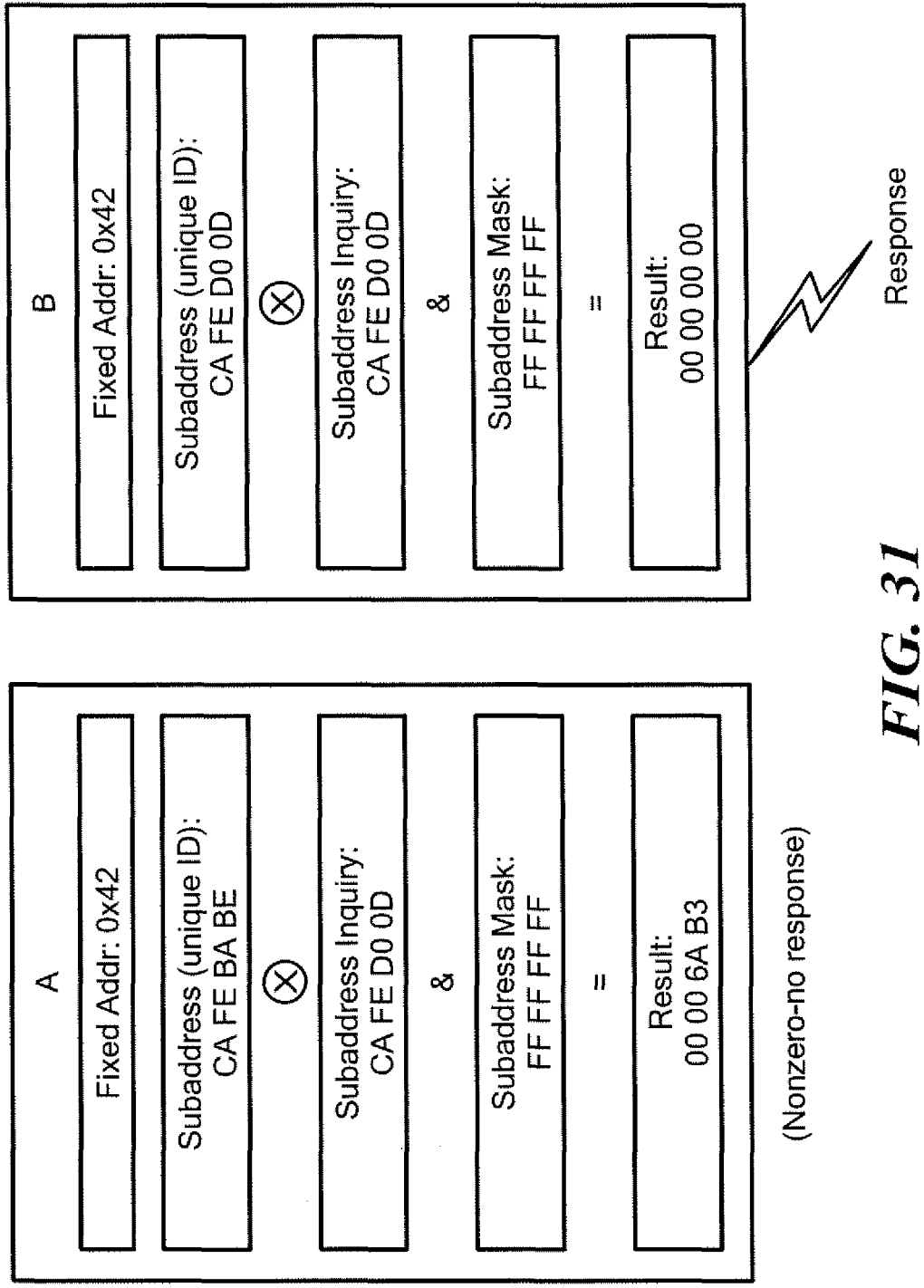
FIG. 31 is a schematic view showing two haptic actuators, one of which responds positively to an inquiry command because the unmasked portion of the inquiry value (responsive to the stored mask value) matches the respective portion of its subaddress value.

In FIG. 29, the bus master sends an IDENTIFY bus command to the known address 0x42, the first bit of the mask field set to 1, and the first bit of the subaddress set to 0 (the rest are irrelevant). This selects the low half of the address space (any device with '0' in the first bit of its subaddress). No devices respond. In FIG. 30, the IDENTIFY command is then repeated with the first bit of the subaddress set to 1. Both devices respond. The bus master now knows at least one device exists on the bus, in the high half of the address space. The address space is further divided and searched by setting successive combinations of mask bits and subaddresses, until the unique address of every device is discovered. FIG. 31 shows the case where the bus master has fully discovered the device with subaddress [CA FE D0 0D] and is guaranteed a unique response (all mask bits set).

This is only an example, and many other methods of performing such an address search will be obvious to a practitioner of the art.

Figure 32:
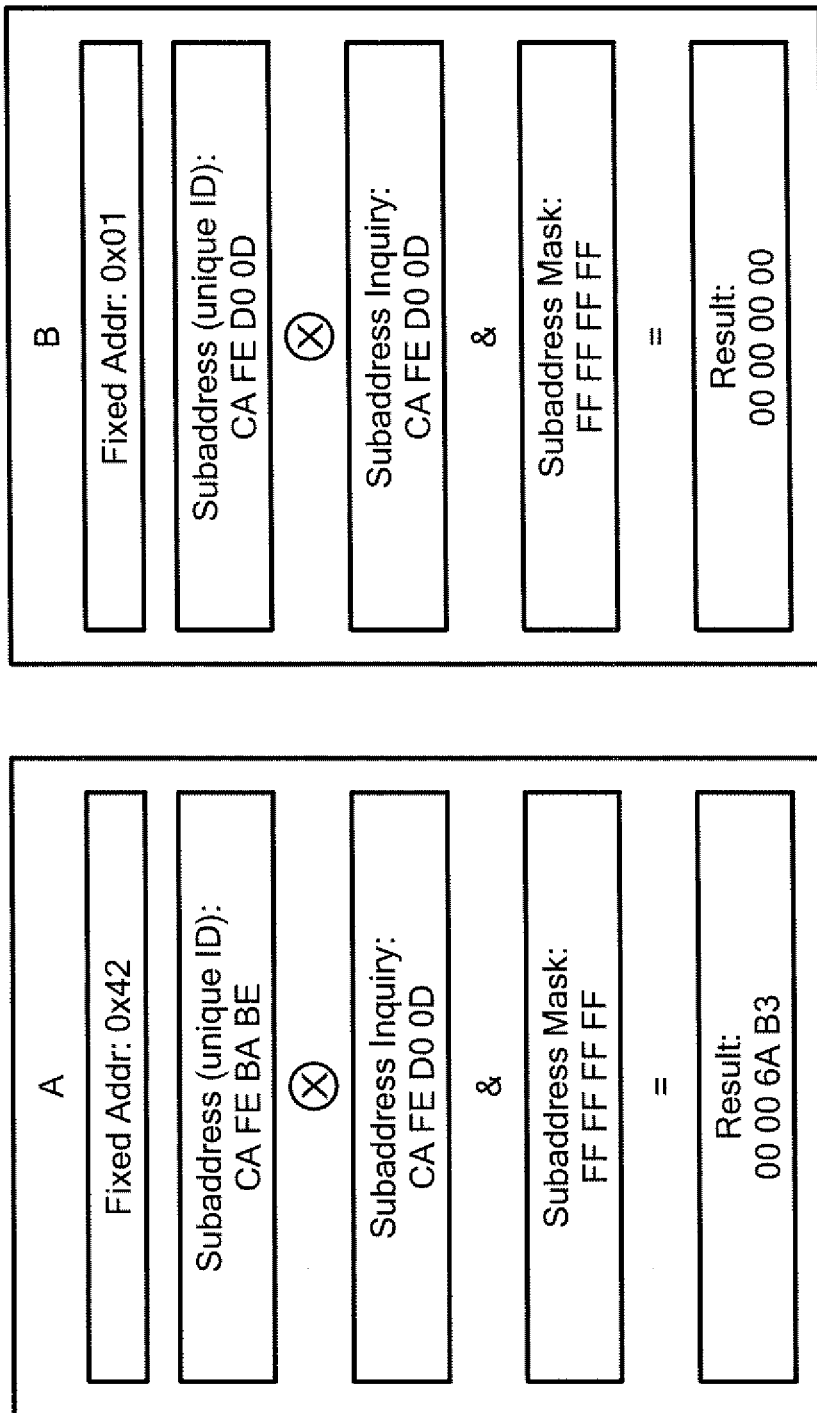
FIG. 32 is a schematic view showing two haptic actuators, one of which has its address reassigned by the master control subsystem due to its unique response to an inquiry value which is completely unmasked, identifying it as a unique device from the other haptic actuator sharing the same address.

Once the unique subaddresses are identified, the bus master may choose to store these subaddresses for future use in order to avoid repeating the search, or may choose to send additional commands to assign a unique (but shorter) response addresses to each slave, addressing these commands using the long subaddress. The slave may in turn store the reassigned address temporarily, in volatile memory, or persistently, in nonvolatile memory, for future use. FIG. 32 depicts the storage of a new short address, 0x01, by slave B in response to a command from the master, representing a reassignment of its address from 0x42 to 0x01. Slaves A and B are now commandable by unique short addresses.

This process may occur at the time of manufacture so as to be transparent to the end user. In a real-life manufacturing scenario, each reassigned device would then be actuated in turn, and the physical location of the responding device measured, in order that the mapping between a device address and its physical location be programmed into the haptic system. Alternately, the association of a long address and assembly location are already known at the time of manufacture and are programmed into the haptic system, which subsequently uses the long addresses to reassign or resolve any address conflicts on a bus protocol expecting a shorter address.

The typical actuation pattern for the haptic actuator is an oscillating cycle in which the actuator is repeatedly deflected (strained) and then allowed to return to its undeflected state, or repeatedly deflected in alternating directions, passing through the undeflected state twice per cycle. In general, the actuator is deflected by increasing the voltage across it, and returned toward the undeflected state by equalizing the voltage across it. Some electroactive actuator materials, such as piezoelectric, PVDF and electroactive polymer, are substantially a capacitor, and, once deflected by stored charge, will preferentially return to an unstrained resting position if a means exists to remove or dissipate this charge. Thus the actuation means may also be further comprised of a means for recovering stored electrical energy from a deflected actuator in the process of allowing it to return toward an undeflected state. The recovered energy can then be used to power other parts of the system or subsequent actuation cycles.

Figure 33:
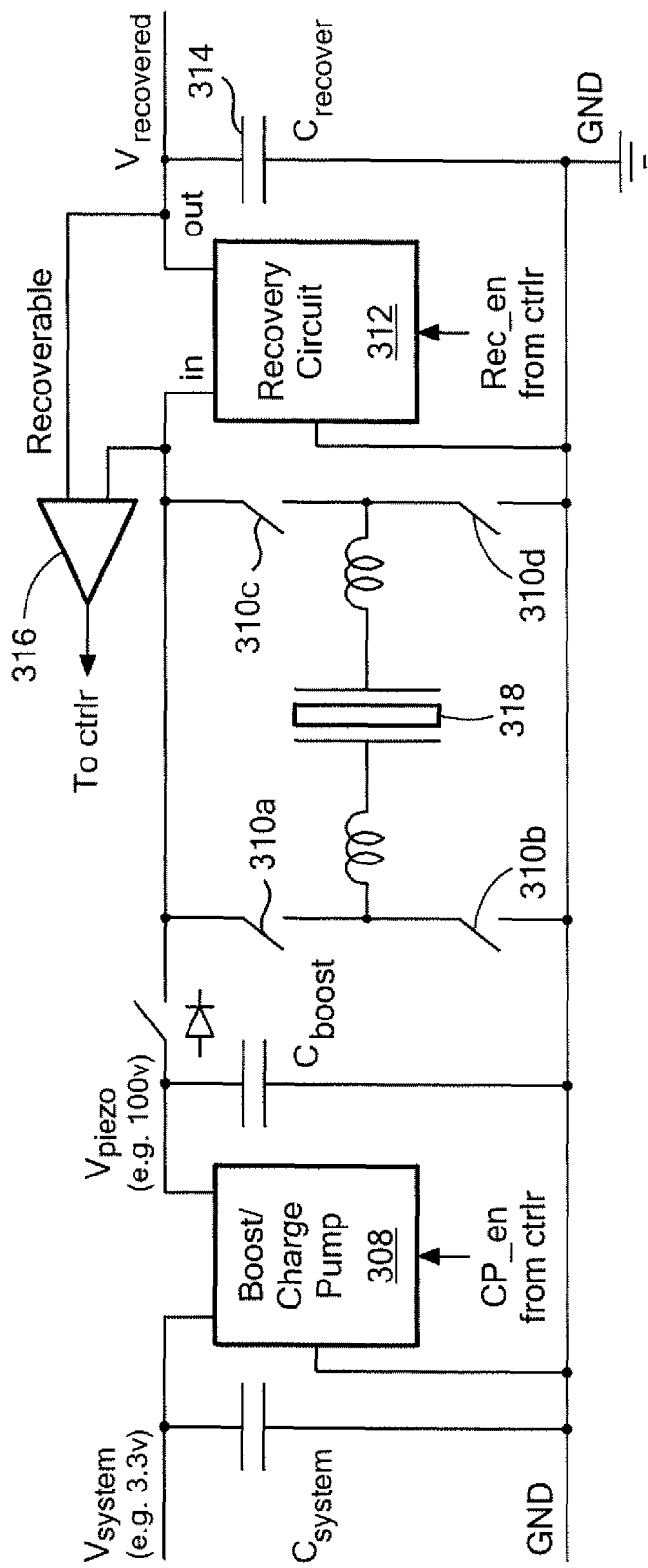
FIG. 33 is a drive circuit diagram including an energy recovery circuit for recovering stored energy from the internal capacitance of an actuator.

FIG. 33 shows a drive circuit including a primary voltage boost converter, 308, followed by an H-bridge comprised of electronically controlled switches 310a-310d, driving electroactive actuator 318. This drive circuit can apply voltage to the actuator in either polarity. The example assumes each switch in the H-bridge is individually controllable; however, many alternate configurations are possible (such as separate switches to enable/disable each leg of the H-bridge or modulate the rails if the opposing elements cannot be controlled individually). A sequencer (not shown) controls these switches to control the voltage across the actuator responsive to a desired waveform. An energy recovery circuit 312 may be added and the sequencing of the H-bridge switches modified to support charge recovery from the actuator during a relaxation phase (i.e. when the voltage across the actuator, and thus deflection, are to be reduced). The energy recovery circuit may include a standard switching voltage converter such as a boost or buck converter, or other conversion topology depending on the desired output voltage of the recovered energy. The output of this converter is stored to storage element Crecover, 314. "Crecover" is shown here as a separate storage element; however, in various embodiments of this circuit, Crecover may in fact be Csystem or Cboost. A comparator, 316, may be used by the sequencer to determine whether energy is currently recoverable from the actuator. The primary boost converter and recovery circuit are controlled by the sequencer via enable signals such that the primary converter is active when adding voltage across the actuator and the recovery circuit is active when removing voltage from the actuator and recoverable energy is available.

Figure 34:
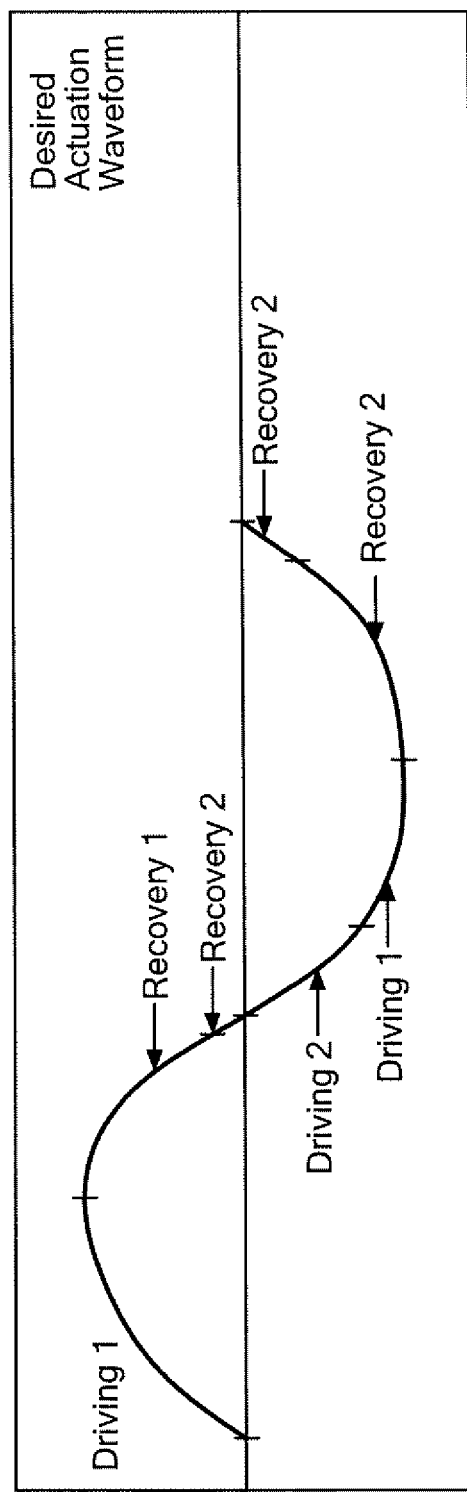
FIG. 34 is an example actuator drive waveform with drive and energy recovery regimes annotated.
Figure 35:
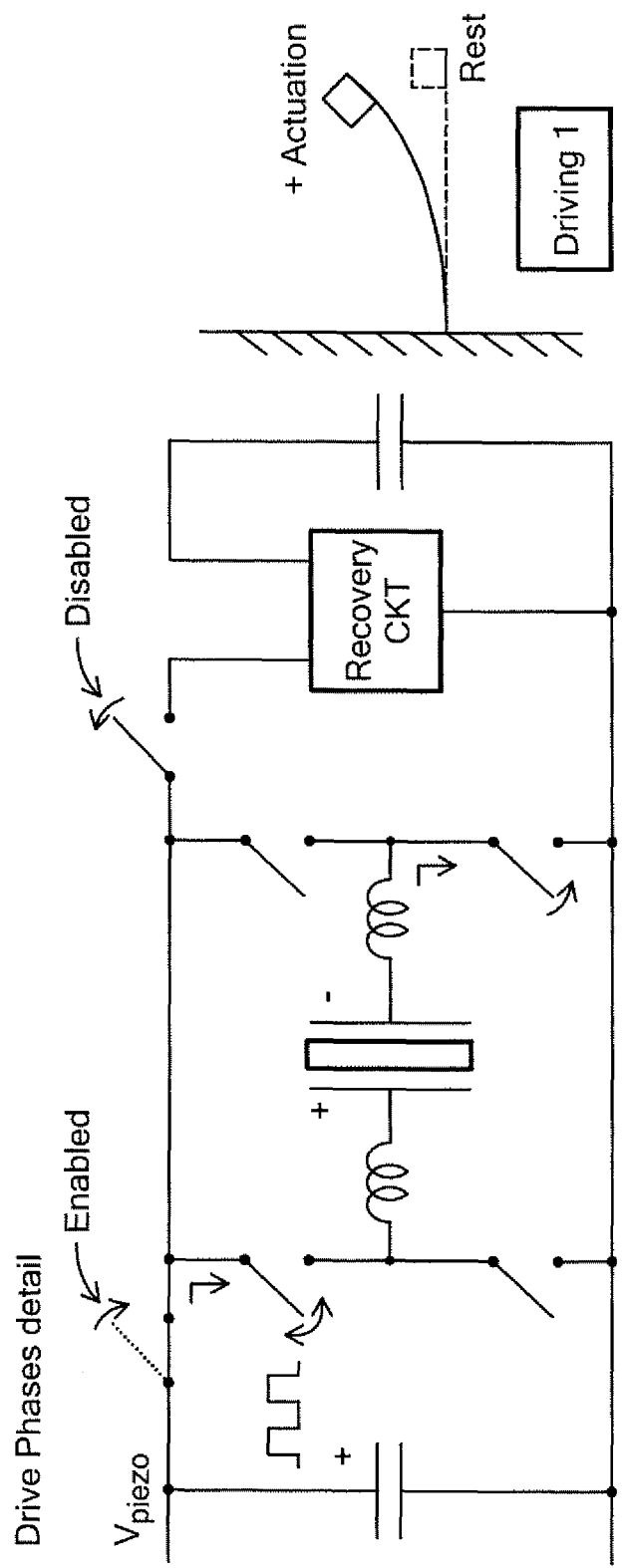
FIG. 35 depicts a first driving phase used with an energy recovery circuit.

FIG. 34 shows a typical drive cycle consisting of a full bipolar sinusoidal wave cycle. FIG. 35 shows an initial drive regime in which no (or insufficient) recovered energy is present on Crecover, 314, and current is sourced onto the actuator directly from the boost circuit until the peak desired actuator deflection point is reached. The recovery circuit is inhibited.

Figure 36:
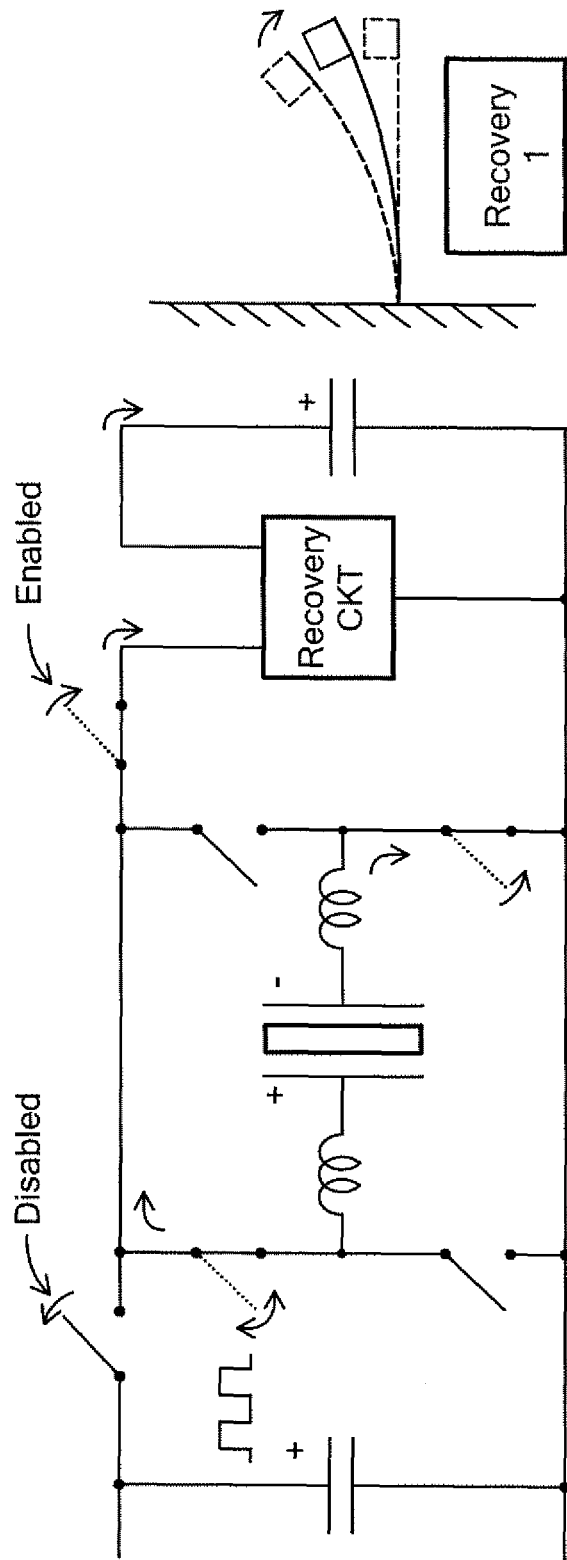
FIG. 36 depicts a first recovery phase used with an energy recovery circuit.

FIG. 36 shows a subsequent drive regime in which the actuator is being returned to its resting position by removal of the charge added during the previous phase. The primary boost circuit is inhibited and the recovery circuit is enabled. Charge removed in a modulated fashion by the H-bridge is transferred to Crecover through the recovery circuit.

Figure 37:
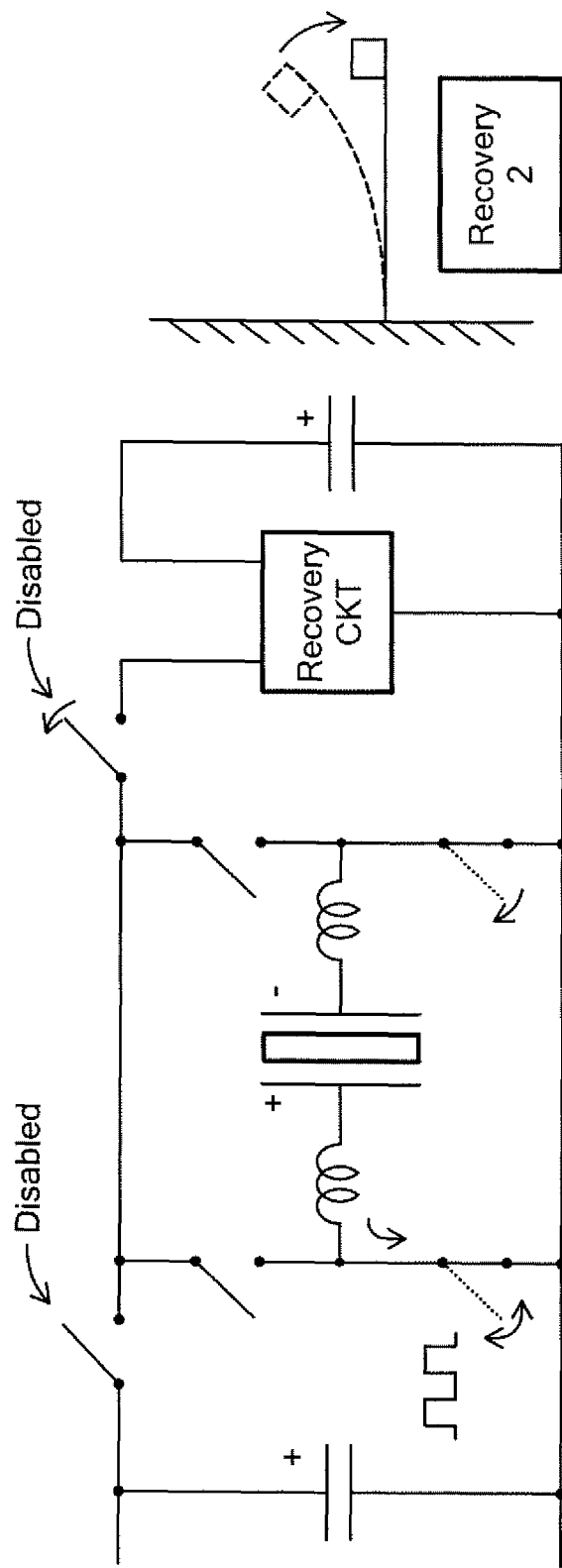
FIG. 37 depicts a second recovery phase used with an energy recovery circuit.

FIG. 37 shows a subsequent drive regime where no further charge can be recovered from the actuator (for example, as determined by the voltage comparator of FIG. 33). The recovery circuit is inhibited (or otherwise irrelevant), and the remaining voltage differential across the actuator is removed by transferring it to ground or nullified by conventional H-bridge action (e.g. charge from the positive rail added on the opposite side to equalize the voltage).

Figure 38:
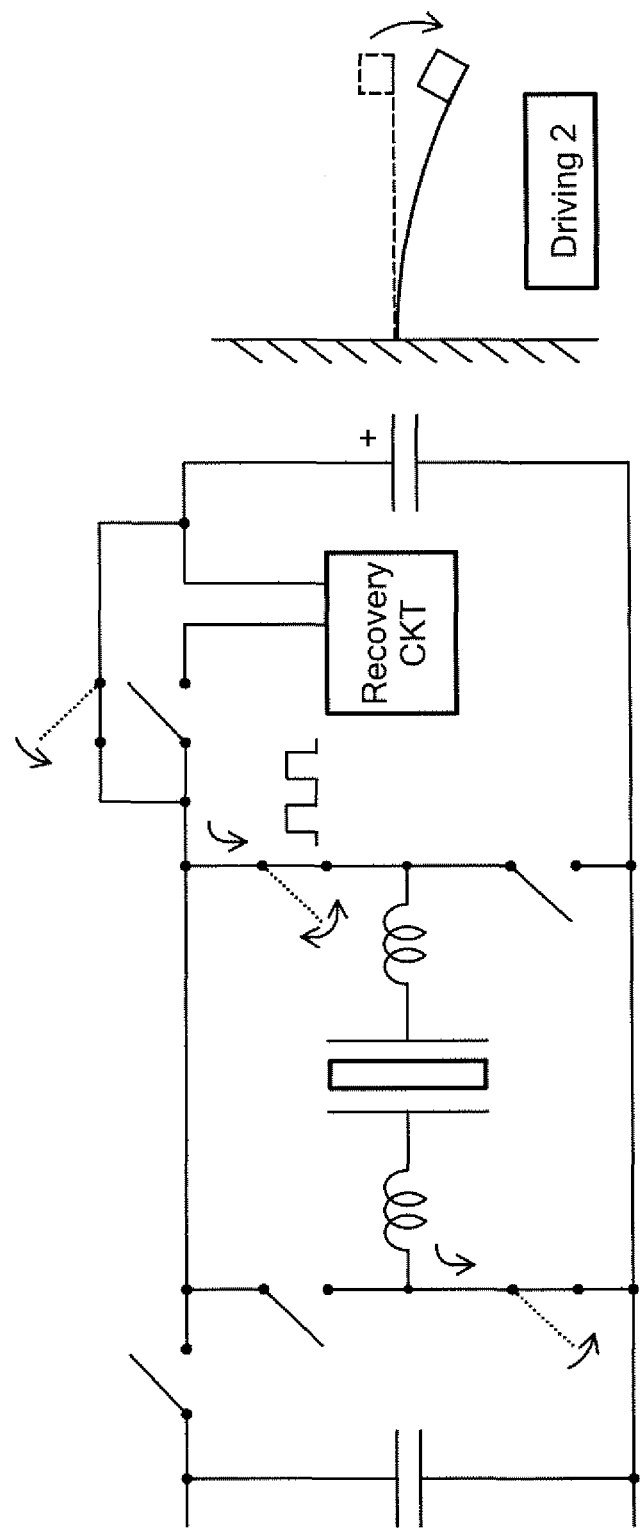
FIG. 38 depicts a second driving phase used with an energy recovery circuit, this phase powered by recovered energy.

FIG. 38 shows a subsequent drive regime where the actuator is being driven for the negative portion of the actuation cycle. Now the positive H-bridge drive rail is sourced from the recovered energy store, Crecover, until the recovered energy is no longer sufficient to provide actuation (again, as determined by a means such as comparison of the Crecover and actuator voltages).

The energy recovery mechanism is especially applicable in cases where strict adherence to the desired waveform is not critical (e.g. some distortion is permissible), such as an inertial driver, in a device with severe power constraints such as a handheld electronic device. The energy recovery mechanism could also be employed in an actuator system in which the actuator and controller are not integrated, or for non-packaged actuators, with various capacitive actuator technologies such as piezoceramic, PVDF, electroactive polymer, graphene-based, etc.

Figure 39:
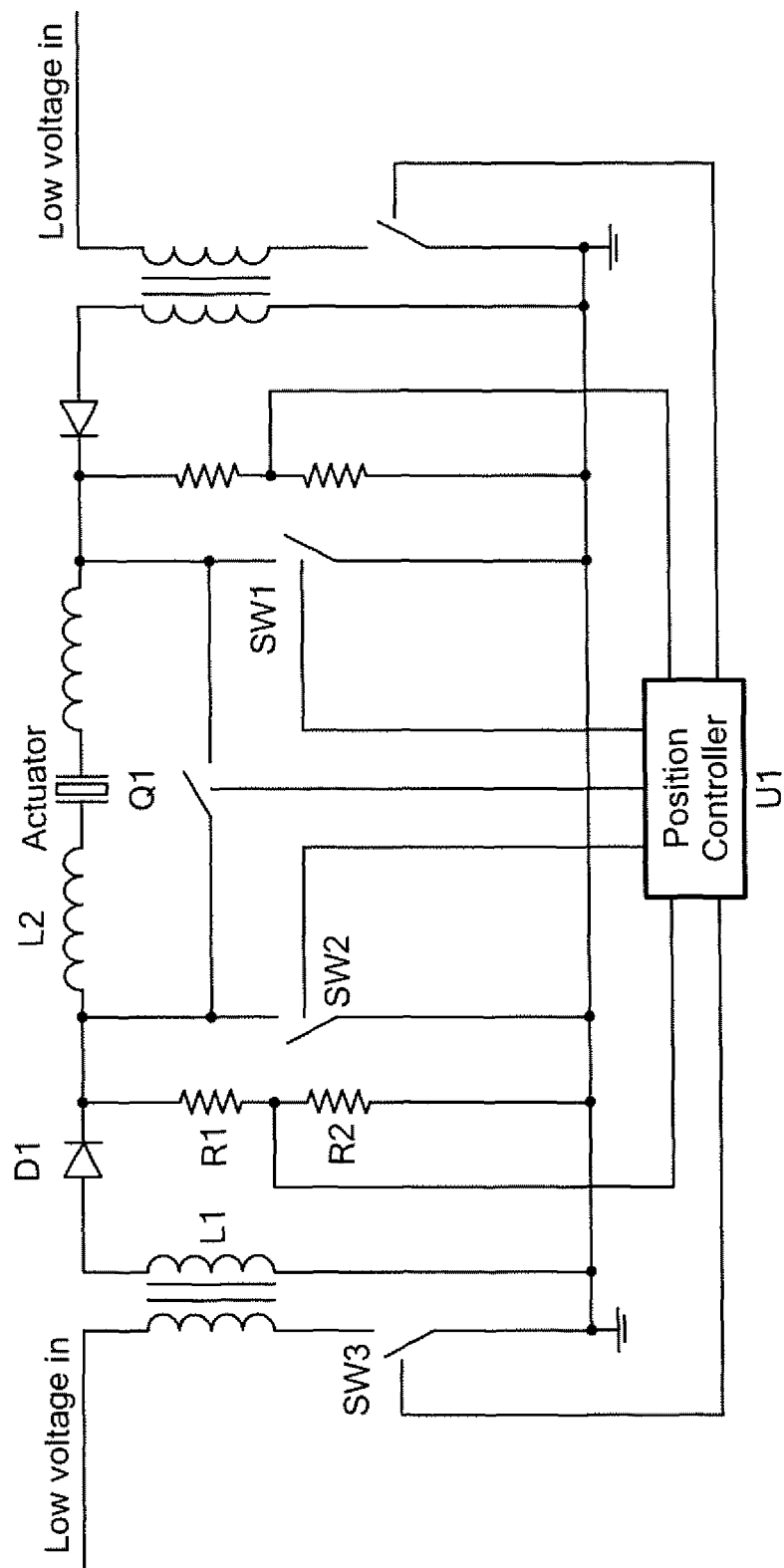
FIG. 39 is an actuator drive circuit diagram with an additional switch for efficiently transferring voltage from one side of an actuator to the other.

In another case, charge stored on one side of the electroactive element is transferred in a controlled manner directly to the other side, bringing the material back toward an undeflected state without consuming additional power from the drive circuitry. FIG. 39 depicts an example of this case using a conventional bipolar flyback circuit. In this circuit, the position controller, U1, sequences a number of electronic switching elements (e.g. MOSFETs) in order to control the voltage on both sides of actuator Q1, and thus its deflection at any time. To increase the voltage on the lefthand side of Q1, the controller momentarily closes SW3, inducing a high voltage pulse on the secondary of transformer L1, which is rectified through diode D1 and applied via inductor L2 to actuator Q1. The resulting voltage is sensed via resistor divider R1 and R2, and controller U1 may repeat this cycle until the desired voltage is reached. Correspondingly, to reduce the voltage, the controller momentarily closes switch SW2, discharging Q1 to ground. The rate of discharge is limited by inductor L2. Again, this switching is controlled responsive to the voltage feedback signal. The voltage on the other side of Q1 is controlled by an identical circuit. Such a circuit is well known in the art. To decrease the voltage on one side of Q1 while simultaneously increasing the voltage on the other side, switch SW1 may be added. By momentarily closing SW1, the controller can transfer voltage from one side directly to the other rather than ground, saving energy.

Figure 40:
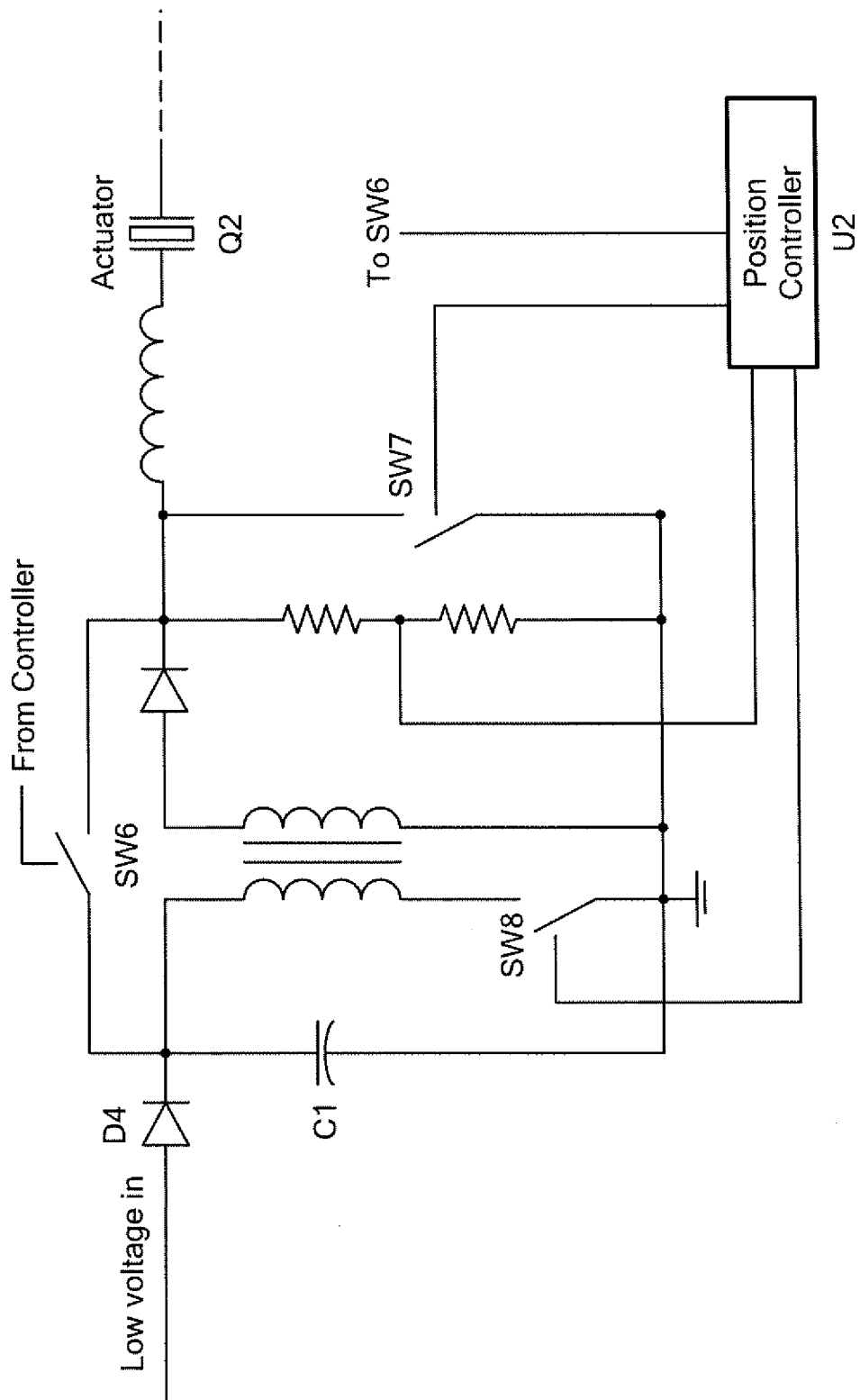
FIG. 40 is a partial actuator drive circuit diagram with additional components for recovering energy from the actuator shown.

In another example, a voltage conversion circuit transfers stored charge on the electroactive element to a storage element on the low-voltage side of the actuator control circuit or host system. In the latter case the recovered voltage is expected to be on the order of the system input voltage, significantly lower than the actuator drive voltage, and stored separately from actuator drive voltage. FIG. 40 shows an example. As before, a position controller sequences several electronic switches to control the voltage across the actuator. In this Figure, only one side of the drive circuit is shown and the optional switch across the actuator is omitted for clarity. As before, the controller may momentarily close SW8 to add voltage to the lefthand side of the actuator, Q2, or close SW7 to remove some. In this example, components SW6, D4 and C1 have been added. When the voltage on the lefthand side of Q2 is greater than that on C1 (nominally close to the low input voltage), it may be lowered by closing SW6 rather than SW7, transferring charge to C1, whose voltage rises. When the voltage on C1 is greater than or equal to the Q2 voltage, the Q2 voltage can be lowered by closing SW7 as usual. To again increase the voltage on the left side of Q2 On the next actuation cycle, SW8 is closed as usual. The energy transferred to the actuator is now sourced from the stored energy on C1 rather than the input source, until the C1 voltage is depleted lower than said voltage.

The position controller would nominally include logic circuitry such as comparators for comparing the voltages at either side of the actuator and any locations where recovered energy may be stored, in order to direct the correct switch sequencing. These functions may be provided by a general-purpose microcontroller, which may be in addition to other functions such as waveform generation, responding to bus commands, etc.

The energy recovery mechanism is especially applicable in cases where strict adherence to the desired waveform is not critical (e.g. some distortion is permissible), such as an inertial driver, in a device with severe power constraints such as a handheld electronic gadget. The energy recovery mechanism could of course also be employed in an actuator system in which the actuator and controller are not integrated, or for non-packaged actuators, or other piezo-like (capacitor-like) actuator technologies such as PVDF, electroactive polymer, graphene-based actuators, etc.

The slave subsystem may optionally include a means of measuring a health parameter of an actuating element therein. A healthy actuator has a known natural frequency and a known relationship between a drive parameter such as driving voltage and deflection. If the actuator is damaged, the natural frequency may change and the deflection in response to a known drive signal may change, usually by decreasing (or not actuating at all). Given a known input signal, deflection can be measured directly, e.g. via a strain sensor (e.g. resistive strain gauge or feedback element comprised of the actuator electroactive material) embedded on or in the actuator, or indirectly, e.g. by measuring the current consumption of the actuator in response to the known input compared to an initial value. If the system includes an accelerometer proximal to the actuator, this may be used to estimate deflection as well. Likewise, the natural frequency can be measured by these and other direct and indirect methods combined with a known input signal. This input signal may consist of a short impulse followed by a period of no actuation. In this case, the actuator will continue to oscillate after the end of the input signal, and the frequency of this ringing can be measured to determine the natural frequency. The deflection or current consumption can also be measured while the drive waveform is swept through a range of frequencies, and the frequency at which maximum deflection occurs compared to the previous natural frequency. If a change in performance is detected, the slave controller can take a corrective action locally or pass the change information back to the master subsystem. Local corrective actions include modifying the waveform drive parameters to match the new natural frequency or adjust the drive amplitude to compensate for the change in deflection. Likewise, when informed of a performance change, the master may take these corrective actions itself, or mark the slave as failed and remap the function of the failing slave device to a neighboring device. The corrections may be saved to a memory for subsequent use. The master control subsystem may also monitor bus current and combine this measurement with its knowledge of the currently active slave actuator(s) to detect a change in actuator performance and take a corrective action.

When the slave subsystem includes a voltage converter, a property of the voltage conversion process may be used to measure current into the actuator. For example, the voltage converter subsystem may include current measurement that can be observed by the slave controller, or switch a switching element at a pulse width or duty cycle proportional to current.

Figure 41:
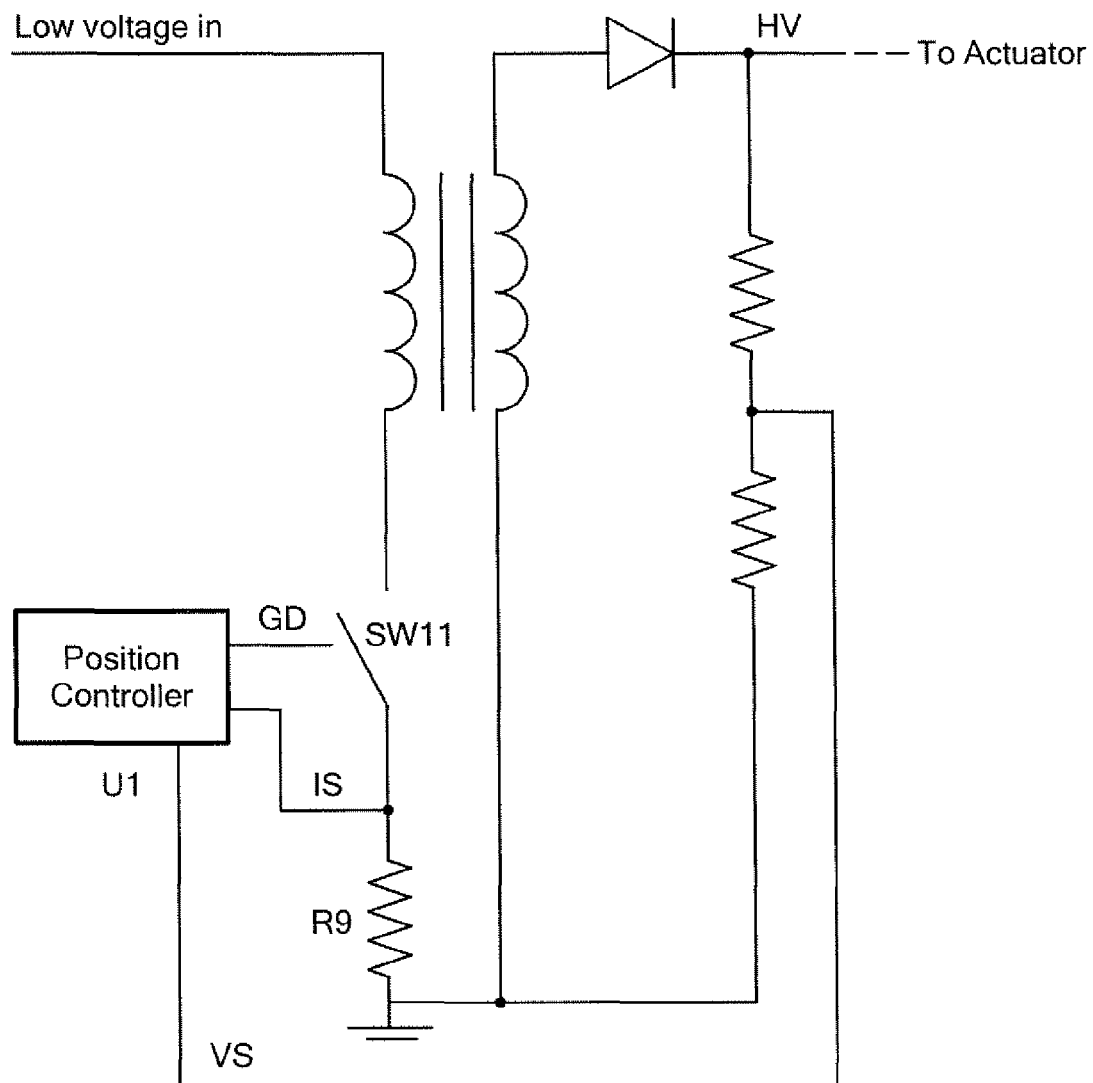
FIG. 41 is a partial actuator drive circuit diagram with additional components shown for measuring a parameter related to the health of the actuator.

FIG. 41 shows an example in which a flyback converter is used to generate the actuator driving voltage. In this example, sense resistor R9 is used to sense inductor current on the primary side via signal "IS" to the controller, causing the controller to limit peak inductor current to a known value by switching off SW11 via drive signal "GD" when a programmed value is exceeded (a standard practice for flyback converters). The measured peak current may be integrated over a wave cycle and compared to a known value to estimate the current into the actuator on the secondary side. In addition, since the current feedback modulates drive signal GD, the total number of pulses, duty cycle or cumulative on-time of the drive signal can be used to estimate actuator current.

For simplicity, the actuator units are shown with a single address and described as having a single actuator. In some cases it may be desirable to vary the sensation provided by a single actuator package. Besides adjusting the actuator drive waveform alone, the feeling of the actuator can be changed by varying the contact area provided by the contactor or by varying the natural frequency of the actuator. These can be accomplished by placing multiple, individually controlled actuating elements in a single package. As an example, a "punctate" feeling is produced by having a small contact area, and a punctate actuation can be provided using a first actuator having a small contactor. To provide a broader, less punctate feeling, a second actuator in the package can be driven alongside the first, doubling the effective contactor contact area. The contactor on the second actuator may be intentionally oversized or otherwise varied in shape to provide a less punctate sensation. An arbitrary number of such elements may be packaged in the same unit. Likewise, a second element may be tuned to have a different natural frequency than the first, and so be actuated by a waveform at the different frequency to produce a second sensation. This may be used for example to target a different skin receptor type. Both may be driven simultaneously for a different sensation still. Again, an arbitrary number of such actuating elements may be packaged in the same unit.

Figure 42:
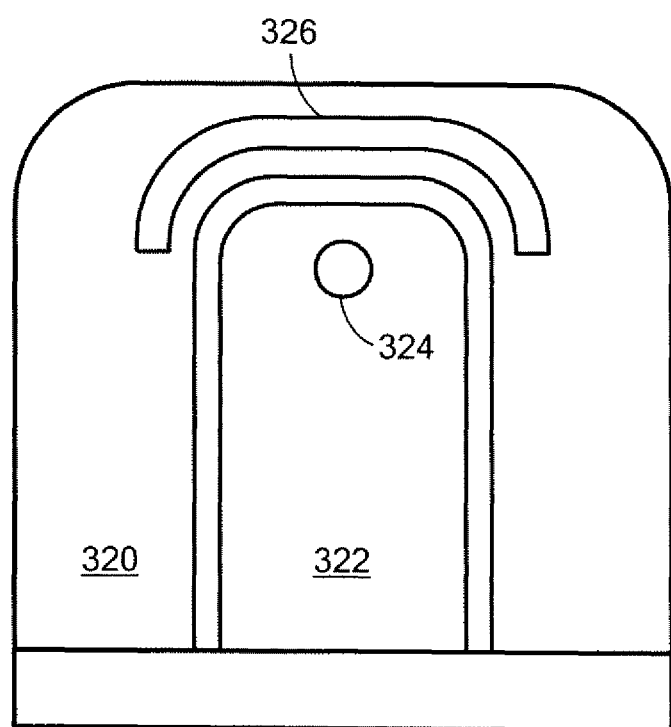
FIG. 42 shows an actuator assembly comprising multiple actuating elements with independent geometries and contact bumps.

FIG. 42 shows an multi-element actuator assembly in which the punctateness sensation can be varied by driving different actuator elements. The substrate shown is divided into two actuable elements, an outer element 320 with large contactor bump 326, and an inner element 322 with small contactor bump 324. For a very punctate sensation, inner element 324 would be driven on its own. For a broader, less punctate sensation, outer element 320 would be driven, or both may be driven simultaneously.

The described system may include a means of selecting one or more actuating element from a plurality of actuating elements on a slave unit. Many means of doing so are possible. The method may comprise, for example, the actuator unit having a separate address for each actuator, or a second address-like data structure (e.g. subaddress) for selecting individual actuators, or the command set may include a bitfield for selecting or enabling one or more said actuators. The actuator selection feature may be sorted with respect to a parameter of the actuator such that, for example, the lowest numeric value (subaddress, bit in a bitfield, etc.) corresponds to the smallest or most punctate actuator, and the next value corresponds to the next smallest, etc.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A bussed haptic actuator system comprising:
    a plurality of haptic actuators each including:
        a memory with an address storable therein, and
        a slave controller subsystem configured to control an actuator in response to a received command signal including said address;
    a master control subsystem connected via a bus to the plurality of haptic actuators and including:
        a sequencer configured to determine which of the plurality of haptic actuators are to be activated, and
        logic configured to provide, on the bus, a command signal including one or more addresses corresponding to haptic actuators to be activated as determined by the sequencer.

2. The system of claim 1 in which each haptic actuator includes a step up converter for increasing a bus voltage to a higher voltage to activate the haptic actuator.

3. The system of claim 2 in which the bus has a low voltage applied thereto and each step up converter is configured to increase the low voltage to a high voltage sufficient to activate the haptic actuator in response to a command signal from the master control subsystem logic.

4. The system of claim 3 in which a command signal is an activate command and the slave controller subsystem is configured to activate an addressed haptic actuator in response to the activate command using the step up converter high voltage.

5. The system of claim 1 in which the master control subsystem is further configured to synchronously activate a plurality of actuators according to a predetermined sequence.

6. The system of claim 5 in which a command signal includes a setup command and the slave controller subsystem functions to store, in an addressed haptic actuator, a configuration parameter provided by the master control subsystem.

7. The system of claim 6 further including a later command signal configured as an activation signal provided on the bus by the master control subsystem and the slave controller subsystem is further configured to automatically activate an addressed haptic actuator according to its stored configuration upon receipt of the later command signal.

8. The system of claim 5 in which a command signal includes a time dependent activation command and the slave controller subsystem is configured to automatically activate an addressed haptic actuator according to a stored configuration after a preset time period.

9. The system of claim 1 in which the master control subsystem logic is further configured to provide a group address to a plurality of haptic actuators and the slave controller subsystem of each haptic actuator is configured to store said group address.

10. The system of claim 9 in which the master control subsystem is further configured to provide, on the bus, a command signal for the group addressed haptic actuators.

11. The system of claim 1 in which the master control subsystem logic is further configured to reassign one or more haptic actuators stored addresses.

12. The system of claim 1 in which an address is preprogrammed into each haptic actuator memory.

13. The system of claim 12 in which the master control subsystem logic is configured to poll each haptic actuator for its address and to reassign any conflicting preprogrammed addresses.

14. The system of claim 1 in which each haptic actuator includes:
    an electroactive actuator having a resonant frequency,
    a bumper on the electroactive actuator,
    a housing for the electroactive actuator, and
    a window in the housing for the bumper to protrude therethrough.

15. The system of claim 14 in which the housing is configured to limit the displacement of the electroactive actuator.

16. The system of claim 15 including a window displacement limiter associated with the housing configured to reduce strain on the electroactive actuator and to limit full displacement of the electroactive actuator.

17. The system of claim 16 in which the window displacement limiter is the bottom edge of the window positioned to limit displacement of the electroactive actuator to a value less than its full displacement and to vibrate the housing.

18. The system of claim 17 in which the displacement limiter reduces theoretical peak displacement of the electroactive actuator and provides a uniform peak displacement output.

19. The bussed haptic actuator system of claim 14 in which the electroactive actuator is a piezoelectric actuator.

20. The system of claim 1 in which the actuator includes a first actuator element having a first bumper and a second actuator element having a second bumper.

21. The system of claim 20 in which the first actuator element has a first resonant frequency and the second actuator element has a second resonant frequency different from the first resonant frequency.

22. The system of claim 1 in which one or more haptic actuators further include a drive circuit to deflect the actuator from a resting position and an energy recovery circuit to recover stored energy when the actuator returns to the resting position.

23. The system of claim 1 further including an actuator health monitoring subsystem to detect change in actuator performance.

24. The system of claim 23 wherein an actuator is driven with a known drive signal and actuator deflection is compared to a predetermined value for said drive signal.

25. The system of claim 24 wherein the system is configured to modify an actuation parameter relating to said actuator responsive to said comparison.

26. The system of claim 1 including drive electronics to drive the actuator at its resonant frequency.

27. A bussed haptic actuator system comprising:
    a low voltage bus;

a plurality of haptic actuators on the bus and each including:
   a memory with a unique address storable therein,
   a voltage boost circuit configured to boost the low voltage on the bus to a high voltage, and
   a slave controller subsystem configured to activate an actuator using the high voltage in response to a received command signal including said unique address; and
a master control subsystem connected via the bus to the plurality of haptic actuators and configured to provide, on the bus, a command signal including one or more addresses corresponding to haptic actuators to be activated.

28. A bussed haptic actuator method comprising:
storing, in an on-board memory, a unique address for each of a plurality of haptic actuators interconnected via a bus;
configuring at least one haptic actuator of the plurality of haptic actuators to include an actuator having a resonant frequency;
determining which of the plurality of haptic actuators are to be activated;
providing, on the bus, a command signal including one or more addresses corresponding to haptic actuators to be activated; and
activating the at least one haptic actuator in response to a received command signal if said signal includes the unique address for the at least one haptic actuator.

29. The method of claim 28 further including increasing a bus voltage to a higher voltage to activate the haptic actuator.

30. The method of claim 29 in which the bus has a low voltage applied thereto and each haptic actuator is configured to increase the bus low voltage to a high voltage sufficient to activate the haptic actuator in response to a command signal.

31. The method of claim 29 in which the command signal is an activate command and the haptic actuator is activated using the high voltage.

32. The method of claim 28 in which a plurality of haptic actuators are activated according to a predetermined sequence.

33. The method of claim 32 in which the command signal includes a setup command and an addressed haptic actuator stores a configuration parameter.

34. The method of claim 28 in which a group address is provided to one or more of the plurality of haptic actuators which store said group address.

35. The method of claim 32 in which the command signal includes a time dependent activation command and an addressed haptic actuator is automatically activated according to a stored configuration after a preset time period.

36. The method of claim 34 in which the command signal is provided on the bus for the group addressed haptic actuators.

37. The method of claim 28 further including reassigning one or more of the plurality haptic actuators stored addresses.

38. The method of claim 37 further including polling each haptic actuator for its address and reassigning any conflicting preprogrammed addresses.

39. The method of claim 28 in which an address is preprogrammed into each haptic actuator memory.

40. The method of claim 28 in which the command signal is configured to select, on a haptic actuator, an actuating element from a plurality of actuating elements.

41. The method of claim 40 in which a first actuating element is selected responsive to determination that a haptic signal having a first frequency is to be delivered, and a second actuating element is selected responsive to a determination that a haptic signal having a second frequency is to be delivered.

42. The method of claim 28 in which the haptic actuator is configured to recover energy from an activated actuator when said activated actuator is returned from a deflected position toward a resting position.

43. The method of claim 28 further including measuring the health of actuators in one or more of the plurality of haptic actuators by detecting changes in performance of the actuators.

44. The method of claim 43 in which measuring the health of an actuator includes driving an actuator with a known drive signal, measuring a parameter related to the deflection of said actuator, and comparing said parameter to a predetermined value for said drive signal.

45. The method of claim 44 in which said parameter relates to power consumption in the actuator and said drive signal includes a frequency.

46. The method of claim 44 further including modifying an actuation parameter relating to said actuator responsive to said comparison.

47. A bussed haptic actuator system comprising:
a plurality of haptic actuators each including:
   a memory with an address storable therein, and
   a slave controller subsystem configured to control an actuator in response to a received command signal including said address;
a master control subsystem connected via a bus to the plurality of haptic actuators and including:
   a sequencer configured to determine which of the plurality of haptic actuators are to be activated and to synchronously activate, according to a predetermined sequence, the plurality of haptic actuators which are to be activated, and
   logic configured to provide, on the bus, a command signal including one or more addresses corresponding to haptic actuators to be activated as determined by the sequencer.

48. A bussed haptic actuator system comprising:
a plurality of haptic actuators each including:
   an electroactive actuator having a resonant frequency,
   a bumper on the electroactive actuator,
   a housing for the electroactive actuator,
   a window in the housing for the bumper to protrude therethrough,
   a memory with an address storable therein, and
   a slave controller subsystem configured to control the electroactive actuator in response to a received command signal including said address;
a master control subsystem connected via a bus to the plurality of haptic actuators and including:
   a sequencer configured to determine which of the plurality of haptic actuators are to be activated, and
   logic configured to provide, on the bus, a command signal including one or more addresses corresponding to haptic actuators to be activated as determined by the sequencer.

49. A bussed haptic actuator system comprising:
a plurality of haptic actuators each including:
   a memory with an address storable therein, and
   a slave controller subsystem configured to control an actuator in response to a received command signal including said address;

a master control subsystem connected via a bus to the plurality of haptic actuators and including:
  a sequencer configured to determine which of the plurality of haptic actuators are to be activated,
  logic configured to provide, on the bus, a command signal including one or more addresses corresponding to haptic actuators to be activated as determined by the sequencer, and
an actuator health monitoring subsystem wherein the actuator is driven with a known drive signal and actuator deflection is compared to a predetermined value for said drive signal.

50. A bussed haptic actuator method comprising:
storing, in an on-board memory, a unique address for each of a plurality of haptic actuators interconnected via a bus;
  determining which of the plurality of haptic actuators are to be activated;
  providing, on the bus, a command signal including one or more addresses corresponding to haptic actuators to be activated;
  activating an actuator in response to a received command signal if said signal includes the unique address for that haptic actuator; and
  measuring the health of the actuator, including driving the actuator with a known drive signal, measuring a parameter related to the deflection of the actuator, and comparing the parameter to a predetermined value for the drive signal.

51. A bussed haptic actuator system comprising:
a plurality of haptic actuators including a first haptic actuator having a first address and a second haptic actuator having a second address different from the first address, each haptic actuator including therein:
  an electroactive actuator having a resonant frequency,
  a memory with an address storable therein, and
  a slave controller subsystem and drive electronics configured to control and to drive the electroactive actuator in response to a received command signal including said address; and
a master control subsystem connected via a bus to the plurality of haptic actuators and including:
  a sequencer configured to determine which of said haptic actuators are to be activated, and
  logic configured to provide, on the bus, a command signal including one or more addresses corresponding to said haptic actuators to be activated as determined by said sequencer.

52. A bussed haptic actuator system comprising:
a low voltage bus;
a plurality of haptic actuators including a first haptic actuator having a first address and a second haptic actuator having a second address different from the first address, each haptic actuator including therein:
  a memory with a unique address storable therein,
  a voltage boost circuit configured to boost the low voltage on the bus to a high voltage,
  an actuator having a resonant frequency, and
  a slave controller subsystem and drive electronics configured to activate and to drive said actuator using the high voltage in response to a received command signal including said unique address; and
a master control subsystem connected via the bus to the plurality of haptic actuators and configured to provide; on the bus, a command signal including one or more addresses corresponding to haptic actuators to be activated.

53. A bussed haptic actuator method comprising:
storing, in an on-board memory of a haptic actuator, a unique address for the haptic actuator and interconnecting the haptic actuator to a bus;
receiving from the bus, a command signal including one or more addresses corresponding to haptic actuators to be activated;
determining if the haptic actuator with the unique address is to be activated; and
providing an actuator having a resonant frequency in the haptic actuator with the unique address; and
activating the actuator in response to the received command signal if the command signal includes the unique address.

54. The bussed haptic actuator method of claim 53 including selecting an actuation frequency from a range of frequencies.

55. The bussed haptic actuator method of claim 54 where the range of frequencies includes the actuator resonant frequency.

56. A bussed haptic actuator method comprising:
storing, in an on-board memory, a unique address for each of a plurality of haptic actuators interconnected via a bus;
configuring each of the plurality of haptic actuators to include an actuator having first and second actuating elements;
determining which of the plurality of haptic actuators are to be activated;
providing, on the bus, a command signal including one or more addresses corresponding to haptic actuators to be activated;
configuring said command signal to select, on a haptic actuator, an actuator including actuating elements, in which a first actuating element is selected responsive to a determination that a haptic signal having a first frequency is to be delivered, and a second element is selected responsive to a determination that a haptic signal having a second frequency is to be delivered; and
driving the actuator in response to received command signal if said signal includes the unique address for the haptic actuator to be activated.

57. A bussed haptic actuator method comprising:
storing, in an on-board memory, a unique address for each of a plurality of haptic actuators interconnected via a bus;
determining which of the plurality of haptic actuators are to be activated;
providing, on the bus, a command signal including one or more addresses corresponding to haptic actuators to be activated;
activating a haptic actuator in response to a received command signal if said signal includes the unique address for that haptic actuator;
driving an actuator in that haptic actuator; and
configuring the haptic actuator to recover energy from the driven actuator when the driven actuator is returned from a deflected position toward a neutral position.

58. The method of claim 57 including driving the actuator and storing energy during a first actuation phase, and recovering a portion of the stored energy during a subsequent actuation phase.

* * * * *